(12) United States Patent
Abeysekera et al.

(10) Patent No.: US 10,602,367 B2
(45) Date of Patent: Mar. 24, 2020

(54) WIRELESS COMMUNICATION APPARATUS, WIRELESS COMMUNICATION SYSTEM, AND WIRELESS COMMUNICATION METHOD

(71) Applicant: NIPPON TELEGRAPH AND TELEPHONE CORPORATION, Tokyo (JP)

(72) Inventors: Hirantha Sithira Abeysekera, Yokosuka (JP); Koichi Ishihara, Yokosuka (JP); Yasuhiko Inoue, Yokosuka (JP); Yusuke Asai, Yokosuka (JP); Yasushi Takatori, Yokosuka (JP); Takeo Ichikawa, Yokosuka (JP); Masato Mizoguchi, Yokosuka (JP); Munehiro Matsui, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 81 days.

(21) Appl. No.: 14/441,055

(22) PCT Filed: Nov. 12, 2013

(86) PCT No.: PCT/JP2013/080597
§ 371 (c)(1),
(2) Date: May 6, 2015

(87) PCT Pub. No.: WO2014/073706
PCT Pub. Date: May 15, 2014

(65) Prior Publication Data
US 2015/0289142 A1    Oct. 8, 2015

(30) Foreign Application Priority Data

Nov. 12, 2012 (JP) .................................. 2012-248430
Jul. 22, 2013 (JP) .................................. 2013-151812
Aug. 26, 2013 (JP) .................................. 2013-175038

(51) Int. Cl.
*H04W 16/14* (2009.01)
*H04W 24/02* (2009.01)
(Continued)

(52) U.S. Cl.
CPC .......... *H04W 16/14* (2013.01); *H04W 24/02* (2013.01); *H04W 72/0453* (2013.01); *H04W 84/12* (2013.01); *H04W 88/08* (2013.01)

(58) Field of Classification Search
USPC ......................................................... 370/338
See application file for complete search history.

(56) References Cited

U.S. PATENT DOCUMENTS 8,116,687 B2 *  2/2012  Patel ..................... H04W 16/14
                                                        455/114.2
8,502,733 B1 *  8/2013  Negus .................... H04W 4/00
                                                        342/359

(Continued)

FOREIGN PATENT DOCUMENTS

CN    101164355 A    4/2008
CN    102056180 A    5/2011

(Continued)

OTHER PUBLICATIONS

Unbehaun, Matthias, et al.,"On the Deployment of Picocellular Wireless Infrastructure," IEEE Wireless Communications, vol. 10, No. 6, Dec. 2003, pp. 70-80.

(Continued)

*Primary Examiner* — Gregory B Sefcheck
*Assistant Examiner* — Majid Esmaeilian
(74) *Attorney, Agent, or Firm* — Harness, Dickey & Pierce, P.L.C.

(57) ABSTRACT

A wireless communication apparatus is provided that is capable of performing setting of a wireless LAN access (Continued)

point so that frequency utilization efficiency of an entire wireless communication system that includes wireless LAN access points of different manufacturers and different model numbers is improved. A wireless communication system which performs setting necessary for a wireless LAN access point constituting a wireless communication network to operate includes: an information collection unit which collects setting information set in the wireless LAN access point and wireless environment information in the wireless LAN access point, a parameter calculation unit which obtains a parameter to be set for the wireless LAN access point, which is a collection source, based on the collected setting information and the collected wireless environment information, and a parameter setting unit which transmits the obtained parameter to the wireless LAN access point, which is a collection source, over a network and performs setting of the parameter.

50 Claims, 34 Drawing Sheets

(51) Int. Cl.
*H04W 72/04* (2009.01)
*H04W 84/12* (2009.01)
*H04W 88/08* (2009.01)

(56) References Cited

U.S. PATENT DOCUMENTS

| | | | | |
|---|---|---|---|---|
| 2005/0075115 A1* | 4/2005 | Corneille | G06F 8/61 | 455/456.3 |
| 2006/0013179 A1 | 1/2006 | Yamane | | |
| 2008/0316959 A1* | 12/2008 | Bachl | H04L 1/1671 | 370/329 |
| 2010/0067379 A1 | 3/2010 | Zhao et al. | | |
| 2010/0189048 A1* | 7/2010 | Baker | H04L 5/0037 | 370/329 |
| 2010/0189057 A1 | 7/2010 | Nago | | |
| 2011/0149764 A1* | 6/2011 | Wietfeldt | H04W 88/06 | 370/252 |
| 2012/0257585 A1 | 10/2012 | Sydor et al. | | |
| 2013/0176924 A1* | 7/2013 | Kishiyama | H04L 1/1614 | 370/311 |
| 2013/0235742 A1* | 9/2013 | Josiam | H04W 24/10 | 370/252 |
| 2013/0311669 A1* | 11/2013 | Reimers | H04H 20/42 | 709/231 |
| 2014/0086212 A1* | 3/2014 | Kafle | H04W 28/044 | 370/331 |
| 2015/0201432 A1* | 7/2015 | Rong | H04L 5/0053 | 370/330 |
| 2015/0348498 A1* | 12/2015 | Anderson | G06F 3/147 | 345/520 |

FOREIGN PATENT DOCUMENTS

| | | |
|---|---|---|
| EP | 1 617 600 A1 | 1/2006 |
| EP | 2 434 795 A1 | 3/2012 |
| JP | 2006-025003 A | 1/2006 |
| JP | 2006-054849 A | 2/2006 |
| JP | 2008-067121 A | 3/2008 |
| JP | 2008-283508 A | 11/2008 |
| JP | 2009-049893 | 3/2009 |
| JP | 2009-267995 | 11/2009 |
| JP | 2010-171893 A | 8/2010 |
| JP | 2012-085201 A | 4/2012 |
| JP | 2013-081089 A | 5/2013 |
| JP | 2013-093708 A | 5/2013 |
| JP | 2013-115503 A | 6/2013 |
| JP | 2013-543333 | 11/2013 |
| WO | WO2012/051157 | 4/2012 |

OTHER PUBLICATIONS

Extended Search Report, European Patent Application No. 13853482.1, dated May 10, 2016.
"802.11 High-speed wireless LAN textbook," supervised by Masahiro Morikura and Shuji Kubota, third revised edition, pp. 6-9, Impress R & D, Mar. 2008.
IEEE P802.11ac/D3.0, Draft Standard, Jun. 2012.
Jain, Rajendra K., et al., "A Quantitative Measure of Fairness and Discrimination for Resource Allocation in Shared Computer System," Digital Equipment Corporation Technical Report, DEC-TR-301, Sep. 26, 1984. Computer.
Benefits of Using OSGi, OSGi Alliance (URL: http://www.osgi.org/Specifications/HomePage), accessed Jun. 18, 2015.
The OSGi Architecture, OSGi Alliance (URL: http://www.osgi.org/Specifications/HomePage), accessed Jun. 18, 2015.
International Search Report, Application No. PCT/JP2013/080597, dated Feb. 10, 2014.
Office Action for parallel application JP 2014-545792, dated Nov. 8, 2016, with English translation attached.
Office Action for parallel application JP 2016-113075, dated Jul. 11, 2017, with English translation attached.
Kohei Hanada et al, "Game-theoretic Analysis for Fair Admission Control and Channel Selection by Coordinated APs in Wireless LAN Systems RCS2012-121", IEICE Technical Report, The Institute of Electronics, Information and Communication Engineers, Aug. 23, 2012, vol. 112, No. 192, pp. 151-156, with English abstract on front page.
Notice of Allowance for parallel application JP 2016-113075, JPO, Tokyo, dated Mar. 13, 2018, with English translation attached.
Office Action for parallel application CN 201380058471.1, dated Sep. 28, 2017, with English translation attached.
Katsuhiro Temma et al., A Study of Multi-Channel Access for Wireless LAN Using Channel Segregation Based Dynamic Channel Assignment, IEICE Technical Report, The Institute of Electronics, Information and Communication, Nov. 8, 2012, vol. 112 No. 286, pp. 121 to 126.
Japanese Office Action (Notice of Reasons for Rejection) in related application JP 2017-174304, JPO, dated Jul. 24, 2018, with English translation attached.
Japanese Office Action (Notice of Allowance) in related application JP 2017-174305, JPO, dated Jul. 24, 2018, with English translation attached.

* cited by examiner

FIG. 5

| MANUFACTURER NAME | MODEL NUMBER | AVAILABILITY OF 2.4 GHz | AVAILABILITY OF 5 GHz | AVAILABILITY OF DFS BAND | AVAILABLE MAXIMUM BANDWIDTH | NUMBER OF ANTENNAS | AVAILABILITY OF ANTENNA SELECTION IN COMMUNICATION | TRANSMISSION POWER CONTROL | NUMBER OF STEPS IN TRANSMISSION POWER CONTROL | AVAILABILITY OF TILT ANGLE CONTROL | ... |
|---|---|---|---|---|---|---|---|---|---|---|---|
| COMPANY A | xx-y-y | ○ | ○ | ○ | 80 | 4 | ○ | ○ | 5 | ○ | |
| | xx-y-z | ○ | × | × | 40 | 2 | × | ○ | 4 | × | |
| COMPANY B | aa-bb-a | ○ | ○ | ○ | 40 | 2 | × | ○ | 2 | ○ | |
| | aa-bb-b | ○ | × | × | 20 | 2 | × | ○ | 2 | × | |
| | Aa-bb-c | × | ○ | × | 20 | 1 | × | × | 0 | × | |
| ... | | | | | | | | | | | |

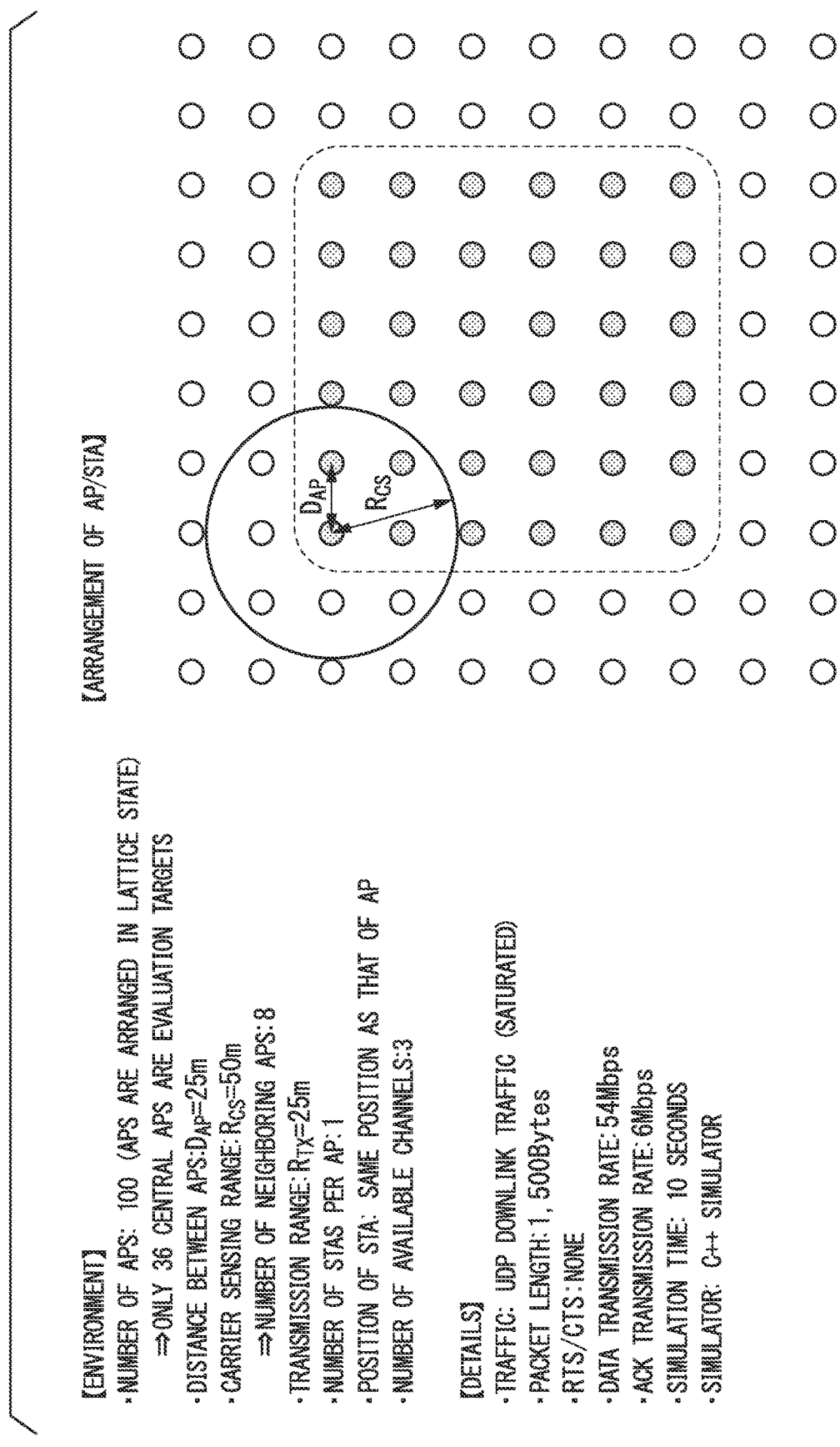

[ARRANGEMENT OF AP/STA]

[ENVIRONMENT]
- NUMBER OF APS: 100 (APS ARE ARRANGED IN LATTICE STATE)
  ⇒ ONLY 36 CENTRAL APS ARE EVALUATION TARGETS
- DISTANCE BETWEEN APS: $D_{AP}$=25m
- CARRIER SENSING RANGE: $R_{CS}$=50m
  ⇒ NUMBER OF NEIGHBORING APS: 8
- TRANSMISSION RANGE: $R_{TX}$=25m
- NUMBER OF STAS PER AP: 1
- POSITION OF STA: SAME POSITION AS THAT OF AP
- NUMBER OF AVAILABLE CHANNELS: 3

[DETAILS]
- TRAFFIC: UDP DOWNLINK TRAFFIC (SATURATED)
- PACKET LENGTH: 1,500Bytes
- RTS/CTS: NONE
- DATA TRANSMISSION RATE: 54Mbps
- ACK TRANSMISSION RATE: 6Mbps
- SIMULATION TIME: 10 SECONDS
- SIMULATOR: C++ SIMULATOR

WIRELESS COMMUNICATION APPARATUS, WIRELESS COMMUNICATION SYSTEM, AND WIRELESS COMMUNICATION METHOD

TECHNICAL FIELD

The present invention relates to a network-controlled wireless communication apparatus, a network-controlled wireless communication system, and a network-controlled wireless communication method.

Priorities are claimed on Japanese Patent Application No. 2012-248430, filed Nov. 12, 2012, Japanese Patent Application No 2013-151812, filed Jul. 22, 2013, and Japanese Patent Application No 2013-175038, filed Aug. 26, 2013, the contents of which are incorporated herein by references.

BACKGROUND ART

In recent years, wireless local area networks (LANs) of the IEEE802.11 standard have been widely used not only in companies and public spaces but also in ordinary homes with the spread of portable high-performance wireless stations such as laptop personal computers and smartphones. Wireless LANs of the IEEE802.11 standard include wireless LANs of the IEEE802.11b and IEEE802.11g standards using a 2.4 GHz band, and wireless LANs of the IEEE802.11a standard using a 5 GHz band.

In a wireless LAN of the IEEE802.11b or IEEE802.11g standard, 13 channels are prepared at intervals of 5 MHz between 2400 MHz and 2483.5 MHz. However, when a plurality of channels are used in the same place, if the channels are used without overlapping spectra so as to avoid interference, a maximum of three channels, or four channels in some cases, can be simultaneously used.

On the other hand, in the IEEE802.11a standard, 19 channels, including 8 channels and 11 channels that do not overlap between 5710 MHz and 5330 MHz and between 5490 MHz and 5170 MHz, respectively, have been defined in Japan. It is to be noted that, in the IEEE802.11a standard, a bandwidth per channel is fixed to 20 MHz (Non-Patent Document 1).

A maximum transmission rate of the wireless LAN is 11 M bits per second (bps) in the IEEE802.11b standard, and 54 Mbps in the IEEE802.11a standard and the IEEE802.11g standard. However, the transmission rate here is a transmission rate on a physical layer. Since transmission efficiency in a medium access control (MAC) layer is about 50 to 70%, an upper limit value of an actual throughput is about 5 Mbps in the IEEE802.11b standard and about 30 Mbps in the IEEE802.11a standard and the IEEE802.11g standard. Moreover, when a number of communication stations trying to transmit information increases, the transmission rate further decreases.

On the other hand, in wired LANs, provision of a high-speed line of 100 Mbps has become widespread with the spread of Fiber to the home (FTTH) using optical fibers, including a 100Base-T interface of the Ethernet (registered trademark), in individual homes, and further speedup of the transmission rate is required in the wireless LANs.

Accordingly, in the IEEE802.11n standard standardized in 2009, a channel bandwidth that was fixed to 20 MHz up to that time increased to 40 MHz at the maximum, and introduction of a spatial multiplexing transmission technology (a multiple input multiple output (MIMO) technology) was determined. When all functions defined in the IEEE802.11n standard are applied and transmission and reception are performed, a maximum communication speed of 600 Mbps can be realized in the physical layer.

Further, in the IEEE802.11ac in which a standardization specification is currently being investigated, an extension of the channel bandwidth to 80 MHz or a maximum of 160 MHz, introduction of a multi-user MIMO (MU-MIMO) transmission method to which space division multiple access (SDMA) is applied, and the like are being investigated. When all functions defined in the IEEE802.11ac standard are applied and transmission and reception are performed, a maximum communication speed of about 6.8 Gbps can be realized in the physical layer (for example, see Non-Patent Document 2).

Since wireless LANs of the IEEE802.11 standard are operated in frequency bands for which no license is required such as a 2.4 GHz band and a 5 GHz band, it is necessary for an access point that supports an IEEE802.11 wireless LAN (hereinafter referred to as an access point, which is indicated as AP in the drawings) to determine a frequency channel on which the wireless LAN access point is to be operated among frequency channels that can be handled by the wireless LAN access point itself when forming a wireless LAN cell (BSS: Basic Service Set). Further, in order to reduce interference, it is necessary to determine a transmission output value of the wireless LAN access point itself when another wireless LAN cell using the same or adjacent frequency channels exists within a range that electric waves of the wireless LAN access point itself reach.

Also, a cell is operated by describing set values of parameters used in the cell itself and other parameters that can be supported by the wireless LAN access point itself in a regularly transmitted beacon frame, a probe response frame in response to a probe request frame received from a wireless station, or the like, and transmitting the frame on a frequency channel determined to be operated to notify associated wireless stations and neighboring communication stations of such values and parameters.

For example, the set values of the parameters used in the cell itself include a parameter value regarding acquisition of access right and a parameter value such as QoS (Quality of Services). Further, the other parameters that can be supported by the wireless LAN access point itself include a bandwidth used for transmission of frames, and a data rate set regarding a basic data rate (BSS: Basic Rate Set) used for transmission of control frames and a data rate at which transmission and reception of data can be performed, or the like.

Examples of a method for selecting and setting a frequency channel, a transmission power value, and other parameters in the wireless LAN access point include (1) a method in which a default parameter value set by a manufacturer of the wireless LAN access point is used as it is, (2) a method in which a value manually set by a user who operates the wireless LAN access point is used, (3) a method for, when each wireless LAN access point starts up, autonomously selecting and setting a parameter value based on wireless environment information detected in each wireless LAN access point itself, and (4) a method for performing setting using a parameter value determined by a centralized control server such as an access point controller.

When a bandwidth per channel is widened to 40 MHz, 80 MHz, or 160 MHz as described above, the number of channels that can be used simultaneously at the same place in a 5 GHz band decreases to 9 channels, 4 channels, or 2 channels, respectively. That is, the number of usable channels decreases as the bandwidth per channel increases.

Further, because the number of prepared channels that can be simultaneously used at the same place is 3 in the wireless LAN of the 2.4 GHz band and 2, 4, 9, or 19 in the wireless LAN of the 5 GHz band, it is necessary for an access point (AP) to select a channel to be used in its own cell (BSS: Basic Service Set) when the wireless LAN is actually introduced.

In an environment in which the number of BSSs is greater than the number of available channels, a plurality of BSSs use the same channel (OBSS: Overlapping BSS). In the wireless LAN, autonomous distribution access control in which data transmission is performed only when a channel is empty using carrier sense multiple access with collision avoidance (CSMA/CA) is used.

Specifically, a communication station in which a transmission request is generated first monitors a status of a wireless medium during a predetermined sensing period (DIFS: Distributed Inter-Frame Space), and performs random back-off if there is no transmission signal from other communication stations during this period. The communication station continues to monitor the wireless medium during a random back-off period, and obtains a channel use right if there is no transmission signal from the other communication stations during this period. The communication station obtaining the channel use right can transmit data to the other communication stations in the same BSS and receive data from the communication stations. Since such control is performed, throughput to be obtained is degraded if there are many competing communication cells or communication stations. Therefore, it is important to monitor a surrounding environment and select an appropriate channel.

Since a channel selection method in an access point is not defined in the IEEE802.11 standard, each vendor uses its unique channel selection method, but a most general channel selection method is a method for selecting a channel with minimum interference power. The access point detects statuses of all channels for a constant period (executes scanning), selects a channel with minimum interference power, and performs transmission and reception of data with communication stations associated therewith on the selected channel. It is to be noted that the interference power is a level of a signal received from a neighboring BSS or another system.

Further, a procedure of changing the channel when a wireless situation around the BSS is changed is defined in the IEEE802.11 standard, but reselection of a once selected channel is not basically performed except for forced transition due to, for example, radar detection. That is, in current wireless LANs, channel optimization in accordance with a change in the wireless situation is not performed.

PRIOR ART DOCUMENTS

Non-Patent Documents

Non-Patent Document 1: "802.11 High-speed wireless LAN textbook" supervised by Masahiro Morikura and Shuji Kubota, third revised edition, pp. 6 to 9, Impress R & D, March, 2008.
Non-Patent Document 2: IEEE 802.11ac Draft Standard, D3. 0, June, 2012
Non-Patent Document 3: R. Jain et al., "A quantitative measure of fairness and discrimination for resource allocation in shared computer system", Digital Equipment Corporation Technical Report, DEC-TR-301, September 1984.

SUMMARY OF INVENTION

Problems to be Solved by the Invention

In the methods (1) to (4) for selecting and setting a frequency channel, a transmission power value, and other parameters described above, particularly, an inexpensive wireless LAN access point often uses default parameters set by a manufacturer as they are. However, in an environment in which a plurality of wireless LAN access points manufactured by the same manufacturer are installed near each other, all the wireless LAN access points use the same frequency channel and/or transmission power value. Accordingly, there is a problem in that interference occurs between the wireless LAN access points and communication quality deteriorates.

In a relatively small-scale network such as one in an ordinary home, it is conceivable that a user operating a wireless LAN sets appropriate parameters. Particularly, setting of various parameters is possible in an environment in which there is no external interference source, but it is difficult for a user or a manager to appropriately set the parameters in an environment such as an urban area or an apartment in which wireless LANs are used in a surrounding area or in a middle-scale or large-scale network.

In wireless LAN access points that can operate in an autonomous distributed manner in which parameter values are autonomously selected based on wireless environment information detected in each wireless LAN access point when each wireless LAN access point starts up, appropriate parameter values differ depending on a start-up order of wireless LAN access points. Further, because each wireless LAN access point selects and sets optimal parameter values in each wireless LAN access point itself, local optimization is possible, but the entire system cannot be optimized and it is difficult to cope with a change in a surrounding wireless environment.

Therefore, in the case of, for example, a large-scale wireless LAN system including tens to hundreds of wireless LAN access points in an environment such as a university or an office, there is a method for controlling the wireless LAN access points in which a dedicated apparatus called a "wireless LAN controller" is installed, and parameter values of each wireless LAN access point are determined by the wireless LAN controller and reflected in each wireless LAN access point.

However, with such a wireless LAN controller product, the wireless LAN access points that are control targets should all be products manufactured by the same manufacturer as the wireless LAN controller. Further, there is a restriction in that products having different model numbers are often unable to be mixed even when the products are manufactured by the same manufacturer, and the wireless LAN access points that are control targets should all be installed in the same building or the same premises. Also, because the wireless LAN controller is an expensive apparatus, it is suitable for operation of a large-scale network as described above, but is not suitable for control of a wireless LAN access point in an ordinary home or the like.

Thus, in a conventional dedicated control device controlling a wireless LAN access point, such as a wireless LAN controller, or in a conventional wireless LAN collective management system using software, wireless LAN access points that are control targets should be products manufactured by the same manufacturer. Further, there is a problem in that products having different model numbers are often unable to be mixed even when the products are manufactured by the same manufacturer, and the wireless LAN access points that are control targets should all be connected to a network in the same building or the same premises.

Further, an existing wireless LAN system operates in an autonomous distributed manner. Further, as described above, since the once selected channel is not basically reselected, a channel to be used is selected based on a surrounding wireless environment at the time of start-up of each access point. Even when an environment changes (for example, a change in the number of access points that have started up, a change in a wireless station apparatus associated with each access point, a change in the amount of data transmitted by a wireless apparatus in each cell, or the like), optimization of the channel to be used is not performed. Accordingly, there is a problem in that a difference is generated between throughputs of cells and a throughput in the entire system deteriorates.

The prevent invention has been made in light of such circumstances, and an object thereof is to provide a wireless communication apparatus, a wireless communication system, and a wireless communication method that are capable of performing setting of a wireless LAN access point so that frequency utilization efficiency of an entire wireless communication system that includes wireless LAN access points of different model numbers and/or different manufacturers is improved.

Further, an object of the present invention is to provide a wireless communication apparatus, a wireless communication system, and a wireless communication method that are capable of preventing local throughput degradation in an environment in which access points aggregate densely.

Means for Solving the Problems

The present invention is a wireless communication apparatus that performs setting necessary for a wireless LAN access point constituting a wireless communication network to operate, the wireless communication apparatus including: an information collection unit which collects setting information set in the wireless LAN access point and wireless environment information in the wireless LAN access point; a parameter calculation unit which obtains a parameter to be set for the wireless LAN access point, which is a collection source, based on the collected setting information and the collected wireless environment information; and a parameter setting unit which transmits the obtained parameter to the wireless LAN access point, which is the collection source, over a network and performs setting of the parameter.

Preferably, the wireless communication apparatus of the present invention includes a database which stores attribute information regarding an attribute of the wireless LAN access point, and the parameter calculation unit obtains the parameter based on the setting information, the wireless environment information, and the attribute information.

Preferably, in the wireless communication apparatus of the present invention, the information collection unit collects the setting information and the wireless environment information from each of wireless LAN access points of different manufacturers, different model numbers, and different versions.

Preferably, in the wireless communication apparatus of the present invention, the information collection unit collects, as the wireless environment information, the number of neighboring access points operated on a frequency channel, a level of a received reception signal, and a time occupancy rate of the channel in each wireless LAN access point, and the parameter calculation unit obtains the parameter so that a wireless environment is improved in each wireless LAN access point based on the wireless environment information.

Preferably, in the wireless communication apparatus of the present invention, the information collection unit collects, as the wireless environment information, the number of neighboring access points operated on a frequency channel, an available maximum bandwidth, and a level of a reception signal received from another neighboring access point in each wireless LAN access point, and the parameter calculation unit obtains the parameter so that a wireless environment is improved in each wireless LAN access point based on the wireless environment information.

Preferably, in the wireless communication apparatus of the present invention, the information collection unit collects, as the wireless environment information, the number of other neighboring access points operated on a frequency channel, a level of a received reception signal, and a time occupation rate of the channel in each of wireless stations associated with the wireless LAN access point.

Preferably, in the wireless communication apparatus of the present invention, the information collection unit collects, as the wireless environment information, the number of other neighboring access points operated on a frequency channel, an available bandwidth, and a level of a received reception signal in each of wireless stations associated with the wireless LAN access point.

Preferably, in the wireless communication apparatus of the present invention, the information collection unit collects, as the wireless environment information, an instantaneous value of information collected over a constant period by the wireless LAN access point or a statistical value, the instantaneous value, an average value, a minimum value, or a maximum value of the information collected over the constant period by the wireless LAN access point.

Preferably, in the wireless communication apparatus of the present invention, the information collection unit and the parameter setting unit perform information collection and parameter setting using a protocol for an external interface.

Preferably, in the wireless communication apparatus of the present invention, the parameter setting unit executes the setting of the parameter through any one of periodical execution, manual execution by an operator of a network, manual execution in accordance with a request of a user receiving a service, and execution when a predetermined event occurs.

Preferably, in the wireless communication apparatus of the present invention, the database is updated in accordance with release of a wireless LAN access point of a new model or a change in a function of an existing wireless LAN access point.

Preferably, in the wireless communication apparatus of the present invention, the wireless LAN access point performs wireless communication using at least one of a plurality of channels, the information collection unit collects, as the wireless environment information, information indicating a surrounding wireless environment detected by the wireless LAN access point, and the parameter calculation unit calculates an index value for determining a channel to be used by the wireless LAN access point based on the wireless environment information, and obtains, as the parameter, a channel to be used by the wireless LAN access point based on the index value.

Preferably, in the wireless communication apparatus of the present invention, the parameter calculation unit calculates, as the index value, a U value expressed by U=1−medium use rate of each available channel by another wireless apparatus, for all available channels, and determines one of a channel in which the U value is maximized and a channel in which the U value is greater than or equal to a predetermined threshold as a temporary channel to be assigned to the wireless LAN access point.

Preferably, in the wireless communication apparatus of the present invention, the parameter calculation unit calculates, as the index value, a U value expressed by U=degree of satisfaction, for all available channels, and determines one of a channel in which the U value is maximized and a channel in which the U value is greater than or equal to a predetermined threshold as a temporary channel to be assigned to the wireless LAN access point.

Preferably, in the wireless communication apparatus of the present invention, the parameter calculation unit calculates, as the index value, a U value expressed by U=duration for which the wireless LAN access point is capable of occupying each available channel per unit time/total duration necessary for the wireless LAN access point to perform transmission and reception of a frame per unit time, for each available channel, and determines one of a channel in which the U value is maximized and a channel in which the U value is greater than or equal to a predetermined threshold as a temporary channel to be assigned to the wireless LAN access point.

Preferably, in the wireless communication apparatus of the present invention, the parameter calculation unit calculates, as the index value, a U value expressed by U=throughput (expected throughput) acquirable when the wireless LAN access point shares each available channel with a neighboring access point/throughput acquirable when only the wireless LAN access point uses each available channel (when there is no other interfering access point), for each available channel and each available bandwidth, and determines a channel and a bandwidth in which the U value is greater than or equal to a predetermined threshold $\beta$ as a temporary channel and a temporary bandwidth to be assigned to the wireless LAN access point.

Preferably, in the wireless communication apparatus of the present invention, if there is no channel and no bandwidth in which the U value is greater than or equal to the threshold $\beta$, a channel and a bandwidth in which the U value is maximized are determined as the temporary channel and the temporary bandwidth to be assigned to the wireless LAN access point.

Preferably, in the wireless communication apparatus of the present invention, the parameter calculation unit calculates, as the index value, a U value expressed by U=throughput capable of being acquired by wireless LAN access point/required traffic amount, for all available channels, and determines one of a channel in which the U value is maximized and a channel in which the U value is greater than or equal to a predetermined threshold as a temporary channel to be assigned to the wireless LAN access point.

Preferably, in the wireless communication apparatus of the present invention, the parameter calculation unit calculates the temporary channel in each wireless LAN access point, calculates the U value in each wireless LAN access point and a total sum $U_{total}$ of U values in all wireless LAN access points, selects one wireless LAN access point from among wireless LAN access points having U values smaller than or equal to a predetermined threshold $U_{TH}$, calculates a channel satisfying a predetermined condition, and iteratively executes an operation of setting the channel as a new temporary channel of the selected wireless LAN access point predetermined Max_r times.

Preferably, in the wireless communication apparatus of the present invention, when $U_{total}$ in an $r^{th}$ iterative calculation is denoted as $U_{total}^{(r)}$, the channel satisfying the predetermined conditions is a channel in which the U value of the selected wireless LAN access point is $U \geq \beta (0 \leq \alpha$ and $\beta \leq 1)$ under a condition of $U_{total}^{(r)} \geq \alpha \cdot U_{total}^{(r-1)}$.

Preferably, in the wireless communication apparatus of the present invention, the parameter calculation unit calculates the temporary channel in each wireless LAN access point, calculates the U value in each wireless LAN access point and a total product $U_{product}$ of U values in all wireless LAN access points, selects one wireless LAN access point from among wireless LAN access points having U values smaller than or equal to a predetermined threshold $U_{TH}$, calculates a channel satisfying a predetermined condition, and iteratively executes an operation of setting the channel as a new temporary channel of the selected wireless LAN access point predetermined Max_r times.

Preferably, in the wireless communication apparatus of the present invention, when $U_{product}$ in an $r^{th}$ iterative calculation is denoted as $U_{product}^{(r)}$, the channel satisfying the predetermined condition is a channel in which the U value of the selected wireless LAN access point is $U \geq \beta$ ($0 \leq \alpha$ and $\beta \leq 1)$ under a condition of $U_{product}^{(r)} \geq \alpha \cdot U_{product}^{(r-1)}$.

Preferably, in the wireless communication apparatus of the present invention, when U values of all wireless LAN access points become 1, when the number of times of predetermined iterative calculations becomes predetermined Max_r, or when a predetermined convergence condition is satisfied, the parameter calculation unit determines the temporary channel of each wireless LAN access point at that time as a channel to be set in each wireless LAN access point.

Preferably, in the wireless communication apparatus of the present invention, the parameter calculation unit calculates a total U value that is a sum of U values of all wireless LAN access points to which channels are to be assigned, and optimizes a channel assigned to a wireless LAN access point having a U value satisfying a predetermined condition so that the total U value does not deteriorate.

Preferably, in the wireless communication apparatus of the present invention, the parameter calculation unit calculates a multiplied value of U values of all wireless LAN access points to which channels are to be assigned, and optimizes a channel assigned to a wireless LAN access point having a U value satisfying a predetermined condition so that the multiplied value of the U value does not deteriorate.

Preferably, in the wireless communication apparatus of the present invention, the parameter calculation unit calculates the U value using a time occupation rate of the wireless LAN access point or a wireless station, or a parameter value equivalent to the time occupation rate.

Preferably, in the wireless communication apparatus of the present invention, the wireless LAN access point performs wireless communication using at least one wireless communication scheme among a plurality of wireless communication schemes, the information collection unit collects information indicating surrounding wireless environment detected by the wireless LAN access point as the wireless environment information, and the parameter calculation unit calculates an index value for determining a wireless communication scheme to be used by the wireless LAN access point based on the wireless environment information, and obtains, as the parameter, the wireless communication scheme to be used by the wireless LAN access point based on the index value.

Preferably, in the wireless communication apparatus of the present invention, the parameter calculation unit calculates, as the index value, a $U_X$ value expressed by $U_X$=expected throughput upon transition to another wireless communication scheme/mean throughput in a system currently being used, in each wireless LAN access point, determines a channel of a wireless communication scheme in which the $U_X$ value is maximized as a channel of a temporary wireless communication scheme to be assigned to the wireless LAN access point, and determines a channel of a wireless communication scheme to be finally used through iterative calculation.

The present invention is a wireless communication system including a management engine which performs setting necessary for a wireless LAN access point constituting a wireless communication network to operate, the management engine including: an information collection unit which collects setting information set in the wireless LAN access point and wireless environment information in the wireless LAN access point; a parameter calculation unit which obtains a parameter to be set for the wireless LAN access point, which is a collection source, based on the collected setting information and the collected wireless environment information; and a parameter setting unit which transmits the obtained parameter to the wireless LAN access point, which is the collection source, over a network and perform setting of the parameter, and the wireless LAN access point including: an information transmission unit which transmits the setting information and the wireless environment information to the management engine when receiving a request for information collection from the information collection unit; and a setting unit which performs setting of the wireless LAN access point itself based on the parameter when receiving the parameter from the parameter setting unit.

Preferably, in the wireless communication system of the present invention, the management engine includes a database which stores attribute information regarding an attribute of the wireless LAN access point, and the parameter calculation unit obtains the parameter based on the setting information, the wireless environment information, and the attribute information.

Preferably, in the wireless communication system of the present invention, the information collection unit collects the setting information and the wireless environment information from each of wireless LAN access points of different manufacturers, different model numbers, and different versions.

Preferably, in the wireless communication system of the present invention, the information collection unit collects, as the wireless environment information, the number of other neighboring access points operated on a frequency channel, a level of a received reception signal, and a time occupation rate of the channel in each of wireless stations associated with the wireless LAN access point.

Preferably, the wireless communication system of the present invention includes a plurality of wireless LAN access points which perform wireless communication using at least one of a plurality of channels, each wireless LAN access point includes a surrounding wireless environment notification unit which detects a surrounding wireless environment, generates information indicating the surrounding wireless environment as the wireless environment information, and notifies the management engine of the generated wireless environment information, and the parameter calculation unit calculates an index value for determining a channel to be used by each wireless LAN access point based on the wireless environment information, and obtains, as the parameter, the channel to be used by each wireless LAN access point based on the index value.

Preferably, in the wireless communication system of the present invention, the parameter calculation unit calculates, as the index value, a U value expressed by U=1−medium use rate of each available channel by another wireless apparatus, for all available channels, and determines a channel in which the U value is maximized as a temporary channel to be assigned to the wireless LAN access point.

Preferably, in the wireless communication system of the present invention, the parameter calculation unit calculates, as the index value, a U value expressed by U=degree of satisfaction, for all available channels, and determines a channel in which the U value is maximized as a temporary channel to be assigned to the wireless LAN access point.

Preferably, in the wireless communication system of the present invention, the parameter calculation unit calculates, as the index value, a U value expressed by U=duration for which each wireless LAN access point is capable of occupying each available channel per unit time/total duration necessary for each wireless LAN access point to perform transmission and reception of a frame per unit time, for each available channel, and determines a channel in which the U value is maximized as a temporary channel to be assigned to each wireless LAN access point.

Preferably, the wireless communication system of the present invention includes a plurality of wireless LAN access points which perform wireless communication using a channel of at least one wireless communication scheme among a plurality of wireless communication schemes, each wireless LAN access point includes a surrounding wireless environment notification unit which detects a surrounding wireless environment, generates information indicating the surrounding wireless environment as the wireless environment information, and notifies the management engine of the generated wireless environment information, and the parameter calculation unit calculates an index value for determining a wireless communication scheme to be used by each wireless LAN access point based on the wireless environment information, and obtains, as the parameter, the wireless communication scheme to be used by each wireless LAN access point based on the index value.

The present invention is a wireless communication method performed by a wireless communication system which performs parameter setting necessary for a wireless LAN access point constituting a wireless communication network to operate, the wireless communication method including: an information collection step of collecting setting information set in the wireless LAN access point and wireless environment information in the wireless LAN access point; a parameter calculation step of obtaining a parameter to be set for the wireless LAN access point, which is a collection sources based on the collected setting information and the collected wireless environment information; and a parameter setting step of transmitting the obtained parameter to the wireless LAN access point, which is a collection source, over a network and performing setting of the parameter.

Preferably, in the wireless communication method of the present invention, the parameter calculation step obtains the parameter based on the setting information, the wireless environment information, and attribute information regarding an attribute of the wireless LAN access point stored in a database.

Preferably, in the wireless communication method of the present invention, the information collection step collects the setting information and the wireless environment information from each of wireless LAN access points of different manufacturers, different model numbers, and different versions.

Preferably, in the wireless communication method of the present invention, the information collection step collects, as the wireless environment information, the number of other neighboring access points operated on a frequency channel, a level of a received reception signal, and a time occupancy rate of the channel in each of wireless stations associated with the wireless LAN access point.

Preferably, in the wireless communication method of the present invention, the wireless LAN access point performs wireless communication using at least one of a plurality of channels, the information collection step collects information indicating surrounding wireless environment detected by the wireless LAN access point as the wireless environment information, and the parameter calculation step calculates an index value for determining a channel to be used by the wireless LAN access point based on the wireless environment information, and obtains, as the parameter, the channel to be used by the wireless LAN access point based on the index value.

Preferably, in the wireless communication method of the present invention, the parameter calculation step calculates, as the index value, a U value expressed by U=1−medium use rate of each available channel by another wireless apparatus, for all available channels and determines a channel in which the U value is maximized as a temporary channel to be assigned to the wireless LAN access point.

Preferably, in the wireless communication method of the present invention, the parameter calculation step calculates, as the index value, a U value expressed by U=degree of satisfaction, for all available channels and determines a channel in which the U value is maximized as a temporary channel to be assigned to the wireless LAN access point.

Preferably, in the wireless communication method of the present invention, the parameter calculation step calculates, as the index value, a U value expressed by U=duration of each available channel capable of being occupied by the wireless LAN access point per unit time/total duration necessary for the wireless LAN access point to perform transmission and reception of a frame per unit time, for each available channel, and determines a channel in which the U value is maximized as a temporary channel to be assigned to the wireless LAN access point.

Preferably, in the wireless communication method of the present invention, the wireless LAN access point performs wireless communication using a channel of at least one wireless communication scheme among a plurality of wireless communication schemes, the information collection step collects information indicating surrounding wireless environment detected by the wireless LAN access point as the wireless environment information, and the parameter calculation step calculates an index value for determining a wireless communication scheme to be used by the wireless LAN access point based on the wireless environment information and obtains, as the parameter, the wireless communication scheme to be used by the wireless LAN access point based on the index value.

Advantageous Effects of the Invention

With the present invention, it is possible to obtain an advantageous effect that setting of wireless LAN access points can be performed so that a wireless environment such as frequency utilization efficiency of the entire wireless communication system that includes wireless LAN access points of different model numbers and/or different manufacturers is improved.

Further, with the present invention, it is possible to obtain an advantageous effect of preventing local throughput degradation in an environment in which access points aggregate densely.

BRIEF DESCRIPTION OF DRAWINGS

FIG. 5 is a diagram showing a table structure of a performance database 89 shown in FIG. 2.

FIG. 21 is a diagram showing details of an environment of a computer simulation.

MODES FOR CARRYING OUT THE INVENTION

Hereinafter, embodiments of the present invention will be described with reference to the drawings. However, the present invention is not limited to the following embodiments and, for example, the embodiments may be appropriately combined.

First Embodiment

Figure 1:
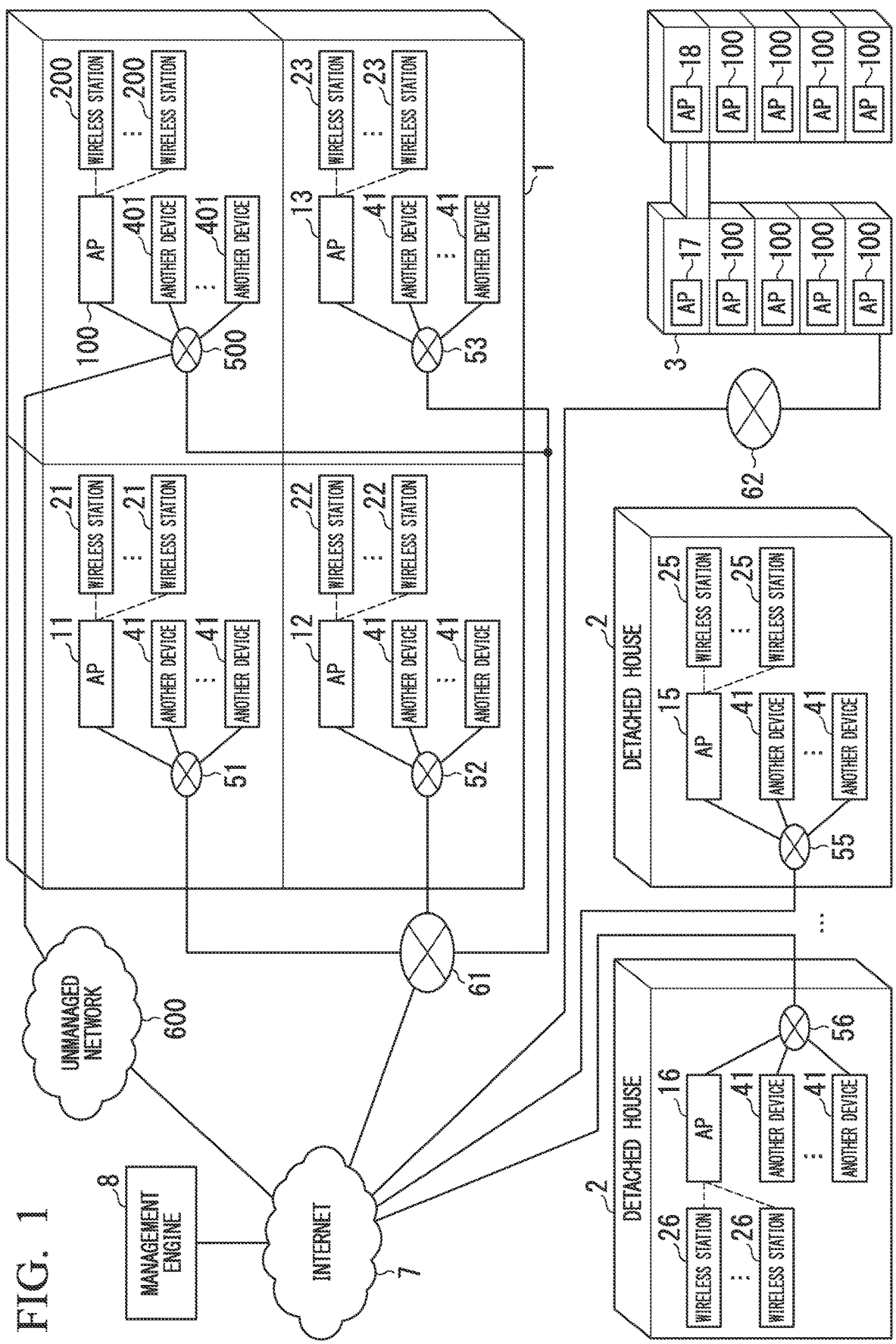
FIG. 1 is a diagram showing a configuration of an entire wireless communication system in accordance with a first embodiment of the present invention.

Hereinafter, a wireless communication system in a first embodiment of the present invention will be described with reference to the drawings. FIG. 1 is a diagram showing a configuration of the entire wireless communication system in accordance with the first embodiment. In FIG. 1, the reference sign 1 indicates a four-household apartment. The reference signs 2 each indicate a detached house. The reference sign 3 indicates buildings in which wireless communication is available, such as an office environment, a shared building, a cafe, or a public hotspot. The reference signs 11, 12, 13, 15, 16, 17, and 18 indicate access points installed in the households of the apartment 1, the detached houses 2, and the buildings 3, such as the office environment, the shared building, the cafe, or the public hotspot. Reference signs 21, 22, 23, 25, and 26 indicate wireless stations that perform wireless communication with the access points 11, 12, 13, 15, and 16 using a wireless LAN protocol of the IEEE802.11 standard. It is to be noted that wireless stations used in the buildings 3 are not shown in FIG. 1, but the wireless stations are connected so as to be associated with the access points 17 and 18, as in the apartment 1. Reference signs 41 indicate other devices connected to networks through cables. Reference signs 51, 52, 53, 55, and 56 indicate networks including a hub or a router. Reference signs 61 and 62 indicate external networks. The reference sign 7 indicates the Internet. The reference sign 8 indicates a management engine (ME) that holds wireless environment information collected from each control target access point, and performs calculation and setting of parameters appropriate for each control target access point based on an appropriate index.

It is to be noted that one household in the apartment 1 includes an environment in which wireless stations 200 (uncontrollable stations) are wirelessly connected to an access point 100 (uncontrollable AP) which cannot be controlled from the outside. Other devices 401 and the access point 100 are connected to a network 500, and connected to the Internet 7 over an unmanaged network 600. Further, access points 100 which cannot be controlled from the outside are also installed in the building 3.

Figure 2:
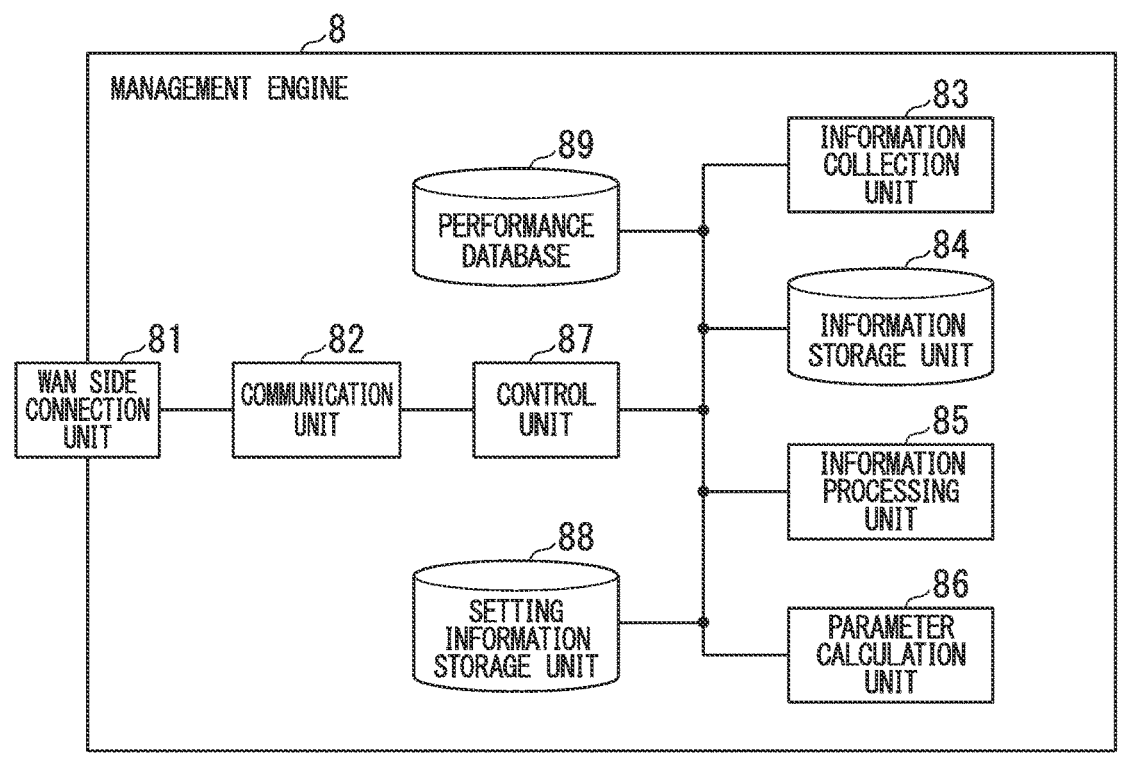
FIG. 2 is a block diagram showing a configuration of a management engine 8 shown in FIG. 1.

Next, a configuration of the management engine 8 shown in FIG. 1 will be described with reference to FIG. 2. FIG. 2 is a block diagram showing a configuration of the management engine 8 shown in FIG. 1. In FIG. 2, the reference sign 81 indicates a wide area network (WAN) side connection unit used for communication with an external network. The reference sign 82 indicates a communication unit that performs transmission and reception of data with the external network via the WAN side connection unit 81. The reference sign 83 indicates an information collection unit that collects wireless environment information from each access point. The reference sign 84 indicates an information storage unit that stores the wireless environment information collected from each access point.

The reference sign 85 indicates an information processing unit that performs a statistical process or the like of the wireless environment information stored in the information storage unit 84 and collected from each access point. The reference sign 86 indicates a parameter calculation unit that calculates a setting parameter value such as a channel and a transmission power value to be used by each access point. The reference sign 87 indicates a control unit that performs centralized control of an operation of the management engine 8. The reference sign 88 indicates a setting information storage unit that stores setting information that the parameter calculation unit 86 refers to in advance when calculating the setting parameter value. The setting information storage unit 88 stores the parameter value to be set to correspond to the information collected by the information collection unit 83 in advance. The reference sign 89 indicates a performance database in which information regarding performance of access points to be managed by the management engine 8 is stored.

Figure 3:
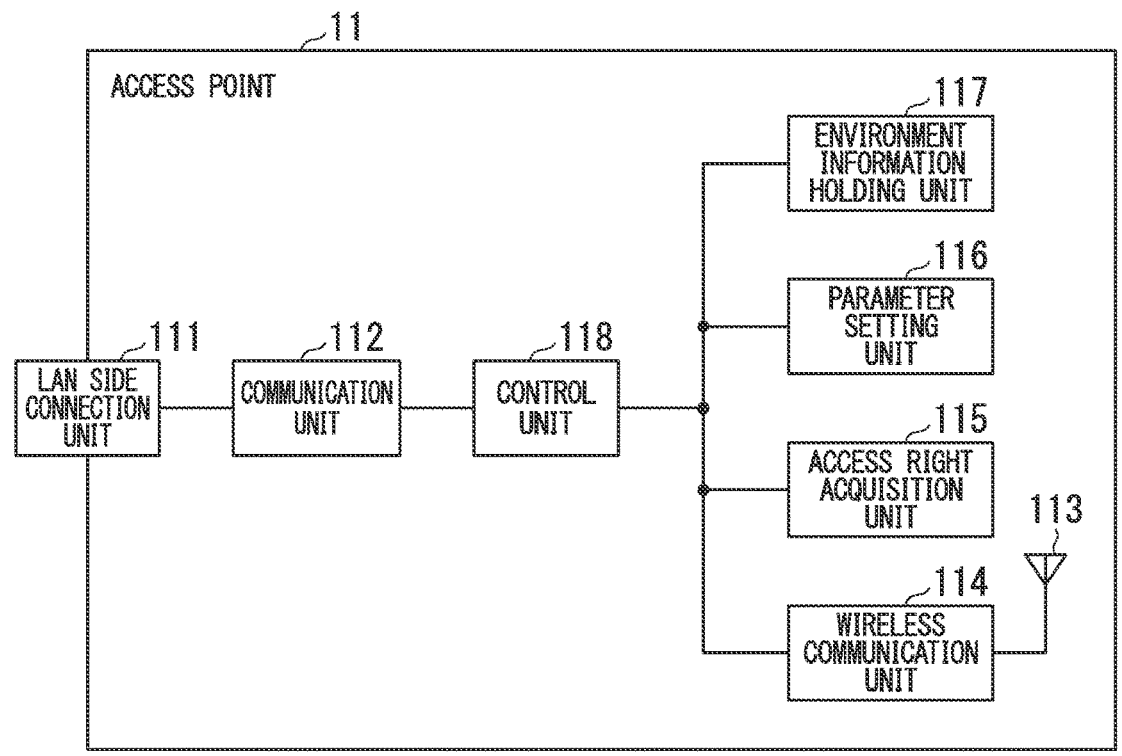
FIG. 3 is a block diagram showing a configuration of an access point 11 shown in FIG. 1.

Next, a configuration of the access points 11, 12, 13, 15, 16, 17, and 18 shown in FIG. 1 will be described with reference to FIG. 3. Since the access points 11, 12, 13, 15, 16, 17, and 18 shown in FIG. 1 include the same configuration, the configuration of the access point 11 will be described herein. FIG. 3 is a block diagram showing a configuration of the access point 11 shown in FIG. 1. In FIG. 3, reference sign 111 indicates a LAN side connection unit to communicate with an external network. The reference sign 112 indicates a communication unit that communicates with the external network via the LAN side connection unit 111. The reference sign 113 indicates an antenna. The reference sign 114 indicates a wireless communication unit transmitting and receiving data through the antenna 113 by radio. The reference sign 115 indicates an access right acquisition unit that acquires an access right prior to wireless data communication.

The reference sign 116 indicates a parameter setting unit that sets various parameters transmitted from the management engine 8. The reference sign 117 indicates an environment information holding unit that holds wireless environment information. The reference sign 118 indicates a control unit that performs centralized control of an operation of the access point 11. The wireless communication unit 114 performs wireless communication with the wireless stations 21 using the parameter value set by the parameter setting unit 116. For example, the wireless communication unit 114 performs wireless communication using access control based on CSMA/CA. Further, the wireless communication unit 114 scans each available channel in the wireless communication during a predetermined period and outputs a scanned result to the environment information holding unit 117.

Figure 4:
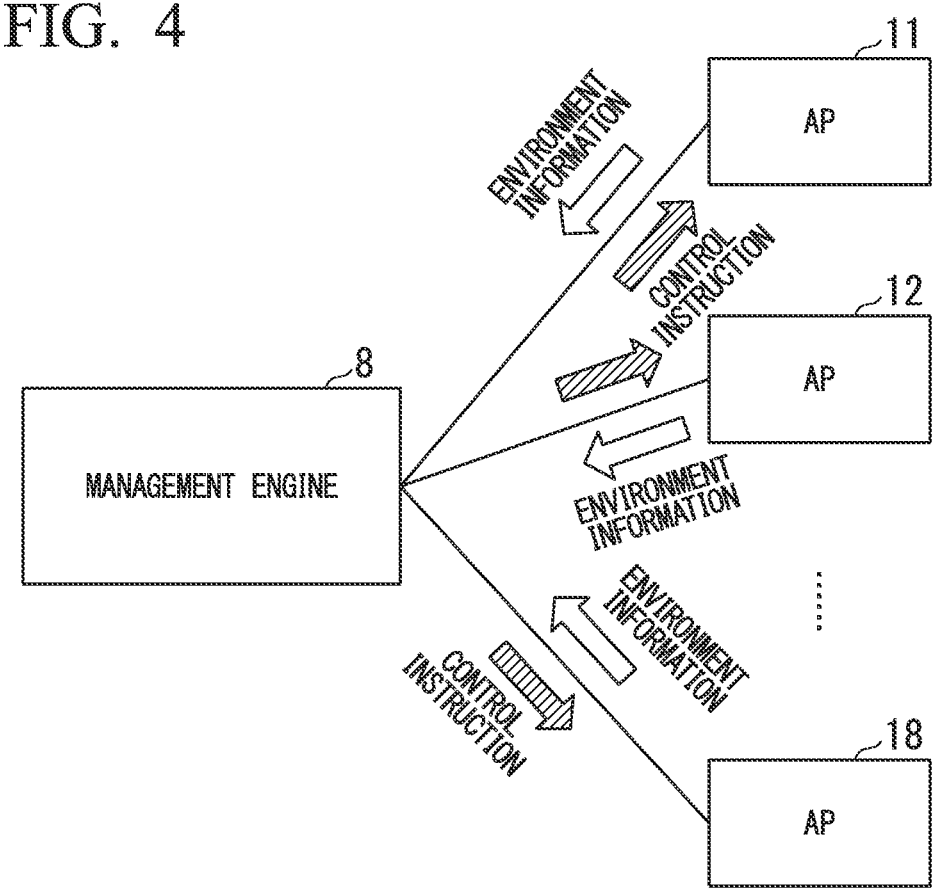
FIG. 4 is a diagram showing a flow of environment information and control instructions between the management engine 8 and access points 11, 12, 13, 15, 16, 17, and 18.

Next, information exchanged between the management engine 8 and the access points 11, 12, 13, 15, 16, 17, and 18 shown in FIG. 1 will be described with reference to FIG. 4. FIG. 4 is a diagram showing a flow of environment information and control instructions between the management engine 8 and the access points 11, 12, 13, 15, 16, 17, and 18. As shown in FIG. 4, the management engine 8 receives environment information from each of the access points 11, 12, 13, 15, 16, 17, and 18, calculates a parameter value that each access point should use, and transmits the calculated parameter value to each of the access points 11, 12, 13, 15, 16, 17, and 18 as a control instruction. Each of the access points 11, 12, 13, 15, 16, 17, and 18 receives this control instruction and performs its own setting.

Next, the environment information that the management engine 8 collects from each access point will be described. The environment information includes four types of information, including (1) current setting information of an access point, (2) information regarding functions of the access point, (3) information regarding associated wireless stations, and (4) surrounding wireless environment information. Details of the four types of information are as follows.

(1) Current Setting Information of an Access Point
  Access point identification ID (SSID, MAC address, or the like)
  Wireless mode of operation (2.4 GHz or 5 GHz)
  Used channel
  Bandwidth
  Used transmission power value
  Buffer information
(2) Information Regarding Functions of the Access Point
  Operable mode
  Settable parameter
  Settable transmission power value
  Availability of MIMO
  Availability of orthogonal frequency division multiple access (OFDMA)
  Availability of tilt angle control
  Availability of antenna selection in communication
  Availability of clear channel assessment (CCA) threshold control
(3) Information Regarding Associated Wireless Stations
  Number of associated wireless stations
  Identification ID (for example, MAC address) of each associated wireless station
  Strength (RSSI value) of a signal level of each associated wireless station
  Used data rate, modulation and coding scheme (MCS), and the like of each associated wireless station
  Number of retransmissions of frames, frame discard rate, and the like of each associated wireless station
  Time occupation rate of channel of each associated wireless station
  Throughput, frame error rate (FER), delay time, and buffer information of each associated wireless station
  Performance, available data rate, and bandwidth of each associated wireless station
(4) Surrounding Wireless Environment Information
  Number of other neighboring access points
  Identification ID (for example, SSID or MAC address) of each of other neighboring access points
  Strength (RSSI value) of signal level of each of other neighboring access points
  Used channel and bandwidth of each of other neighboring access points
  Time occupation rate of channel of each of other neighboring access points The management engine 8 collects one or a plurality of pieces of information from among the information constituting each of the four types of information described above.

The current setting information of an access point includes, for example, an SSID or a MAC address for identifying the access point, an operable wireless mode, a currently used frequency channel, and a current transmission power value used for transmission and reception of frames.

The information regarding the associated wireless station includes the number of wireless stations already associated with the access point, a MAC address for identifying each wireless station, a signal level (RSSI value) of a reception signal received from each wireless station, a data rate used for communication with each wireless station, the number of retransmissions and a discard rate of a frame destined for each wireless station, a time occupation rate of a channel of the associated wireless station, and the like.

The surrounding wireless environment information includes the number of other neighboring access points detected in the access point itself, an SSID or a MAC address for identifying the access point, strength of a reception signal level such as a beacon received from each of other neighboring access points, a frequency channel and a bandwidth used by each access point, a time occupation rate of a channel of each access point, and the like.

The information regarding functions of the access point includes, for example, information regarding parameters that can be set in the access point, such as an operable wireless mode, a settable transmission power value, and a settable frequency channel.

It is to be noted that the information such as the signal level, the time occupation rate of the channel, the number of other neighboring access points, the number of retransmissions, and the frame discard rate collected by the management engine 8 may be an instantaneous value of the information collected by the access point, or may be a statistical value, an instantaneous value, an average value, a minimum value, or a maximum value of the information collected by the access point during a constant period.

Next, control instruction information from the management engine 8 to each access point will be described. Details of the control instruction information are as follows.

Operable wireless mode (2.4 GHz, 5 GHz)
Channel and bandwidth to be used
Transmission power value to be used
CCA value to be used
Data rate and MCS to be used
Tilt angle to be used
Antenna to be used
Information regarding use of OFDMA and MU-MIMO
Request to Send (RTS) threshold value
BSSBasicRateSet value
KeepAlive value
Beacon interval
Sleep mode
Parameters regarding CSMA/CA (CWmin, CWmax, arbitration inter-frame spacing number (AIFSN), and transmission opportunity (TXOP))
Parameters regarding QoS
Aggregation The control instruction information for the access point includes one or a plurality of the above-described pieces of information.

Next, the performance database 89 shown in FIG. 2 will be described with reference to FIG. 5. FIG. 5 is a diagram showing a table structure of the performance database 89 shown in FIG. 2. The performance database 89 stores information on a wireless apparatus used for the access point such as a manufacturer name, a model number, availability of 2.4 GHz, availability of 5 GHz, availability of a dynamic frequency selection (DFS) band, an available maximum bandwidth, the number of antennas, availability of antenna selection in communication, transmission power control, the number of steps in the transmission power control, and availability of tilt angle control, as shown in FIG. 5. In the present embodiment, as shown in FIG. 5, wireless apparatuses used as various access points of different manufacturers, model numbers, and capabilities are treated at the same time, a parameter set to be used for all access points that are control targets is calculated, and each access point is notified of the calculated parameter set. Therefore, when a wireless apparatus to be used as a new access point is released or there is a functional change due to improvement of firmware of an existing access point, the performance database 89 is updated.

Further, when there is a change in an index for calculation of a parameter, an algorithm or the like, the setting information stored in the setting information storage unit 88 shown in FIG. 2 is updated.

Figure 6:
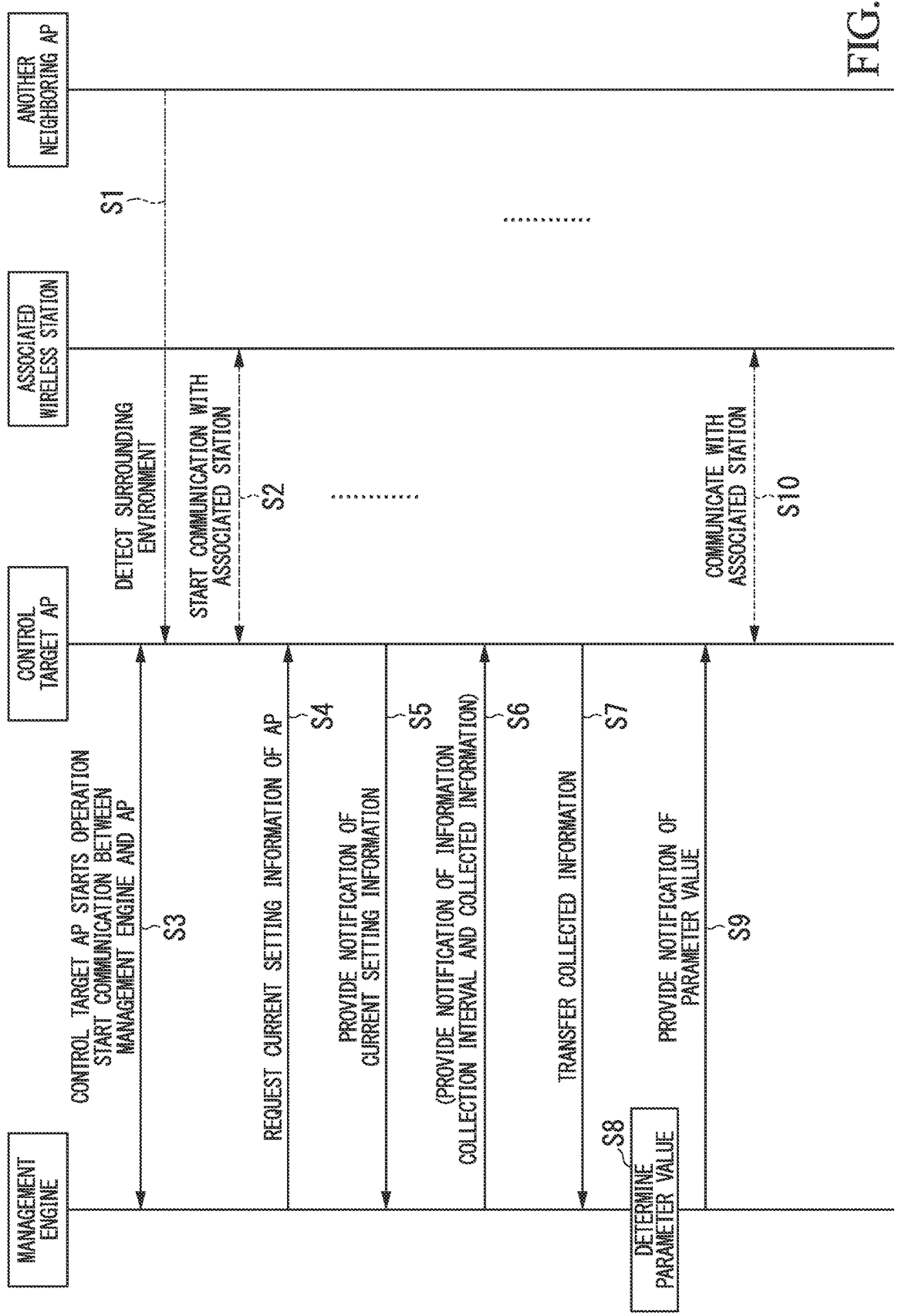
FIG. 6 is a sequence diagram showing an operation of the wireless communication system shown in FIG. 1.

Next, an operation of the wireless communication system shown in FIG. 1 will be described with reference to FIG. 6. FIG. 6 is a sequence diagram showing an operation of the wireless communication system shown in FIG. 1. Here, a description will be given in connection with a case in which a user receiving a service newly installs the access point 16 in the detached house 2 and starts an operation. The access point 16, which newly start an operation, first forms a cell (BSS) using a default parameter value of a manufacturer, executes carrier sensing using CSMA/CA (step S1), and performs communication with the associated wireless stations 26 (step S2). Further, the access point 16 regularly scans all available frequency channels or currently operated frequency channels over a certain period and holds the acquired surrounding wireless environment information.

The amount of the acquired surrounding wireless environment information depends on functions of the access point. For example, if the communication in both frequency bands of 2.4 GHz and 5 GHz is possible, the access point 16 collects information on each channel available in each frequency band, the number of other access points on each channel, and a reception signal level from each access point. In contrast, if only either the 2.4 GHz band or the 5 GHz band is available, the access point 16 collects only the information in the frequency band.

Then, the access point 16, which is a control target, notifies the management engine 8 that the operation has started, and starts communication between the management engine 8 and the access point 16 (step S3). The information collection unit 83 of the management engine 8 requests the access point 16, which has newly started the operation, to provide current setting information (step S4). In response thereto, the access point 16 receiving the request for notification of the setting information from the management engine 8 notifies the management engine 8 of the information (step S5). From this notified information, the management engine 8 recognizes identification information such as a manufacturer, a model number, a MAC address, and parameter setting currently being operated of the access point which has started the operation.

The information collection unit 83 of the management engine 8, which has acquired these pieces of information, stores information regarding the access point 16 in the information storage unit 84. Then, the management engine 8 requests the access point 16 to perform information collection by regularly notifying the access point 16 of an information collection interval and collection information, as necessary (step S6). In response thereto, the access point 16 performs observation in the wireless LAN access point itself and regularly transfers information regarding a surrounding wireless environment held in the environment information holding unit 117 and information regarding the associated wireless stations to the management engine 8 (step S7).

Then, the parameter calculation unit 86 of the management engine 8 calculates and determines a parameter value to be used by the access point in accordance with a previously prepared index, based on the information of each access point connected to a network with reference to the information stored in the setting information storage unit 88 and the performance database 89 (step S8). For example, when the information to be collected is wireless environment information such as the number of neighboring access points operated on a frequency channel, a level of a received reception signal, and a time occupation rate of the channel, the parameter calculation unit 86 calculates the parameter so that the frequency utilization efficiency (and wireless environment such as a user throughput and QoS) is improved in each access point based on the wireless environment information. Then, the parameter calculation unit 86 notifies each access point of the determined parameter value (step S9). In response thereto, the parameter setting unit 116 of the access point 16 performs setting based on this parameter value. Then, the access point 16 performs communication with the associated wireless stations 26 based on the parameter value designated by the management engine 8 (step S10).

It is to be noted that the parameter calculation and the parameter setting are performed on all or part of the access points that are targets of the management engine 8.

Here, the information collection in the access point 16, the information transfer from the access point 16 to the management engine 8, the calculation of the optimal parameter value for the access point 16 in the management engine 8, and the generated timing of the notification of the optimal parameter value from the management engine 8 to the access point are not limited to the above description.

For example, (1) regular execution, (2) manual execution by an operator on the network side, (3) manual execution in accordance with a request of a user receiving a service, or (4) automatic execution when a predetermined event occurs, for example, an event such as deterioration of a throughput, exceeding of a threshold of a buffer size, or deterioration of service quality, can be applied to these events.

Further, the above-described events may be independently generated and all or part of the events may be generated in conjunction with each other.

Further, the sequence shown in FIG. 6 is an example of the operation of the communication, the operation need not necessarily be performed in the order shown in FIG. 6, and the order may be changed.

Second Embodiment

Figure 7:
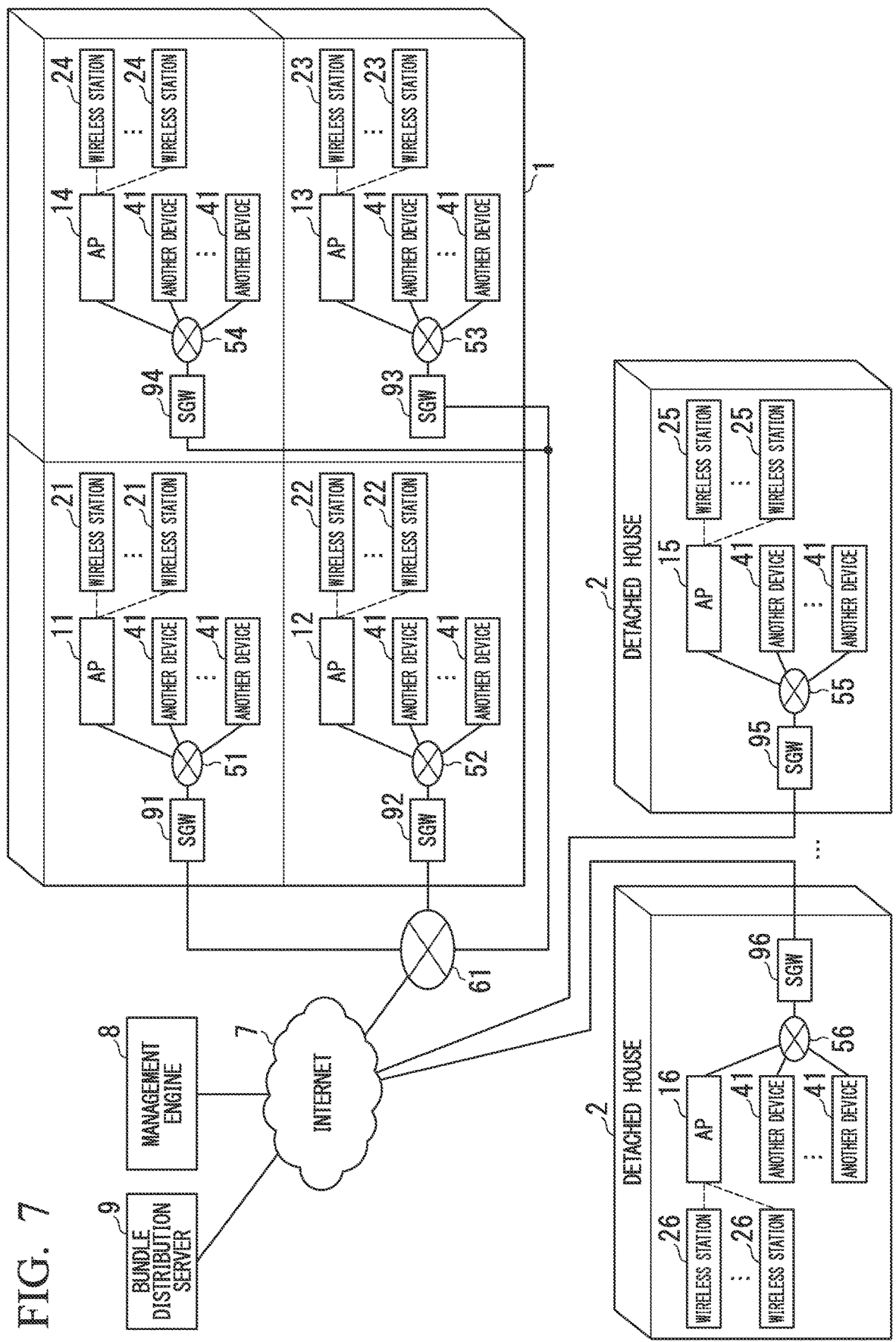
FIG. 7 is a diagram showing a configuration of an entire wireless communication system in accordance with a second embodiment of the present invention.

Next, a wireless communication system in a second embodiment of the present invention will be described. FIG. 7 is a diagram showing a configuration of an entire wireless communication system in accordance with the present embodiment. In FIG. 7, the reference sign 1 indicates a four-household apartment. Reference signs 2 indicate detached houses. Reference signs 11, 12, 13, 14, 15, and 16 indicate access points installed in the households of the apartment 1 and the detached houses. Reference signs 21, 22, 23, 24, 25, and 26 indicate wireless stations that respectively perform wireless communication with the access points 11, 12, 13, 14, 15, and 16 using a wireless LAN protocol of the IEEE802.11 standard. Reference signs 41 indicate other devices connected to networks through cables. Reference signs 51, 52, 53, 54, 55, and 56 indicate networks including a hub or a router. The reference sign 61 indicates an external network. The reference sign 7 indicates the Internet.

The reference sign 8 indicates a management engine (ME) that holds wireless environment information collected from each control target access point, and performs calculation and setting of parameters appropriate for each control target access point based on an appropriate index. The reference sign 9 indicates a bundle distribution server that manages a bundle used for communication with the access points 11, 12, 13, 14, 15, and 16. The bundle is software based on a JAVA (registered trademark; the same applies hereinafter) program that uses hypertext transfer protocol (HTTP), HTTP secure (HTTPS), Telnet, secure shell (SSH), RJ-45, simple network management protocol (SNMP) or a protocol for another external interface that can be supported by an access point and associated wireless stations. The reference signs 91, 92, 93, 94, 95, and 96 indicate service gateways (indicated as SGWs in the drawings). In FIG. 7, differences with the system shown in FIG. 1 are that the service gateways 91, 92, 93, 94, 95, and 96 and the bundle distribution server 9 are provided, the access point 14, the wireless stations 24, the other devices 41, and the network 54 are provided in place of the access point 100, the wireless stations 200, the other devices 401 and the network 500, and the building 3, the external network 62, and the unmanaged network 600 are omitted.

The system shown in FIG. 7 includes: the bundle distribution server 9, which manages the bundle used for communication between the service gateways 91, 92, 93, 94, 95, and 96 and the access points 11, 12, 13, 14, 15, and 16; and the management engine 8, which holds wireless environment information of the access points 11, 12, 13, 14, 15, and 16 collected through the service gateways 91, 92, 93, 94, 95, and 96 and performs calculation and setting of parameters appropriate for the access points 11, 12, 13, 14, 15, and 16 that are control targets based on an appropriate index. The wireless stations 21, 22, 23, 24, 25, and 26 of the households communicate with the access points 11, 12, 13, 14, 15, and 16 using a wireless LAN protocol of the IEEE802.11 standard.

Figure 8:
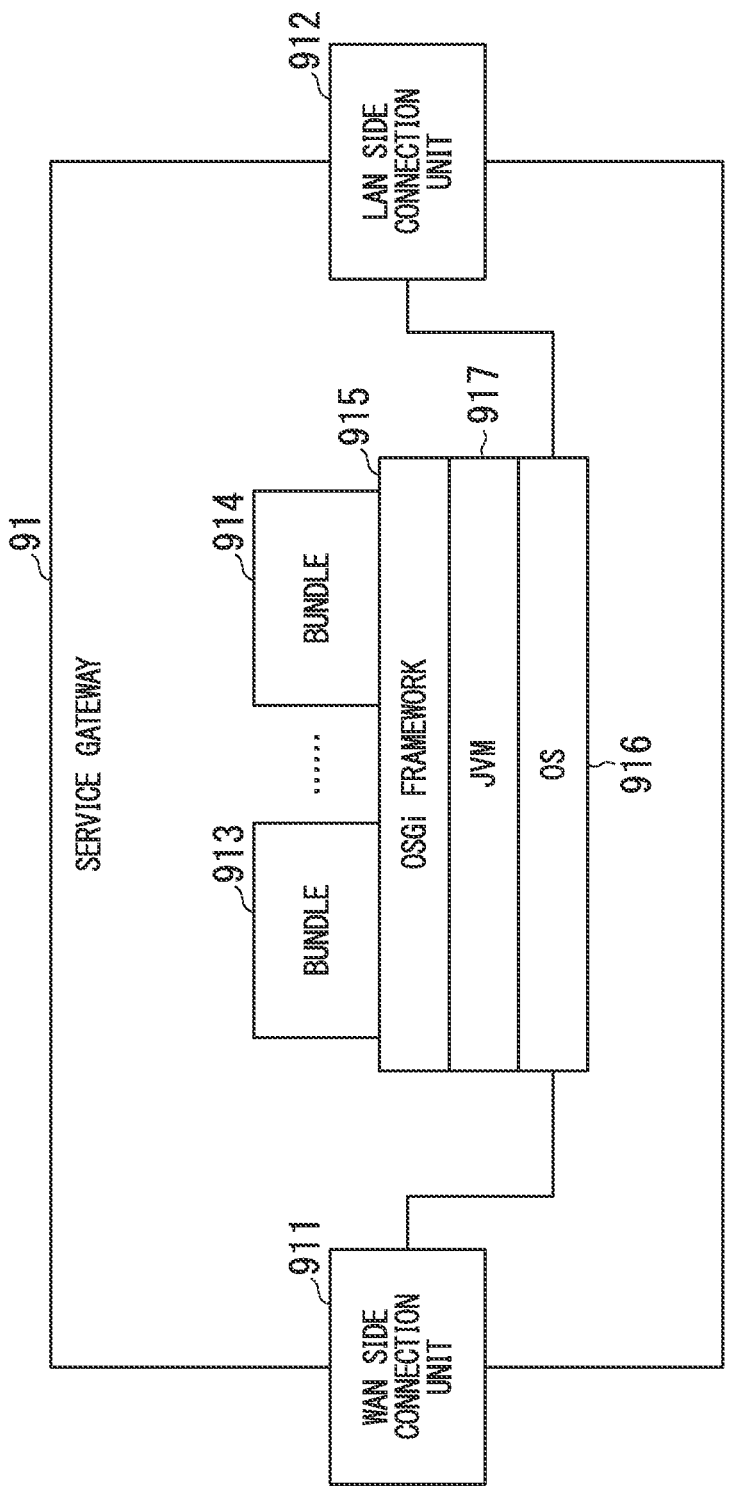
FIG. 8 is a block diagram showing a configuration of a service gateway 91 shown in FIG. 7.

Next, a configuration of the service gateways 91, 92, 93, 94, 95, and 96 shown in FIG. 7 will be described with reference to FIG. 8. Since the service gateways 91, 92, 93, 94, 95, and 96 shown in FIG. 7 have the same configuration, the configuration of the service gateway 91 will be described herein. FIG. 8 is a block diagram showing a configuration of the service gateway 91 shown in FIG. 7. The service gateway 91 is connected through a WAN side connection unit 911 and a LAN side connection unit 912 between a communication network outside a house and a communication network inside the house, and has a function of converting a protocol of data flowing from one of the communication networks to the other communication network.

In the service gateway 91 used herein, a fundamental technology called open services gateway initiative (OSGi) service aggregation platform (OSAP) is implemented in addition to the protocol conversion function.

The OSAP is a service platform that enables distribution and management of various applications and services for all types of devices connected to networks such as those in a house, a car, or a mobile device, and provision of various services that are combinations of functions of the devices, and it is a technology for providing the services by downloading a software component called a bundle over a network. Software that executes the services is configured as software modules 913 and 914 called bundles based on an OSGi standard specification, and operates on an OSGi framework (OSGiFW) 915. As a system architecture, JavaVM (JVM: JAVA virtual machine; JAVA is registered trademark; the same applies hereinafter) 917 operates as one process on an operating system (OS) 916 of a home gateway, and the OSGiFW 915 operates on the JavaVM. A plurality of bundles can be operated on this OSGiFW 915, and services implemented in the bundles are provided by their operations. It is to be noted that a technology regarding such OSGi is one existing technology. Specific technical content is disclosed, for example, in the "OSGi Alliance" (URL: http://www.osgi.org/Specifications/HomePage) or the like.

Figure 9:
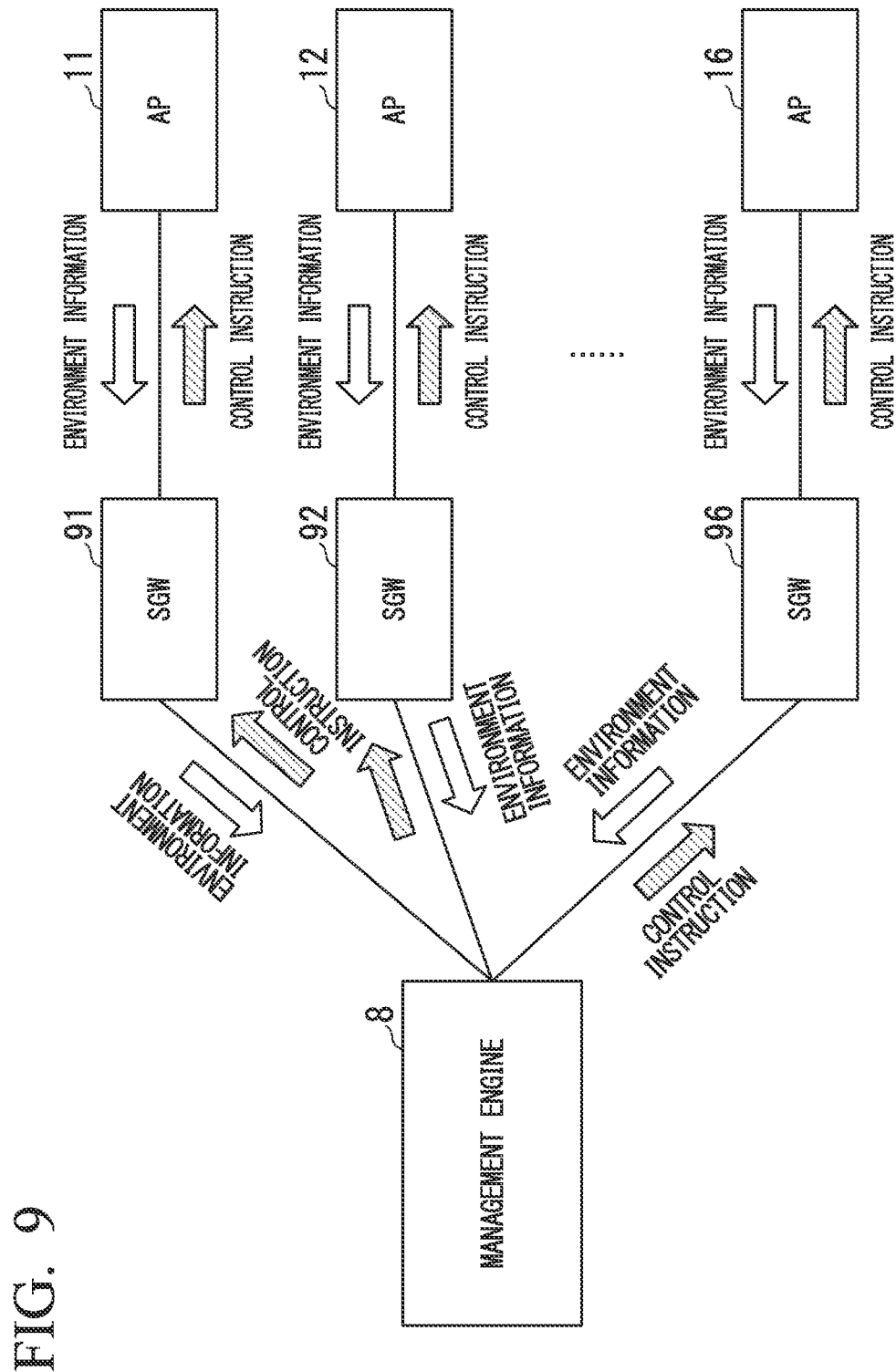
FIG. 9 is a diagram showing a flow of environment information and control instructions among a management engine 8, service gateways 91, 92, 93, 94, 95, and 96, and access points 11, 12, 13, 14, 15, and 16.

Next, information exchanged among the management engine 8, the service gateways 91, 92, 93, 94, 95, and 96, and the access points 11, 12, 13, 14, 15, and 16 shown in FIG. 7 will be described with reference to FIG. 9. FIG. 9 is a diagram showing a flow of environment information and control instructions among the management engine 8, the service gateways 91, 92, 93, 94, 95, and 96, and the access points 11, 12, 13, 14, 15, and 16. The management engine 8 receives the environment information from the access points 11, 12, 13, 14, 15, and 16 through the service gateways 91, 92, 93, 94, 95, and 96, respectively, as shown in FIG. 9. Then, the management engine 8 calculates parameter values to be used by the access points 11, 12, 13, 14, 15 and 16, and transmits the calculated parameter values as control instructions to the access points 11, 12, 13, 14, 15, and 16 via the service gateways 91, 92, 93, 94, 95, and 96. The access points 11, 12, 13, 14, 15, and 16 receive the control instructions and perform their own settings.

Figure 10:
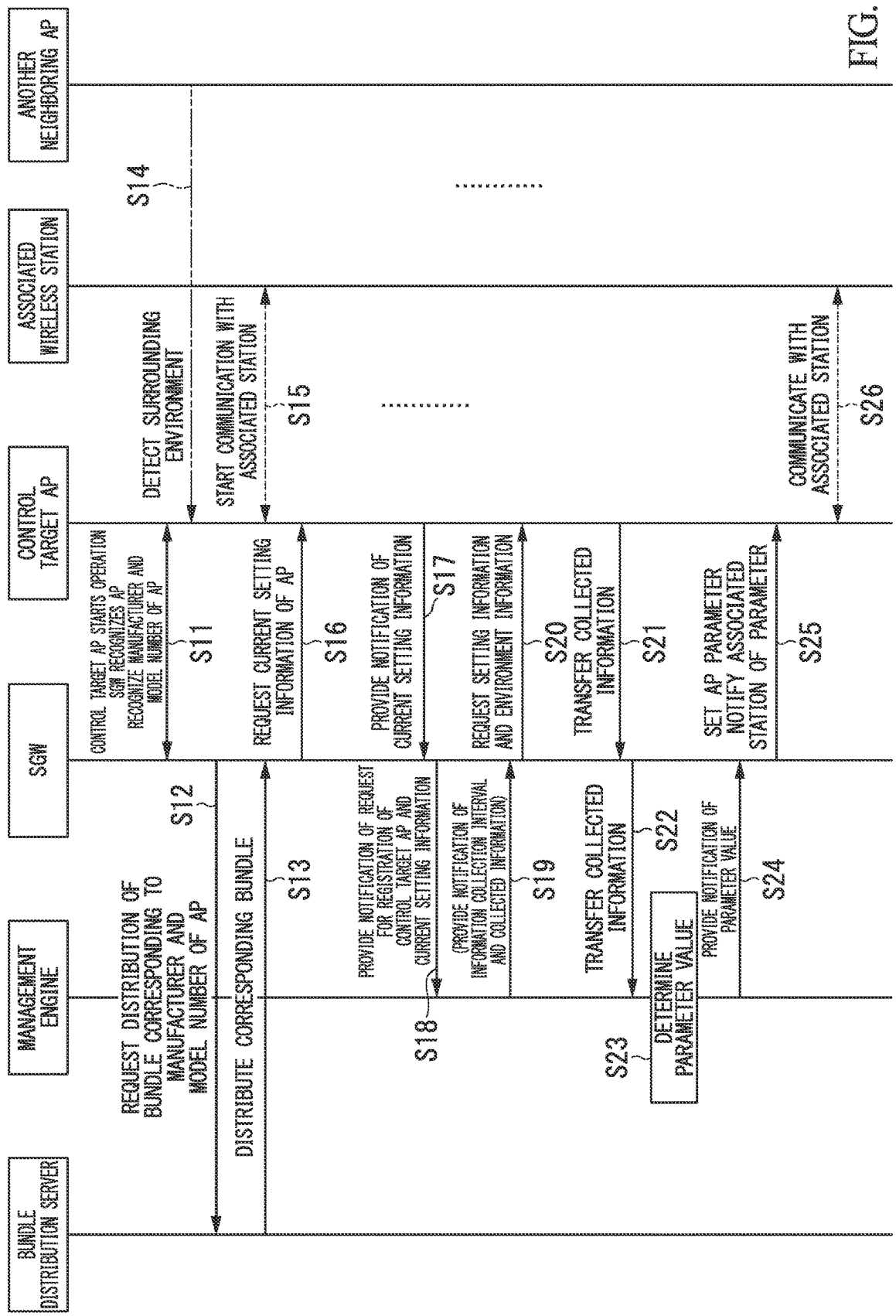
FIG. 10 is a sequence diagram showing an operation of the wireless communication system shown in FIG. 7.

Next, an operation of the wireless communication system shown in FIG. 7 will be described with reference to FIG. 10. FIG. 10 is a sequence diagram showing an operation of the wireless communication system shown in FIG. 7. A description will be given herein in connection with a case in which a user receiving a service newly installs the access point 16 in the detached house 2 and starts an operation. When the access point 16 is installed so as to be associated with the service gateway 96 and its operation is started, the service gateway 96 recognizes presence of the new access point 16 using an OSGi platform (OSAP) and acquires installed device identification information such as a manufacturer and a model number of the access point 16 (step S11). The acquisition of the device identification information is performed using a protocol such a universal plug and play (UPnP) or network basic input output system (NetBIOS). Then, the service gateway 96 transfers the acquired information to the bundle distribution server 9 and requests distribution of a bundle that can communicate with the newly installed access point 16 (step S12).

The bundle distribution server 9 distributes an appropriate bundle corresponding to the information such as the manufacturer, the model number, or a version of firmware of the access point 16 which has been sent from the service gateway 96 among the bundles managed in the server itself to the service gateway 96 (step S13). The service gateway 96 receiving the bundle from the bundle distribution server 9 collects information within the access point 16 and performs a setting of various parameters of the access point 16 using the bundle.

Then, the access point 16 forms a cell (BSS) using a default parameter value of the manufacturer, executes carrier sensing using CSMA/CA (step S14), and communicates with the associated wireless stations 26 (step S15). Further, the access point 16 regularly scans all available frequency channels or currently operated frequency channels over a constant period and holds acquired surrounding wireless environment information. The amount of the acquired surrounding wireless environment information depends on functions of the access point. For example, if communication in both frequency bands of 2.4 GHz and 5 GHz is possible, the access point 16 collects information on each available channel in each frequency band, the number of other access points on each channel, and a reception signal level from each access point. In contrast, if only one of 2.4 GHz band and 5 GHz band is available, the access point 16 collects only the information in that frequency band.

The service gateway 96 accesses an environment information holding interface of the access point 16 via the bundle, and requests the access point 16 that has started the operation to provide current setting information (step S16). In response thereto, the access point 16 notifies the service gateway 96 of the current setting information (step S17).

Then, the service gateway 96 notifies the management engine 8 of a request for registration of the access point 16 that is a control target and the current setting information notified of by the access point 16 (step S18). In this case, information regarding the wireless stations associated with the access point 16, wireless environment information, and information regarding the functions of the access point stored in the environment information holding unit 117 of the access point 16 may also be notified of.

The management engine 8 that has acquired these pieces of information stores the information regarding the access point 16 in the information storage unit 84 of the apparatus itself. Then, the management engine 8 notifies the service gateway 96 of an interval of information collection and information to be collected from the access point 16, as necessary (step S19).

Then, the service gateway 96 regularly requests the environment information holding unit 117 of the access point 16 associated therewith to provide the setting information and the environment information in accordance with the interval of information collection notified of by the management engine 8 or an interval of information collection defined in the bundle (step S20). In response thereto, the service gateway 96 receives collected information transmitted by the access point 16 (step S21), and transfers the collected information to the management engine 8 (step S22).

Even if the interval of information collection and an information transfer interval is not determined, the service gateway 96 collects the information of the access point 16 or transfers the information of the access point 16 to the management engine 8 as necessary, for example, based on a predefined guideline, when a throughput of the access point 16 becomes smaller than or equal to a threshold, when a buffer size of the access point 16 exceeds a threshold, when the number of other access points around the access point 16 exceeds a threshold, or the like.

Then, the parameter calculation unit 86 of the management engine 8 calculates and determines a parameter value to be used by each access point in accordance with a predefined index, based on the information of the access point sent from each service gateway connected to a network that is a management target, regularly or in accordance with a predefined guideline, with reference to the information stored in the setting information storage unit 88 and the performance database 89 (step S23). For example, when the information to be collected is the wireless environment information such as the number of neighboring access points operated on a frequency channel, a level of a received reception signal, and a time occupation rate of the channel, the parameter calculation unit 86 calculates the parameter so that the frequency utilization efficiency is improved in each access point based on the wireless environment information. Then, the parameter calculation unit 86 notifies the service gateway 96 of the determined parameter value (step S24) to be reflected in each access point (step S25). In response thereto, the parameter setting unit 116 of the access point 16 performs a setting based on this parameter value. Then, the access point 16 performs communication with the associated wireless stations 26 based on the parameter value designated by the management engine 8 (step S26).

It is to be noted that the parameter calculation and the parameter setting are performed on all access points that are targets of the management engine 8.

Third Embodiment

Next, a wireless communication system in a third embodiment of the present invention will be described. An entire configuration of the wireless communication system in the third embodiment is the same as the configuration shown in FIG. 7. In the third embodiment, a management engine 8 collects wireless environment information detected in not only an access point but also a wireless station associated with the access point, calculates appropriate parameter values for each access point and a wireless station associated with each access point, and performs a setting.

Figure 11:
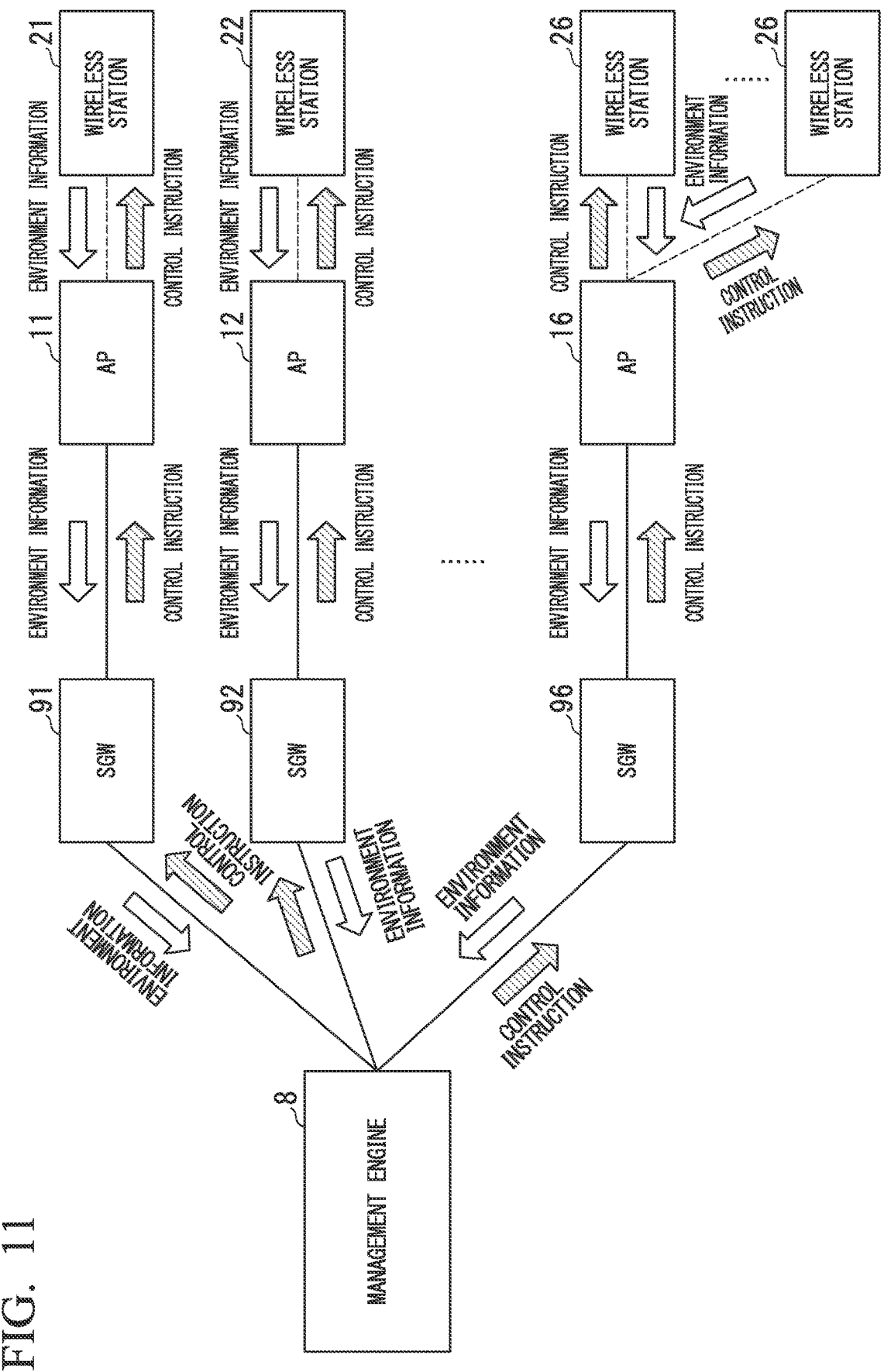
FIG. 11 is a diagram showing a flow of environment information and control instructions exchanged among a management engine 8, service gateways 91, 92, 93, 94, 95 and 96, access points 11, 12, 13, 14, 15, and 16, and wireless stations 21, 22, 23, 24, 25, and 26 shown in FIG. 7.

Next, information exchanged among the management engine 8, the service gateways 91, 92, 93, 94, 95, and 96, the access points 11, 12, 13, 14, 15 and 16, and the wireless stations 21, 22, 23, 24, 25, and 26 shown in FIG. 7 will be described with reference to FIG. 11. FIG. 11 is a diagram showing a flow of environment information and control instructions exchanged among the management engine 8, the service gateways 91, 92, 93, 94, 95, and 96, the access points 11, 12, 13, 14, 15, and 16, and the wireless stations 21, 22, 23, 24, 25, and 26 shown in FIG. 7. The management engine 8 receives the environment information from the wireless stations 21, 22, 23, 24, 25, and 26 via the service gateways 91, 92, 93, 94, 95, and 96 and the access points 11, 12, 13, 14, 15, and 16, as shown in FIG. 11. Then, the management engine 8 calculates parameter values to be used by the access points 11, 12, 13, 14, 15, and 16 and the wireless stations 21, 22, 23, 24, 25, and 26, and transmits the calculated parameter values as control instructions to the access points 11, 12, 13, 14, 15, and 16 and the wireless stations 21, 22, 23, 24, 25, and 26 via the service gateways 91, 92, 93, 94, 95, and 96. The access points 11, 12, 13, 14, 15 and 16 and the wireless stations 21, 22, 23, 24, 25, and 26 receive these control instructions and perform their own settings.

Next, control instruction information from the management engine 8 to the wireless stations 21, 22, 23, 24, 25, and 26 will be described. Details of the control instruction information are as follows.

Figure 12:
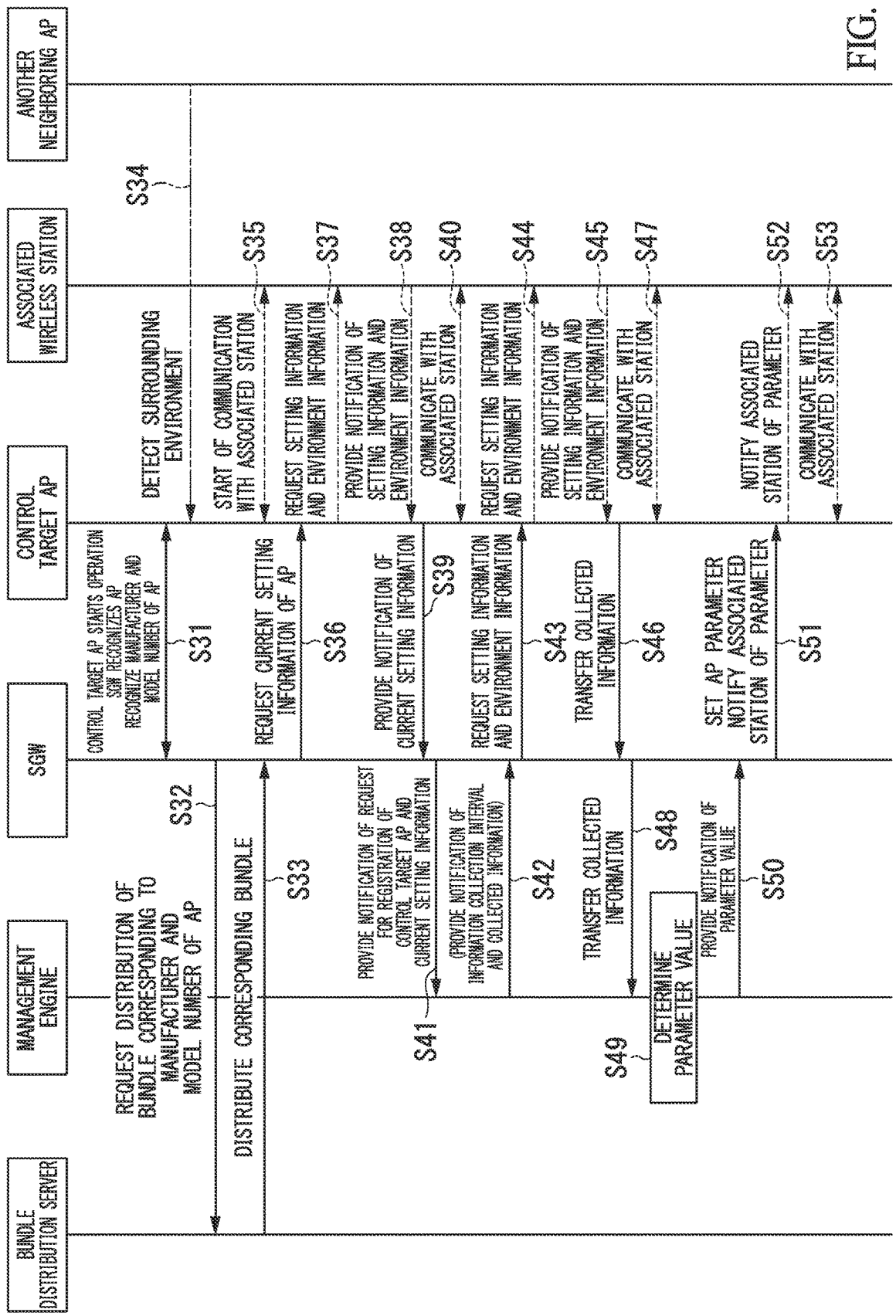
FIG. 12 is a sequence diagram showing an operation of a wireless communication system in accordance with a third embodiment.

Transmission power value to be used
CCA value to be used
Data rate and MCS to be used
Tilt angle to be used
Antenna to be used
Information regarding use of OFDMA and MU-MIMO
RTS threshold value
BSSBasicRateSet value
Sleep mode
Parameters regarding CSMA/CA (CWmin, CWmax, AIFSN, and TXOP)
Parameter regarding QoS
Aggregation Next, an operation of the wireless communication system in accordance with the third embodiment will be described with reference to FIG. 12. FIG. 12 is a sequence diagram showing an operation of the wireless communication system in accordance with the third embodiment. Here, a description will be given in connection with a case in which a user receiving a service newly installs the access point 16 in the detached house 2 and starts an operation. When the access point 16 is installed so as to be associated with the service gateway 96 and its operation is started, the service gateway 96 recognizes presence of the new access point 16 using an OSGi platform (OSAP) and acquires installed device identification information such as a manufacturer and a model number of the access point 16 (step S31). The acquisition of the device identification information is performed using a protocol such as universal plug and play (UPnP) or network basic input output system (NetBIOS). Then, the service gateway 96 transfers the acquired information to the bundle distribution server 9 to request distribution of a bundle that can perform communication with the newly installed access point 16 (step S32).

The bundle distribution server 9 distributes an appropriate bundle corresponding to the information such as the manufacturer, the model number, or the version of firmware of the access point 16 which has been sent from the service gateway 96 among the bundles managed in the server itself to the service gateway 96 (step S33). Using the bundle, the service gateway 96 receiving the bundle from the bundle distribution server 9 collects information within the access point 16, requests the access point 16 to collect information of the associated wireless stations 26, and performs a setting of various parameters of the access point 16 and the wireless stations 26 associated therewith.

Then, the access point 16 forms a cell (BSS) using a default parameter value of the manufacturer, executes carrier sensing using CSMA/CA (step S34), and performs communication with the associated wireless stations (step S35). Further, the access point 16 regularly scans all available frequency channels or currently operated frequency channels over a constant period and holds acquired surrounding wireless environment information. The amount of the acquired surrounding wireless environment information depends on functions of the access point. For example, if communication in both frequency bands of 2.4 GHz and 5 GHz is possible, the access point 16 collects information on each channel available in each frequency band, such as the number of other access points on each channel, and a reception signal level from each access point. In contrast, if only any one of the 2.4 GHz band and the 5 GHz band is available, the access point 16 collects only information in that frequency band.

The service gateway 96 accesses the environment information holding interface of the access point 16 via the bundle, and requests the access point 16 that has started the operation to provide current setting information (step S36). Further, the service gateway 96 requests the access point 16 to collect environment information in the associated wireless stations 26 (step S37). For example, the access point 16 requests the associated wireless stations 26 to collect the environment information by transmitting a frame such as an Action frame. In response thereto, the wireless stations 26 notify the access point 16 of the setting information and the environment information (step S38). The access point 16 notifies the service gateway 96 of the setting information and the environment information notified of by the wireless stations 26, and the current setting information of the access point 16 itself (step S39). Then, the access point 16 performs communication with the wireless stations 26 (step S40).

Then, the service gateway 96 notifies the management engine 8 of a request for registration of the access point 16 that is a control target, the current setting information notified of by the access point 16, and the setting information and the environment information notified of by the wireless stations 26 (step S41).

The management engine 8 that has acquired these pieces of information stores the information regarding the access point 16 and the associated wireless stations 26 in the information storage unit 84 of the apparatus itself. Then, the management engine 8 notifies the service gateway 96 of an interval of information collection and information to be collected in the access point 16, as necessary (step S42).

Then, the service gateway 96 requests the environment information holding unit 117 of the associated access point 16 to provide the setting information and the environment information regularly at the interval of information collection notified of by the management engine 8 or an interval of information collection defined in the bundle (step S43). Then, the access point 16 requests the associated wireless stations 26 to provide the setting information and the environment information (step S44). In response thereto, the associated wireless stations 26 notify the access point 16 of the setting information and the environment information (step S45).

Then, the access point 16 transfers collected information to the service gateway 96 (step S46). Then, the access point 16 performs communication with the associated wireless stations 26 (step S47). Subsequently, the service gateway 96 further transfers the collected information transferred from the access point 16 to the management engine 8 (step S48).

Even if the interval of information collection or an information transfer interval is not determined, the service gateway 96 collects the information of the access point 16 or transfers the information of the access point 16 to the management engine 8, as necessary based on a predefined guideline, for example, when a throughput of the access point 16 becomes smaller than or equal to a threshold, when a buffer size of the access point 16 exceeds a threshold, or when the number of other access points around the access point 16 exceeds a threshold.

Then, the parameter calculation unit 86 of the management engine 8 calculates and determines parameter values to be used by each access point and the associated wireless stations in accordance with a predefined index, based on the information of the access point and the associated wireless stations sent from each service gateway connected to a network that is a management target, regularly or in accordance with a predefined guideline, with reference to the information stored in the setting information storage unit 88 and the performance database 89 (step S49). For example, when the information to be collected is wireless environment information such as the number of neighboring access points operated on a frequency channel, a level of a received reception signal, and a time occupation rate of the channel, the parameter calculation unit 86 calculates parameters so that the frequency utilization efficiency is improved in each access point based on the wireless environment information. Then, the parameter calculation unit 86 notifies the service gateway 96 of the determined parameter value (step S50) to be reflected in each access point (step S51).

Further, the access point 16 notifies the associated wireless stations 26 of the determined parameter (step S52) to be reflected in each wireless station. In response thereto, the parameter setting unit 116 of the access point 16 performs setting based on the parameter value. Further, the wireless station 26 performs setting based on the parameter value. Then, the access point 16 performs communication with the associated wireless stations 26 based on the parameter value designated by the management engine 8 (step S53).

Fourth Embodiment

Next, a wireless communication system in a fourth embodiment of the present invention will be described. In the fourth embodiment, setting information and environment information notified of by an access point and associated wireless stations are stored in a different place in a network, rather than in the management engine 8. The management engine 8 regularly calculates appropriate parameter values in each wireless LAN access point and associated wireless stations based on the information stored in the network in this way, and performs setting.

Figure 13:
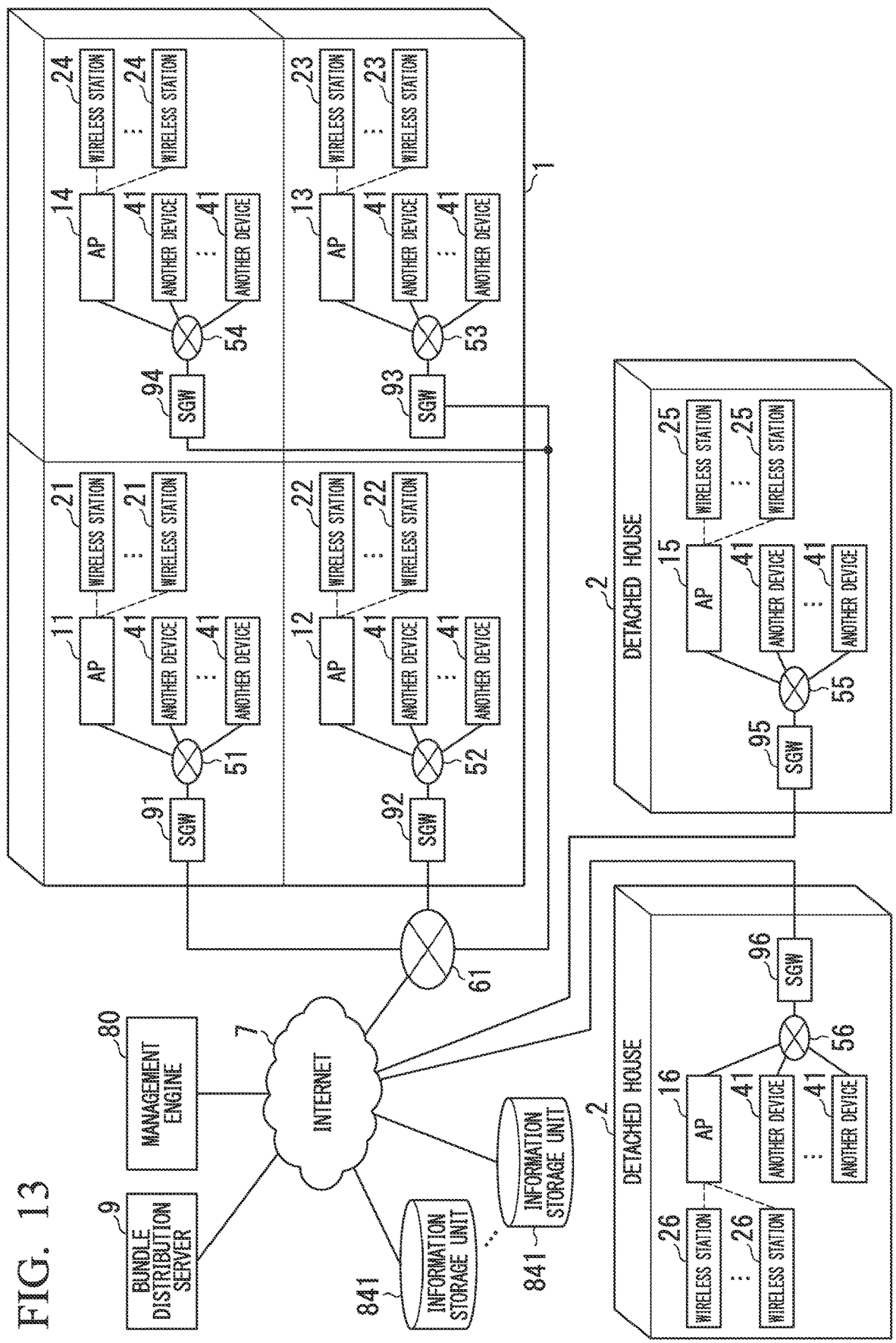
FIG. 13 is a diagram showing an entire configuration of a wireless communication system in accordance with a fourth embodiment.

FIG. 13 is a diagram showing an entire configuration of the wireless communication system in accordance with the fourth embodiment. In FIG. 13, the same units as those of the system shown in FIG. 7 are denoted with the same reference signs and a description thereof will be omitted. Differences between the system shown in FIG. 13 and the system shows in FIG. 7 are that a management engine 80 which does not include the information storage unit 84 (see FIG. 2) therein is included, and information storage units 841 corresponding to the information storage unit 84, which stores the setting information and the environment information notified of by the access point and the associated wireless stations, are provided in different places on the network to which the management engine 80 is connected. Thus, it is possible to reduce a processing load of the management engine 80 by providing the plurality of divided information storage units 841.

It is to be noted that the wireless communication system shown in FIG. 13 is different from the wireless communication system shown in FIG. 7 in terms of only places in which the information storage units 841 are provided, and a processing operation is the same as the processing operation of the wireless communication system shown in FIG. 7, and thus a detailed description thereof will be omitted here.

Further, the above description assumes that an appropriate parameter can be set from the network side for any wireless LAN access point connected to the network regardless of a manufacturer, a type, and the like using an OSGi service aggregation platform (OSAP). However, it is not always necessary to use the OSAP and control the wireless LAN access point through the service gateway, and a management engine (ME) or an interference management engine (IME) on the network may use any communication means for information collection from the wireless LAN access point, and control.

In the present system, the management engine on the network side can communicate with wireless LAN access points of different model numbers and different manufacturers through software called a bundle. Accordingly, it is possible to prevent local throughput degradation in an environment in which wireless LAN access points aggregate densely and to improve frequency utilization efficiency of the wireless LAN system by setting, in each wireless LAN access point, an appropriate parameter value of each wireless LAN access point determined by the management engine. Therefore, it is possible to realize a network-controlled wireless communication system in which an appropriate parameter can be set from the network side for any wireless LAN access point connected to the network regardless of a manufacturer, a type, and the like. By using the present system, it is possible to optimize a large number of parameters of each wireless LAN access point such as a used frequency channel, a transmission power value, an access parameter value, and a QoS parameter value, so as to improve the frequency utilization efficiency of the entire system.

Fifth Embodiment

Figure 14:
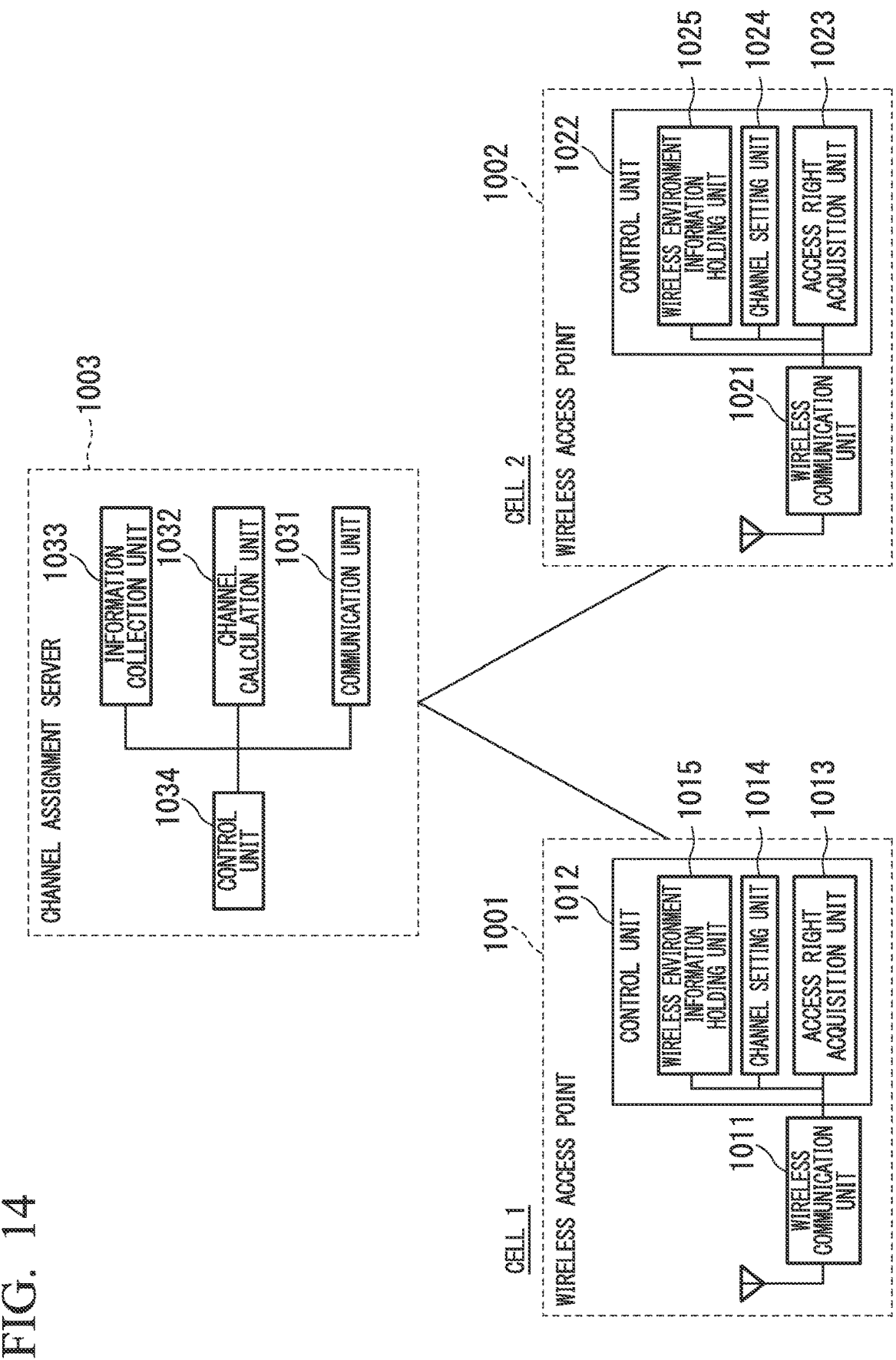
FIG. 14 is a block diagram showing a configuration of a wireless communication system in a fifth embodiment of the present invention.

Hereinafter, a wireless communication system and a channel selection method in a fifth embodiment of the present invention will be described with reference to the drawings. FIG. 14 is a block diagram showing a configuration of the wireless communication system in the present embodiment. Wireless access points 1001 and 1002 are, for example, access points of a wireless LAN, and perform wireless communication with a wireless station apparatus, which is not shown, using a channel (frequency band) notified of by a channel assignment server 1003.

The wireless access point 1001 includes a wireless communication unit 1011 and a control unit 1012. The control unit 1012 includes an access right acquisition unit 1013 that acquires an access right, a channel setting unit 1014 that sets a channel notified of by the channel assignment server 1003, and a wireless environment information holding unit 1015 that holds wireless environment information. The wireless communication unit 1011 performs wireless communication with the wireless station apparatus using the channel set by the channel setting unit 1014. For example, the wireless communication unit 1011 performs the wireless communication using access control based on CSMA/CA. Further, the wireless communication unit 1011 scans all channels available in the wireless communication during a predetermined period and outputs a scanned result to the wireless environment information holding unit 1015.

The wireless access point 1002 includes a wireless communication unit 1021 and a control unit 1022. The control unit 1022 includes an access right acquisition unit 1023 that acquires an access right, a channel setting unit 1024 that sets a channel notified of by the channel assignment server 1003, and a wireless environment information holding unit 1025 that holds wireless environment information. The wireless communication unit 1021 performs wireless communication with the wireless station apparatus using the channel set by the channel setting unit 1024. For example, the wireless communication unit 1021 performs the wireless communication using access control based on CSMA/CA. Further, the wireless communication unit 1021 scans all channels available in the wireless communication during a predetermined period and outputs a scanned result to the wireless environment information holding unit 1025.

The channel assignment server 1003 includes a communication unit 1031, a channel calculation unit 1032, an information collection unit 1033, and a control unit 1034. The communication unit 1031 communicates with the wireless access points 1001 and 1002. The channel calculation unit 1032 calculates a channel to be used by each of the wireless access points 1001 and 1002 based on information held in the information collection unit 1033. The information collection unit 1033 collects the wireless environment information of the wireless access points 1001 and 1002 that are control targets of channel assignment in the system. The control unit 1034 is a control unit that performs centralized control of an operation of the channel assignment server.

Next, an operation of the wireless communication system shown in FIG. 14 will be described. First, when the operation of the wireless access point 1001 starts, the wireless communication unit 1011 scans all channels available in wireless communication during a predetermined period at predetermined time intervals and outputs wireless environment information around the wireless access point itself to the wireless environment information holding unit 1015. This wireless environment information includes the number of other wireless access points in each available channel, identification information of each wireless access point, received signal strength (RSSI value: received signal strength indicator) of a signal such as a beacon received from each wireless access point, a channel use rate per unit time, and the like. Further, the wireless environment information also includes the number of wireless station apparatuses in its own cell, an RSSI value of a signal received from each wireless station apparatus, and the like.

Then, the channel calculation unit 1032 calculates a wireless channel to be used by each wireless access point based on the wireless environment information of each wireless access point collected from the information collection unit 1033 as follows. First, a U value shown in Expression (1) on all channels available in a wireless access point to which a channel is to be assigned is calculated.

$$U = 1 - \text{Total medium use rate on channel} \quad (1)$$

Here, the total medium use rate is a rate at which the wireless apparatuses (another wireless access point and a wireless station apparatus outside its own cell) other than the wireless access point itself use the wireless channel in a unit time.

The U value is a value indicating a time rate that can be occupied in the wireless access point to which the channel is to be assigned. If a channel having a longest time U that can be occupied in the wireless access point to which the channel is to be assigned is selected, it can be predicted that the acquired throughput is maximized, and thus the channel calculation unit 1032 calculates a channel in which the U value is maximized as a temporary channel of the wireless access point.

After determining temporary channels of all the wireless access points that are control targets of the system, the channel calculation unit 1032 calculates a total value $U_{total}$ of U values of all the wireless access points. Then, improvement of the throughput of a wireless access point having a minimum medium occupation time is aimed at. After the temporary channels of all the wireless access points are determined, a wireless access point of which the U value is smaller than or equal to a predetermined threshold is selected, and it is checked whether there is no other channel in which the U value of the wireless access point is greater than a current value.

Specifically, the U values are calculated again on all channels available in the wireless access point, one channel in which the U value is greater than the current value is calculated, a total U value of all the wireless access points that are control targets in the system is calculated, and it is checked whether the total U value is not smaller than a current total U value. If the total U value of the system does not fall below the current total U value even when the wireless access point uses the newly selected channel, the newly selected channel is determined as a new temporary channel of the wireless access point. Then, a channel is selected once again to improve the U value of a wireless access point having a minimum U value.

It is possible to improve the total throughput of the system and improve fairness of the throughputs between cells by executing the operation of selecting the channel so that the U value of the wireless access point having the minimum U value is improved a predetermined number of times (the number of recursions Max_r) in this manner. The operation is repeated the predetermined number of times Max_r, and a new temporary channel is finally reflected in each wireless access point.

Figure 15:
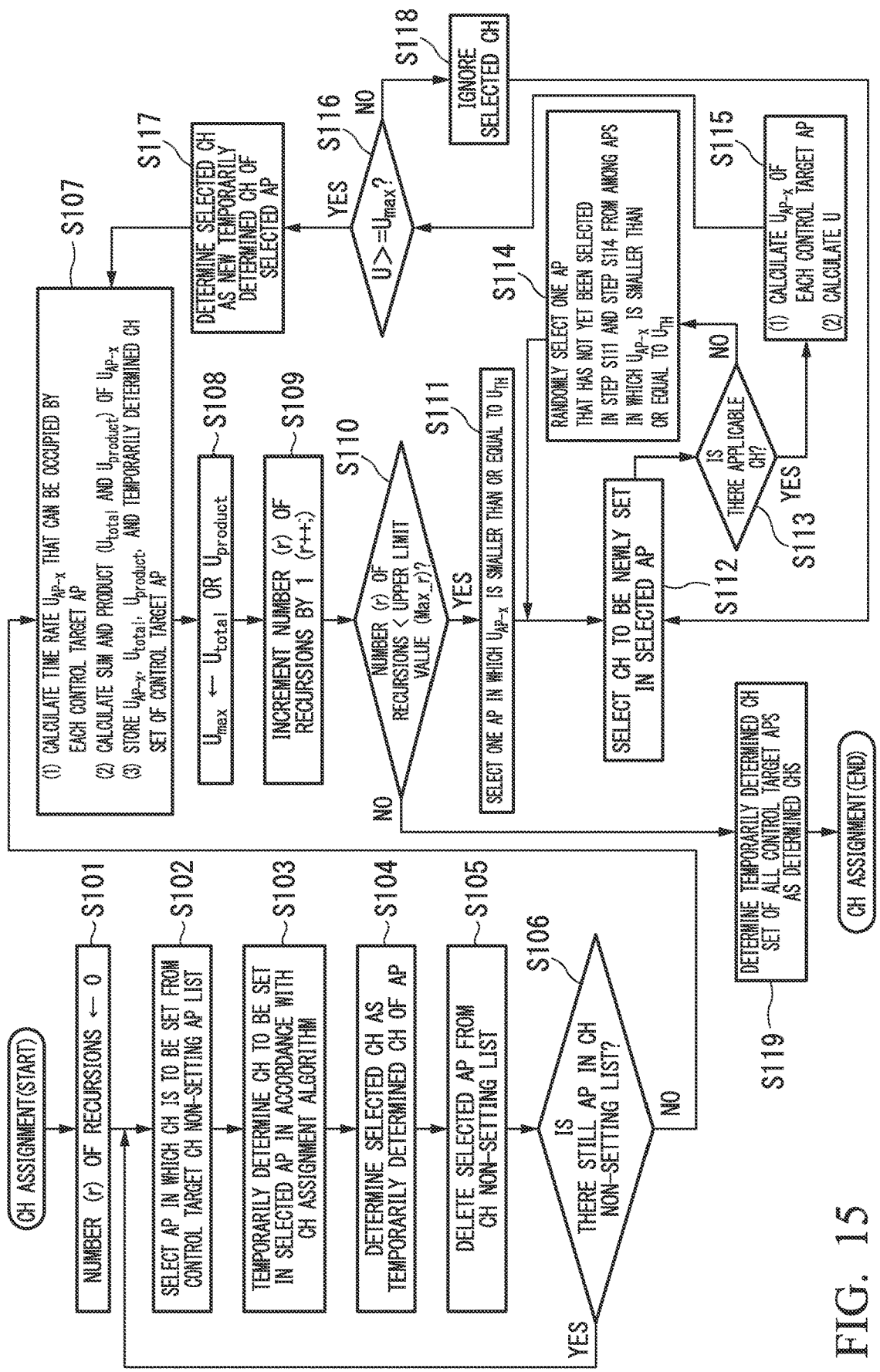
FIG. 15 is a flowchart showing a basic operation of a channel assignment process of assigning a channel to each wireless access point in the fifth embodiment.
Figure 16:
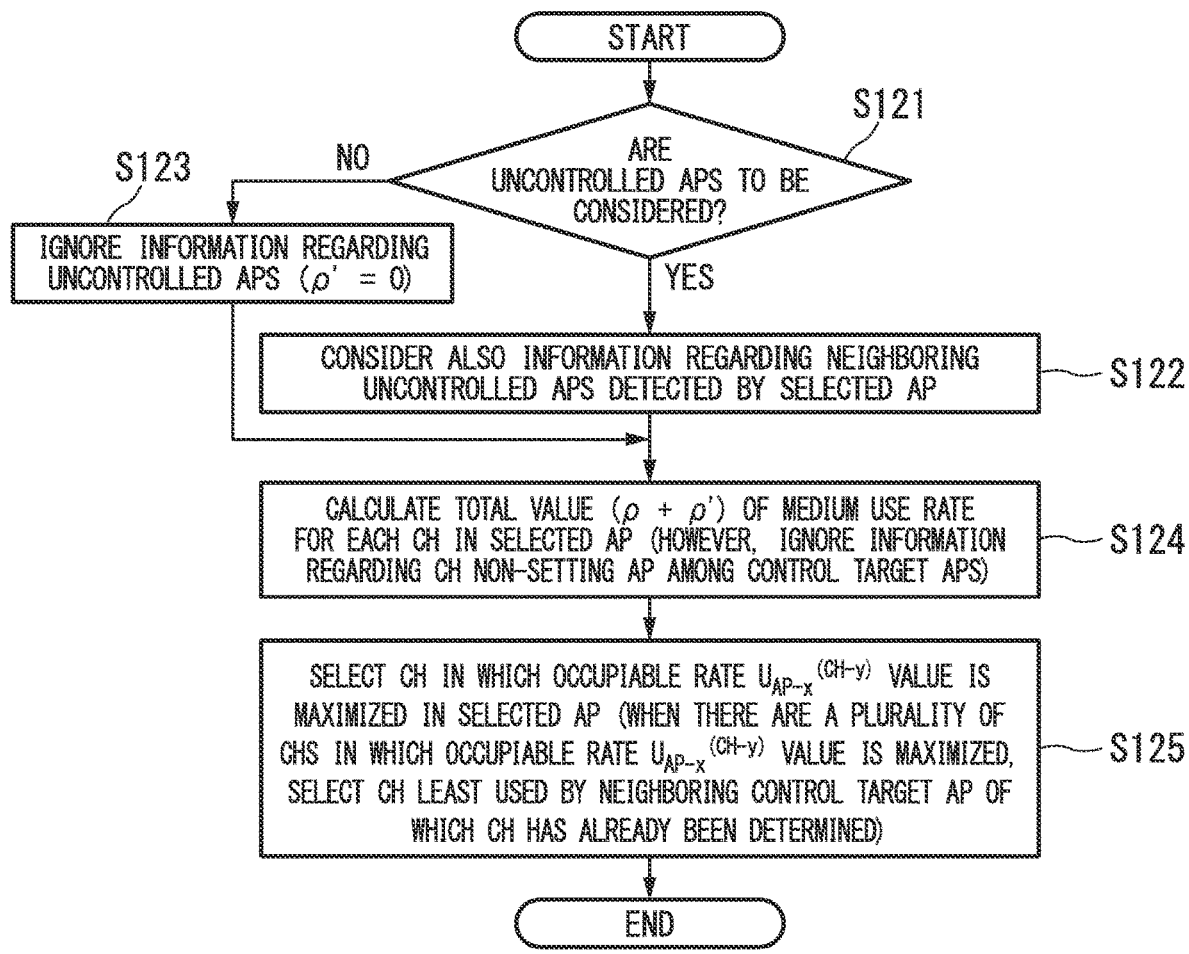
FIG. 16 is a flowchart showing an operation of calculating a channel in which a U value is maximized as a temporarily determined channel when a channel is assigned to each wireless access point in the fifth embodiment.

Next, an operation in which the channel calculation unit 1032 shown in FIG. 14 performs a channel selection process will be described with reference to FIGS. 15 and 16. FIGS. 15 and 16 are flowcharts showing the operation in which the channel calculation unit 1032 shown in FIG. 14 performs the channel selection process.

First, 0 is substituted into the number (r) of recursions (step S101). Then, a wireless access point in which a channel (hereinafter indicated as CH in the drawings) is to be set is selected from a control target channel non-setting wireless access point list (hereinafter, sometimes abbreviated as "channel non-setting list") (step S102). In this case, as a method for selecting the wireless access point, a method for randomly selecting a wireless access point, a method for selecting a wireless access point in a manually set order (an order of priority described in an extensible markup language (XML) file), or a method for selecting a wireless access point in an order of wireless access points having a larger bottleneck (descending order of the number of neighboring wireless access points) can be applied. Then, the channel to be set for the selected wireless access point is temporarily determined in accordance with a channel assignment algorithm (step S103).

Then, the selected channel is determined as a temporarily determined channel of the wireless access point (step S104), and the selected wireless access point is deleted from the channel non-setting list (step S105). Then, it is determined whether there is still a wireless access point in the channel non-setting list (step S106), and if there is a wireless access point in the channel non-setting list, the process returns to step S102 to repeat the processing.

In contrast, if there is no remaining wireless access point in the channel non-setting list, a time rate $U_{AP-x}$ that can be occupied by each control target wireless access point, and a sum and a product ($U_{total}$ and $U_{product}$) of $U_{AP-x}$ are calculated and $U_{AP-x}$, $U_{total}$, $U_{product}$ and a temporarily determined channel set of control target wireless access points are stored (step S107). Then, $U_{total}$ or $U_{product}$ is substituted into $U_{max}$ (step S108). Then, the number (r) of recursions is incremented by 1 (r++;) (step S109). It is to be noted that which of $U_{total}$ and $U_{product}$ is substituted into $U_{max}$ can be determined based on, for example, an operation guideline of a network. Specifically, $U_{product}$ can be adopted in a system aiming at improvement of the lower throughput, and $U_{total}$ can be adopted in a system aiming at the improvement of the total throughput of the entire system.

Then, it is determined whether a condition of the number (r) of recursions<upper limit value (Max_r) is satisfied (step S110), and if the condition is satisfied, one wireless access point in which $U_{AP-x}$ is smaller than or equal to a predetermined threshold $U_{TH}$ is selected (step S111). It is to be noted that $U_{TH}$ is a value greater than or equal to 0 and smaller than or equal to 1. Subsequently, a channel to be newly set in the selected wireless access point is selected (step S112). Then, it is determined whether the channel exists (step S113). If the result of this determination indicates that the channel does not exist, one wireless access point that has not yet been selected in step S111 and step S114 among wireless access points in which $U_{AP-x}$ is smaller than or equal to $U_{TH}$ is randomly selected in step S114, and the process returns to step S112.

In contrast, if the channel exists, $U_{AP-x}$ of each control target wireless access point and a U value are calculated (step S115). Then, it is determined whether $U \geq U_{max}$ is satisfied (step S116). If the result of this determination indicates that $U \geq U_{max}$ is satisfied, the selected channel is determined as a new temporarily determined channel of the selected wireless access point (step S117), and the process returns to step S107. In contrast, if $U \geq U_{max}$ is not satisfied, the selected channel is ignored (step S118) and the process returns to step S112.

Then, if the number (r) of recursions<upper limit value (Max_r) is not satisfied in step S110, a temporarily determined channel set of all control target wireless access points is set as determined channels and the process ends (step S119).

Next, details of a processing operation of steps S103 and S112 shown in FIG. 15 will be described with reference to FIG. 16. FIG. 16 is a flowchart showing the details of the processing operation of steps S103 and S112 shown in FIG. 15.

First, it is determined whether uncontrolled wireless access points are to be considered (step S121). If the result of this determination indicates that the uncontrolled wireless access points are to be considered, information regarding neighboring uncontrolled wireless access points that have been detected by the selected wireless access point (hereinafter referred to as "detectable neighboring uncontrolled wireless access points") is also considered (step S122). In contrast, if the uncontrolled wireless access points are not to be considered, the information regarding the uncontrolled wireless access points is ignored (ρ'=0; step S123). Here, ρ' is a total medium occupation time rate for each channel of the detectable neighboring uncontrolled wireless access points in the selected control target wireless access point.

Then, a total value (ρ+ρ') of the medium use rate for each channel is calculated in the selected wireless access point (step S124). However, information regarding the channel non-setting wireless access points among the control target wireless access points is ignored. Here, ρ is a medium occupation time rate for each channel of a control target wireless access point of which the temporary channel has already been determined among other detectable control target wireless access points in the selected control target wireless access point.

Then, a channel in which an occupiable rate $U_{AP-x}^{(CH-y)}$ value is maximized in the selected wireless access point is selected (step S125). If there are a plurality of channels in which the occupiable rate $U_{AP-x}^{(CH-y)}$ value is maximized, a channel least used by neighboring control target wireless access points of which channels have already been determined is selected.

Figure 17:
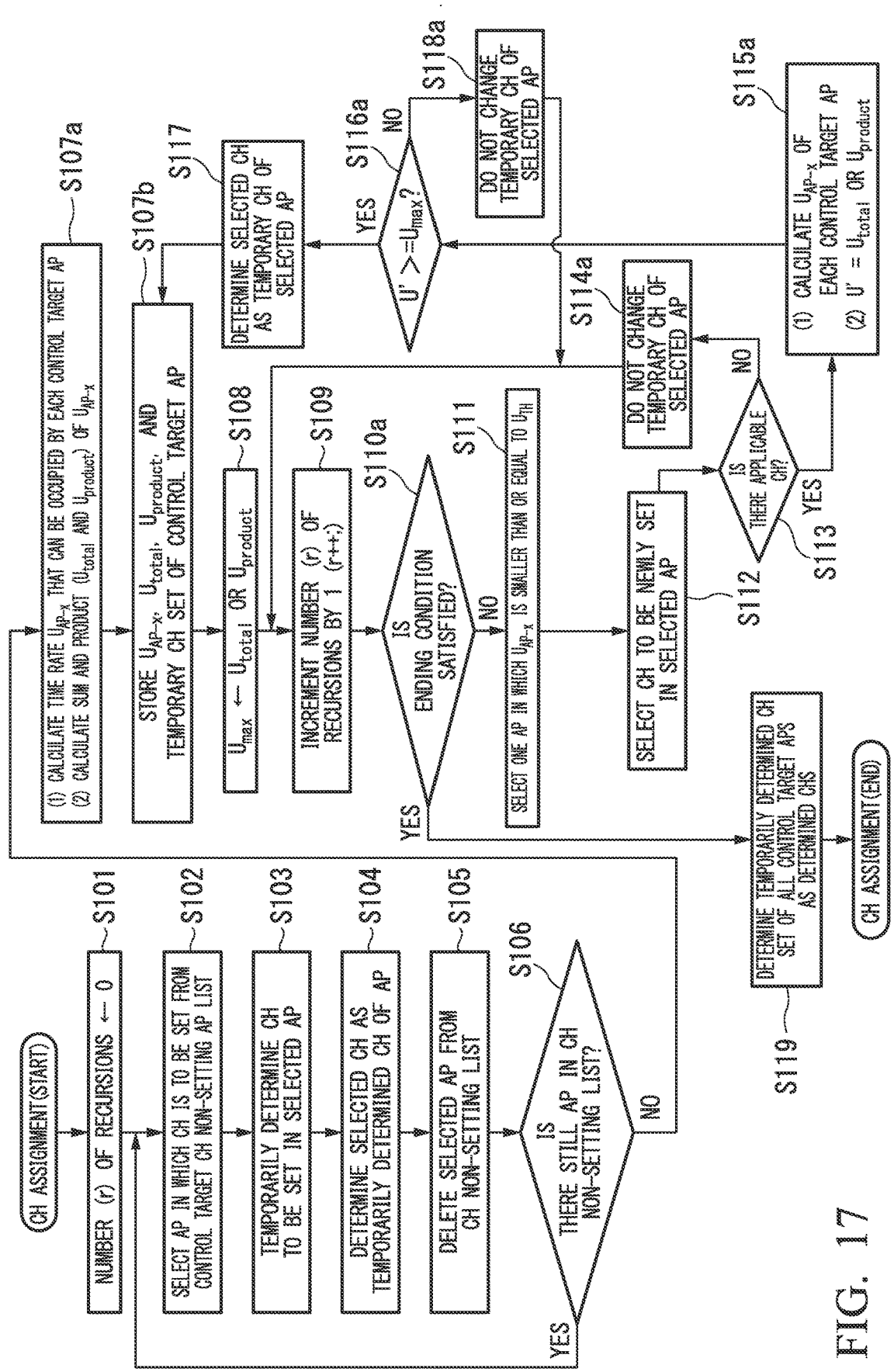
FIG. 17 is a flowchart showing a modification example of a processing operation shown in FIG. 15.

Next, a modification example of the processing operation shown in FIG. 15 will be described with reference to FIG. 17. In FIG. 17, the same processing operations as the processing operations shown in FIG. 15 are denoted with the same reference signs, and a description thereof will be briefly given.

First, 0 is substituted into the number (r) of recursions (step S101). Then, a wireless access point of which a channel is to be set is selected from a control target channel non-setting wireless access point list (step S102). In this case, a method for selecting the wireless access point includes, for example, a method for randomly selecting a wireless access point, a method for selecting a wireless access point in accordance with a previously set order, a method for selecting a wireless access point in descending order of the number of neighboring wireless access points, and a method for selecting a wireless access point in ascending order of a time rate occupiable by the channel. In the present system, a channel to be set in the selected wireless access point is temporarily determined using any one of the methods (step S103).

Then, the selected channel is determined to be a temporarily determined channel of the wireless access point (step S104), and the selected wireless access point is deleted from the channel non-setting list (step S105). Then, it is determined whether there is still a wireless access point in the channel non-setting list (step S106), and if there is a wireless access point in the channel non-setting list, the process returns to step S102 to repeat the processing.

In contrast, if there is no remaining wireless access point in the channel non-setting list, an occupiable time rate $U_{AP-x}$ of each control target wireless access point, and a sum and a product ($U_{total}$ and $U_{product}$) of $U_{AP-x}$ are calculated (step S107a). Further, $U_{AP-x}$, $U_{total}$, $U_{product}$, and a temporary channel set of the control target wireless access point are stored (step S107b). Then, $U_{total}$ or $U_{product}$ is substituted into $U_{max}$ (step S108). Then, the number (r) of recursions is incremented by 1 (r++;) (step S109).

Then, it is determined whether an ending condition of the process is satisfied (step S110a). If the ending condition is not satisfied, a wireless access point of which $U_{AP-x}$ is smaller than or equal to a predetermined threshold $U_{TH}$ is selected (step S111). In this case, with respect to the ending condition in step S110a, the ending condition is regarded as being satisfied when at least one of the conditions that (1) U values of all wireless access points be 1, (2) the number (r) of recursions reach an upper limit value (Max_r), and (3) a previously set convergence condition be satisfied is satisfied. Further, with respect to (3) the previously set convergence condition, if an improved percentage of an evaluation value of the following (A) to (D) after the $r^{th}$ iterative calculation (the evaluation value to be used is set in advance) relative to the $(r-n)^{th}$ evaluation value is within Y %, it is determined that the system is sufficiently converged (the convergence condition is satisfied), the iterative calculation ends after the $r^{th}$ iterative calculation, and the temporary channel at that time is set for each control target wireless access point.

(A) Minimum U value
(B) $U_{total}$
(C) $U_{product}$
(D) Lower X % of U value

Setting items include an evaluation value to be used among (A) to (D), an n value, a Y value, and in the case of (D), an X value.

Then, another channel to be newly set is selected so that the U value of the selected wireless access point increases (step S112). Then, it is determined whether the channel exists, that is, another channel in which the U value becomes greater than that of the current temporary channel exists (step S113). If the result of this determination indicates that the channel does not exist, the temporary channel of the selected wireless access point is not changed (step S114a), and the process returns to step S109.

In contrast, if the channel exists, $U_{AP-x}$ of each control target wireless access point and a U' value (=$U_{total}$ or $U_{product}$) are calculated (step S115a). Then, it is determined whether U'≥$U_{max}$ is satisfied (step S116a). If the result of this determination indicates that U'≥$U_{max}$ is satisfied, the selected channel is determined as a temporary channel of the selected wireless access point (step S117), and the process returns to step S107. In contrast, if U'≥$U_{max}$ is not satisfied, the temporary channel of the selected wireless access point is not changed (step S118a) and the process returns to step S109.

Next, if the ending condition is satisfied in step S110, a temporary channel set of all the control target wireless access points is used as determined channels, and the process ends (step S119).

Next, details of the processing operation of step S112 shown in FIG. 17 will be described. Since the processing operation of step S112 shown in FIG. 17 is the same as the processing operation shown in FIG. 16, the processing operation will be described with reference to FIG. 16.

First, it is determined whether uncontrolled wireless access points, that is, wireless access points that cannot be controlled by the present channel assignment system, are to be considered (step S121). This is an input parameter by an operator of the channel assignment system, and if the result of this determination indicates that the uncontrolled wireless access points are to be considered, information regarding the neighboring uncontrolled wireless access point that has been detected by the selected wireless access point is also considered (step S122). In contrast, if the uncontrolled wireless access points are not to be considered, the information regarding the uncontrolled wireless access point is ignored (that is, a medium use rate value of all the uncontrolled wireless access points ρ'=0; step S123).

Then, a total value (ρ+ρ') of the medium use rate for each channel is calculated in the selected wireless access point (step S124). Here, as described above, ρ is a medium occupation time rate for each channel of a control target wireless access point of which a temporary channel has already been determined among other detectable control target wireless access points in the selected control target wireless access point. Further, ρ' is a total medium occupation time rate for each channel of detectable neighboring uncontrolled wireless access points in the selected control target wireless access point.

Then, a channel in which an occupiable rate $U_{AP-x}^{(CH-y)}$ value is maximized in the selected wireless access point is selected (step S125). If there are a plurality of channels in which the occupiable rate $U_{AP-x}^{(CH-y)}$ value is maximized, a channel least used by a neighboring control target wireless access points of which channels have already been determined is selected.

Sixth Embodiment

Next, a wireless communication system and a channel selection method in a sixth embodiment of the present invention will be described. Since configurations of apparatuses in the sixth embodiment are the same as those shown in FIG. 14, a detailed description will be omitted.

Next, an operation of the wireless communication system in the sixth embodiment will be described. First, when the operation of the wireless access point 1001 starts, the wireless communication unit 1011 scans all channels available in wireless communication during a predetermined period at predetermined time intervals and outputs surrounding wireless environment information of the wireless access point itself to the wireless environment information holding unit 1015. This wireless environment information includes, for example, the number of other wireless access points in each available channel, identification information of each wireless access point, received signal strength (RSSI value: received signal strength indicator) of a signal such as a beacon received from each wireless access point, and a channel use rate per unit time. Further, the wireless environment information also includes, for example, the number of wireless station apparatuses in its own cell, an RSSI value of a signal received from each wireless station apparatus.

The channel calculation unit 1032 calculates a wireless channel to be used by each wireless access point based on the wireless environment information of each wireless access point collected from the information collection unit 1033 as follows. First, a time occupation rate scheduled to be used is calculated using Expression (2) in the wireless access point to which the channel is to be assigned. The time occupation rate is a rate of time in which an application or a wireless station apparatus occupies the wireless channel when a total time is assumed to be 1.

[Expression 1]

$$M = \text{Number of } STAs \text{ associated with wireless access point } (M \geq 0)$$
$$\rho_{(x)} = \text{Average time occupation rate (value scheduled to be used)}$$
$$\text{of } STAx \text{ associated with wireless access}$$
$$\text{point } (x = 0, 1, \ldots, M-1)(0 \leq \rho_{(x)} \leq 1)$$
$$\rho = \text{Total time occupation rate (value scheduled to be used)}$$
$$\text{of wireless access point}$$
$$\rho = \sum_{x=0}^{M-1} \rho_{(x)} (0 \leq \rho \leq 1)$$

(2)

Here, the total time occupation rate is a rate of time scheduled to be used by the wireless access point and a wireless station apparatus associated therewith when a total time is assumed to be 1. Further, STA means a wireless station.

Then, the following expression is calculated in each channel available in the wireless access point to which the channel is to be assigned.

[Expression 2]

$N$ = Number of control target wireless access points of which channels have already been determined (or temporarily determined)($N \geq 0$)  (3)

$M_i$ = Number of STAs associated with the control target wireless point $i$ ($i = 0, 1, \ldots, N-1$)

$\rho_{(i,j)}$ = Average time occupancy rate of STAj associated with the control target wireless access point $i$($j = 0, 1, \ldots, M_i - 1$)($0 \leq \rho_{(i,j)} \leq 1$)

$\rho_i$ = Total time occupancy rate of the control target wireless access point $i$ $$\rho_i = \sum_{j=0}^{M_i-1} \rho_{(i,j)} (0 \leq \rho_i \leq 1)$$

$\rho$ = Total time occupancy rate of the control target wireless access points $$\rho = \sum_{i=0}^{N-1} \sum_{j=0}^{M_i-1} \rho_{(i,j)} \ (0 \leq \rho \leq 1)$$

$N'$ = Number of uncontrolled wireless access points($N' \geq 0$)

$\rho'_k$ = Total time occupancy rate of uncontrolled wireless access point $k$($k = 0, 1, \ldots, N'-1$) ($0 \leq \rho'_k \leq 1$)

$\rho'$ = Total time occupancy rate of uncontrolled wireless access points $$\rho' = \sum_{k=0}^{N'-1} \rho'_k \ (0 \leq \rho' \leq 1)$$

$\alpha$ = Total time occupancy rate of other neighboring wireless access points $\alpha = \rho + \rho' (0 \leq \alpha \leq 1)$ Then, a channel having a smallest total time occupation rate $\alpha$ is selected as shown in the following expression. This channel is determined to be a temporarily determined channel scheduled to be used in the wireless access point.

$Ch - y$ = channel scheduled to be used(temporarily determined channel)  [Expression 3]

$$Ch - y = \forall \underset{y}{\text{yargmin}}(\alpha_{CH-1}, \alpha_{CH-2}, \ldots, \alpha_{CH-y}, \ldots)$$

Then, when the use of the temporarily determined channel is determined in the above wireless access point, the value of a degree of satisfaction U to be obtained is calculated using the following expression. It is to be noted that the value of the degree of satisfaction U=1 indicates a situation of sufficient satisfaction. A range of the U value is [0, 1], and a greater value is preferable.

if($\hat{\rho} + \alpha < 1$); $U = 1$(not saturated state)  [Expression 4]

-continued else; $U = \dfrac{\hat{\rho}}{\hat{\rho} + \alpha}$

When the calculation of U values ends in all the wireless access points, the U values are calculated again in all the wireless access points. Then, reselection of the channel is attempted so that the U value of the wireless access point having the minimum U value increases. Here, there are two conditions. A first condition is that the U value of a wireless access point that is channel re-setting target does not decrease. A second condition is that (1) a total degree of satisfaction (a total value of the U values) in all the wireless access points does not decrease, and (2) a multiplied value of the U values in all the wireless access points does not decrease, even when re-setting of the channel is performed on the wireless access point.

One of (1) and (2) may be satisfied or both may be satisfied. When a new channel of the wireless access point having the minimum U value is determined in this manner, changing of the channel is attempted again so that the U value of the wireless access point having the minimum U value is improved.

It is possible to improve the total throughput of the system and improve fairness of the throughputs between the cells by executing the operation of selecting the channel so that the U value of the wireless access point having the minimum U value is improved a predetermined number of times (the number of recursions Max_r) in this manner. The above operation is repeated the predetermined number of times Max_r, and a new temporary channel is finally reflected in each wireless access point.

It is to be noted that the calculation expressions of the U value and the others shown above is one example, and another method for calculating a channel use rate may be used. Further, optimal channel assignment may be performed based on a measurement value or a prediction value of the throughput rather than the channel use rate.

Figure 18:
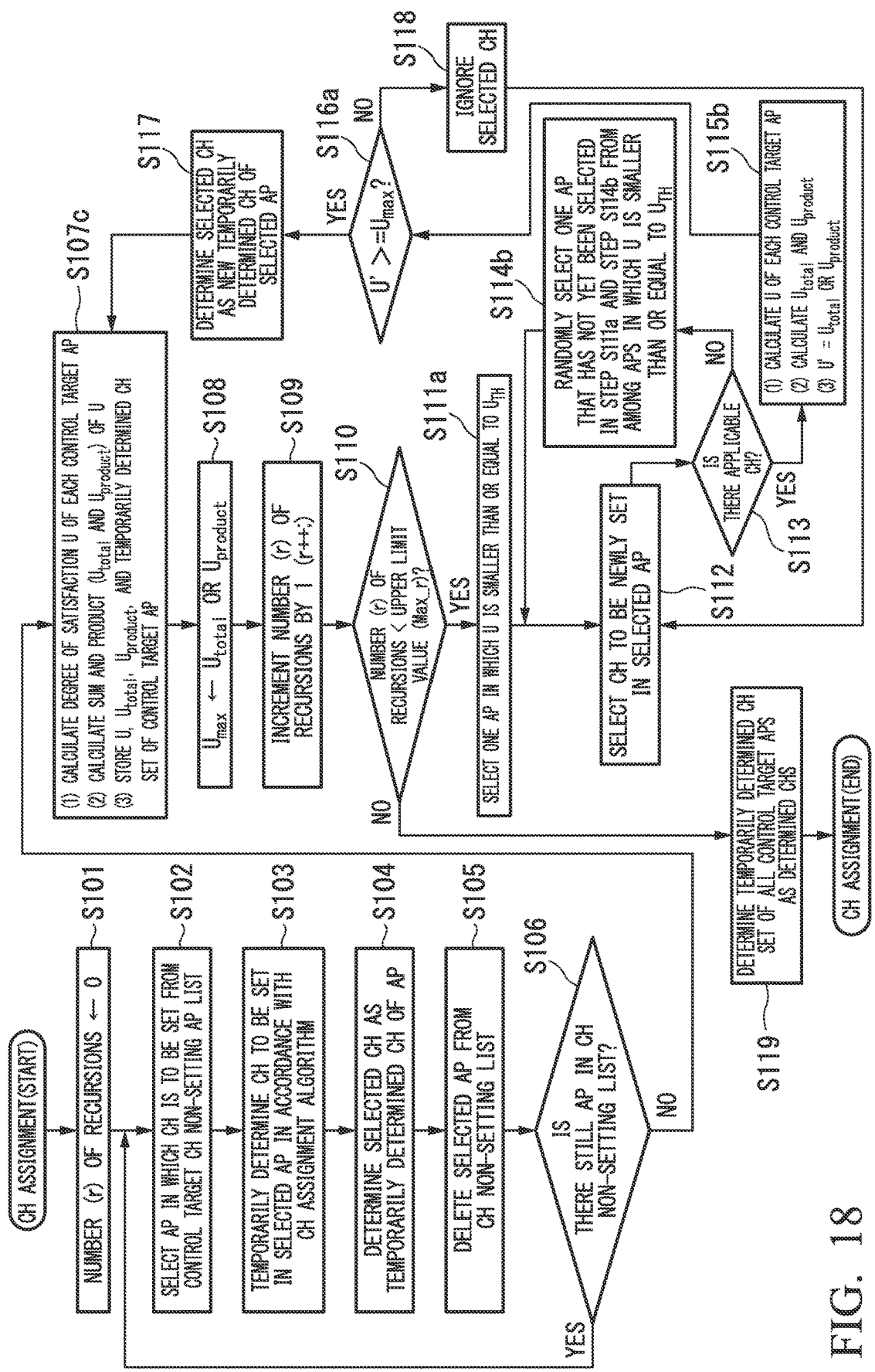
FIG. 18 is a flowchart showing a basic operation of a channel assignment process of assigning a channel to each wireless access point in a sixth embodiment.
Figure 19:
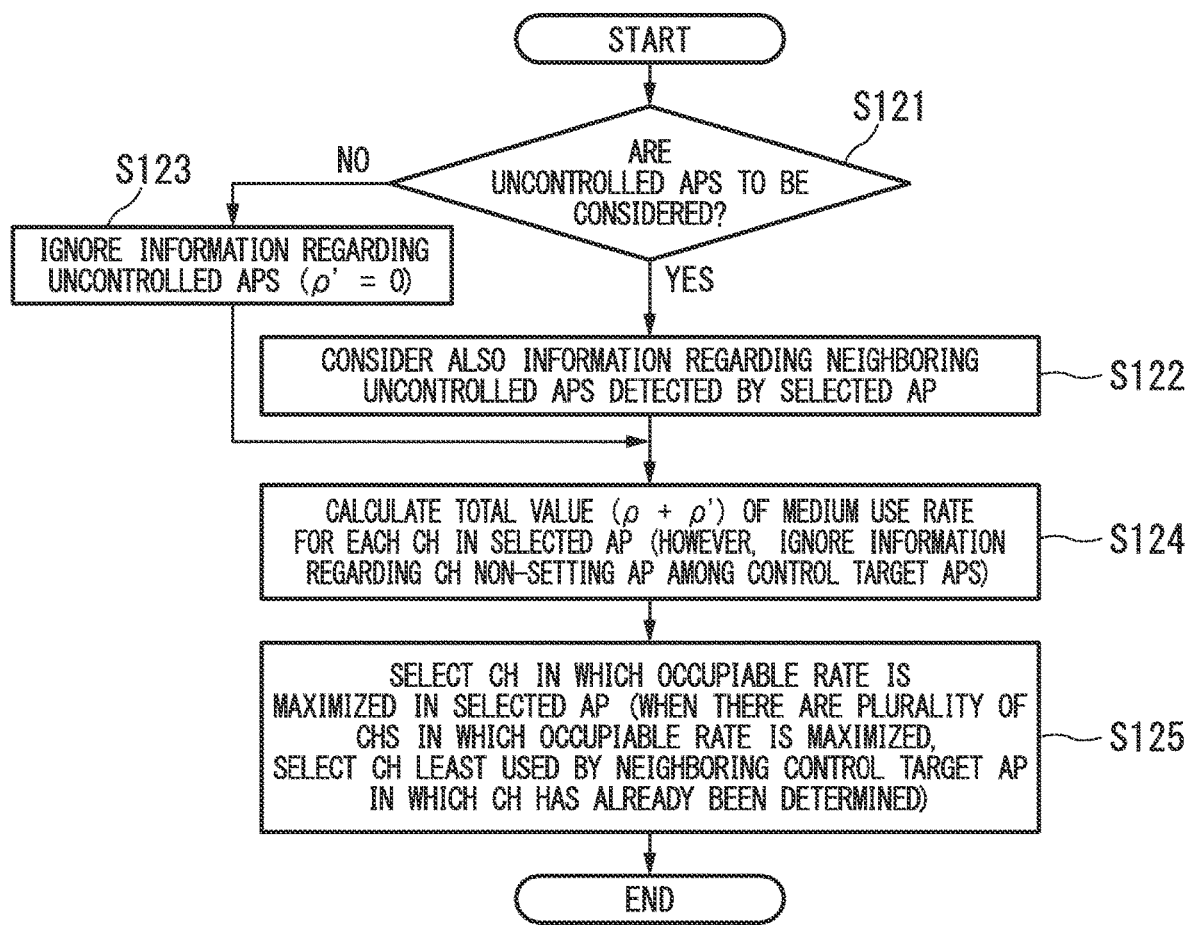
FIG. 19 is a flowchart showing an operation of calculating a channel in which a U value is maximized as a temporarily determined channel when a channel is assigned to each wireless access point in the sixth embodiment.

Next, an operation in which the channel calculation unit 1032 in the sixth embodiment performs a channel selection process will be described with reference to FIGS. 18 and 19. FIGS. 18 and 19 are flowcharts showing the operation in which the channel calculation unit 1032 performs the channel selection process in the sixth embodiment. In FIGS. 18 and 19, the same processing operations as the processing operations shown in FIGS. 15, 16, and 17 are denoted with the same reference signs, and a description thereof will be briefly given.

First, 0 is substituted into the number (r) of recursions (step S101). Then, a wireless access point of which a channel is to be set is selected from a control target channel non-setting wireless access point list (step S102). In this case, as a method for selecting the wireless access point, a method for randomly selecting a wireless access point, a method for selecting a wireless access point in a manually set order (an order of priority described in an XML file), and a method for selecting a wireless access point in an order of wireless access points having a larger bottleneck (descending order of the number of neighboring wireless access points) can be applied. Then, a channel to be set in the selected wireless access point is temporarily determined in accordance with a channel assignment algorithm (step S103).

Then, the selected channel is determined to be a temporarily determined channel of the wireless access point (step S104), and the selected wireless access point is deleted from the channel non-setting list (step S105). Then, it is determined whether there is still a wireless access point in the channel non-setting list (step S106), and if there is a wireless access point in the channel non-setting list, the process returns to step S102 to repeat the processing.

In contrast, if there is no remaining wireless access point in the channel non-setting list, a degree of satisfaction U of each control target wireless access point, and a sum and a product ($U_{total}$ and $U_{product}$) of U are calculated, and U, $U_{total}$, $U_{product}$, and a temporarily determined channel set of the control target wireless access points are stored (step S107c). Subsequently, $U_{total}$ or $U_{product}$ is substituted into U. (step S108). Then, the number (r) of recursions is incremented by 1 (r++;) (step S109).

Then, it is determined whether a condition of the number (r) of recursions<upper limit value (Max_r) is satisfied (step S110) and, if the condition is satisfied, one wireless access point in which U is smaller than or equal to a predetermined threshold $U_{TH}$ is selected (step S111a). Subsequently, a channel to be newly set in the selected wireless access point is selected (step S112). Then, it is determined whether the channel exists (step S113). If the result of this determination indicates that the channel does not exist, one wireless access point that has not yet been selected in step S111a and step S114b is randomly selected from among the wireless access points in which U is smaller than or equal to $U_{TH}$ in step S114b, and the process returns to step S112.

In contrast, if the channel exists, U of each control target wireless access point, $U_{total}$, and $U_{product}$ are calculated, and $U_{total}$ or $U_{product}$ is substituted into U' (step S115b). Then, it is determined whether $U' \geq U_{max}$ is satisfied (step S116a). If the result of this determination indicates that $U' \geq U_{max}$ is satisfied, the selected channel is determined to be a new temporarily determined channel of the selected wireless access point (step S117), and the process returns to step S107c. In contrast, if $U' \geq U_{max}$ is not satisfied, the selected channel is ignored (step S118), and the process returns to step S112.

Then, if the number (r) of recursions<upper limit value (Max_r) is not satisfied in step S110, the temporarily determined channel set of all control target wireless access points is set as determined channels and the process ends (step S119).

Next, details of a processing operation of step S112 shown in FIG. 18 will be described with reference to FIG. 19. FIG. 19 is a flowchart showing the details of the processing operation of step S112 shown in FIG. 18.

First, it is determined whether uncontrolled wireless access points are to be considered (step S121). If the result of this determination indicates that the uncontrolled wireless access points are to be considered, information regarding neighboring uncontrolled wireless access points that have been detected by the selected wireless access point are also considered (step S122). In contrast, if the uncontrolled wireless access points are not to be considered, the information regarding the uncontrolled wireless access point is ignored ($\rho'=0$; step S123).

Then, the selected wireless access point calculates a total value ($\rho+\rho'$) of the medium use rate for each channel (step S124). However, information regarding the channel non-setting wireless access point among the control target wireless access points is ignored.

Then, a channel in which the occupiable rate in the selected wireless access point is maximized is selected (step S125). When there are a plurality of channels in which the occupiable rate is maximized, a channel that is least used by neighboring control target wireless access points for which channels have already been determined is selected.

Figure 20:
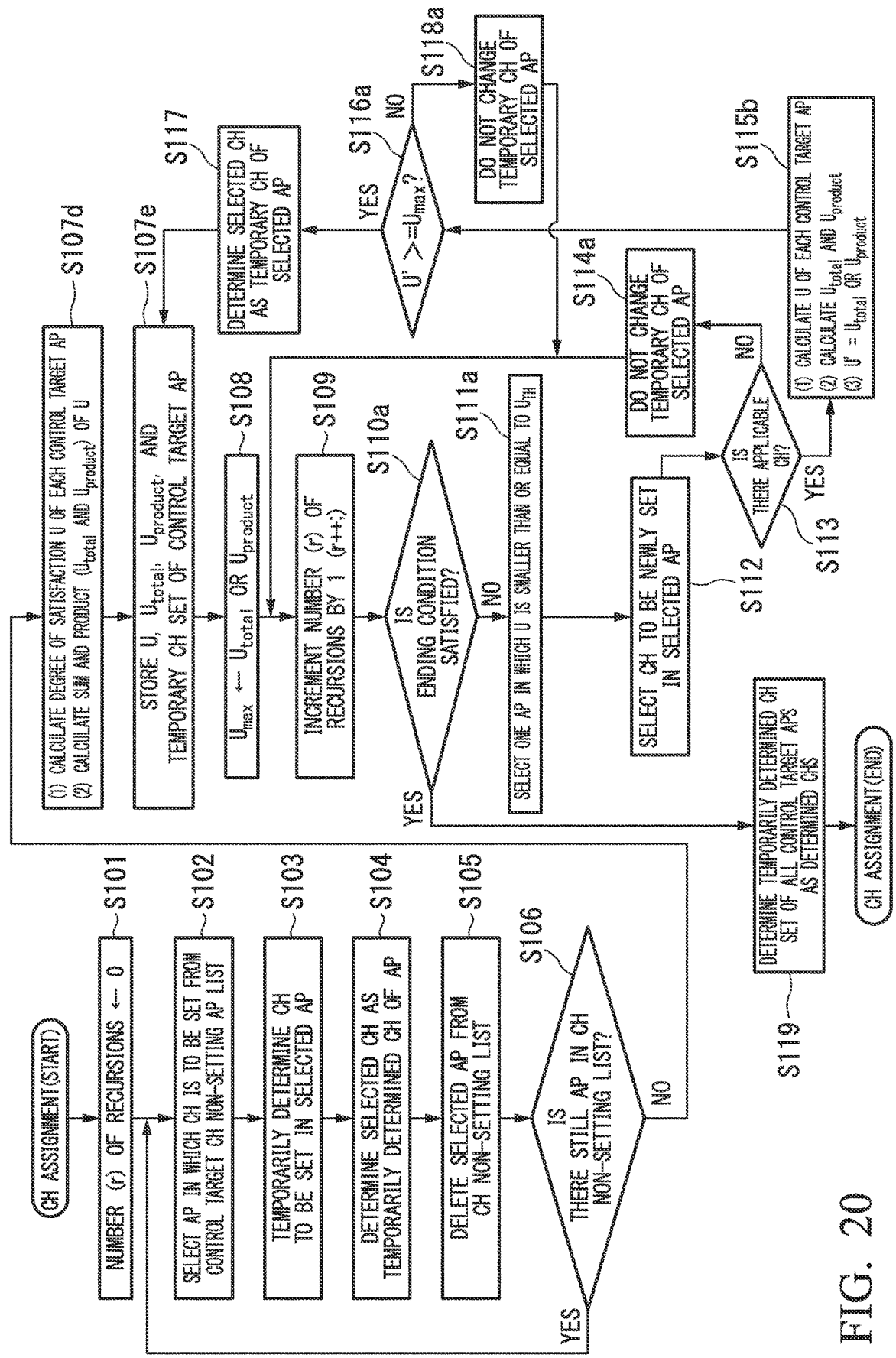
FIG. 20 is a flowchart showing a modification example of a processing operation shown in FIG. 18.

Next, a modification example of the processing operation shown in FIG. 18 will be described with reference to FIG. 20. In FIG. 20, the same processing operations as the processing operations shown in FIGS. 17 and 18 are denoted with the same reference signs and a description thereof will be briefly given.

First, 0 is substituted into the number (r) of recursions (step S101). Then, a wireless access point of which a channel is to be set is selected from a control target channel non-setting wireless access point list (step S102). In this case, a method for selecting the wireless access point includes, for example, a method for randomly selecting a wireless access point, a method for selecting a wireless access point in a previously set order, a method for selecting a wireless access point in descending order of the number of neighboring wireless access points, and a method for selecting a wireless access point in an ascending order of a time rate occupiable by the channel. In the present system, the channel to be set in the selected wireless access point is temporarily determined using any one of the methods (step S103).

Then, the selected channel is determined to be a temporarily determined channel of the wireless access point (step S104), and the selected wireless access point is deleted from the channel non-setting list (step S105). Then, it is determined whether there is still a wireless access point in the channel non-setting list (step S106), and if there is a wireless access point in the channel non-setting list, the process returns to step S102 to repeat the processing.

In contrast, if there is no remaining wireless access point in the channel non-setting list, a degree of satisfaction U of each control target wireless access point, and a sum and a product ($U_{total}$ and $U_{product}$) of U are calculated (step S107d). Further, U, $U_{total}$, $U_{product}$, and a temporary channel set of the control target wireless access points are stored (step S107e). Then, $U_{total}$ or $U_{product}$ is substituted into $U_{max}$ (step S108). Then, the number (r) of recursions is incremented by 1 (r++;) (step S109).

Then, it is determined whether an ending condition of the process is satisfied (step S110a). If the ending condition is not satisfied, one wireless access point of which U is smaller than or equal to a predetermined threshold $U_{TH}$ is selected (step S111a). With respect to the ending condition in step S110a, the ending condition is regarded as being satisfied when at least one of the conditions that (1) U values of all wireless access points be 1, (2) the number (r) of recursions reach an upper limit value (Max_r), and (3) a previously set convergence condition be satisfied is satisfied. Further, with respect to (3) the previously set convergence condition, if an improved percentage of an evaluation value of the following (A) to (D) after the $r^{th}$ iterative calculation (the evaluation value to be used is set in advance) relative to the $(r-n)^{th}$ evaluation value is within Y %, it is determined that the system is sufficiently converged (the convergence condition is satisfied), the iterative calculation ends after the $r^{th}$ iterative calculation, and the temporary channel at that time is set for each control target wireless access point.

(A) Minimum U value
(B) $U_{total}$
(C) $U_{product}$
(D) Lower X % of U value

Setting items includes an evaluation value to be used among (A) to (D), an n value, a Y value, and in the case of (D), an X value.

Then, another channel to be newly set is selected so that the U value of the selected wireless access point increases (step S112). Then, it is determined whether the channel exists, that is, another channel in which the U value becomes greater than that of the current temporary channel exists (step S113). If the result of this determination indicates that the channel does not exist, the temporary channel of the selected wireless access point is not changed (step S114a), and the process returns to step S109.

In contrast, if the channel exists, U of each control target wireless access point, $U_{total}$, and $U_{product}$ are calculated, and $U'=U_{total}$ or $U_{product}$ (step S115b). Then, it is determined whether $U' \geq U_{max}$ is satisfied (step S116a). If the result of this determination indicates that $U' \geq U_{max}$ is satisfied, the selected channel is determined as a temporary channel of the selected wireless access point (step S117), and the process returns to step S107e. In contrast, if $U' \geq U_{max}$ is not satisfied, the temporary channel of the selected wireless access point is not changed (step S118a) and the process returns to step S109.

Then, if the ending condition is satisfied in step S110, a temporary channel set of all the control target wireless access points is used as determined channel, and the process ends (step S119).

Next, details of a processing operation of step S112 shown in FIG. 20 will be described. Since the processing operation of step S112 shown in FIG. 20 is the same as the processing operation shown in FIG. 19, the processing operation will be described with reference to FIG. 19.

First, it is determined whether uncontrolled wireless access points, that is, wireless access points that cannot be controlled by the present channel assignment system, are to be considered (step S121). This is an input parameter by an operator of the channel assignment system, and if the result of this determination indicates that the uncontrolled wireless access points are to be considered, information regarding the neighboring uncontrolled wireless access points that have been detected by the selected wireless access point is also considered (step S122). In contrast, if the uncontrolled wireless access points are not to be considered, the information regarding the uncontrolled wireless access points is ignored (that is, a medium use rate value of all the uncontrolled wireless access points $\rho'=0$; step S123).

Then, a total value $(\rho+\rho')$ of the medium use rate for each channel is calculated in the selected wireless access point (step S124). Here, as described above, $\rho$ is a medium occupation time rate for each channel of a control target wireless access point of which the temporary channel has already been determined among other detectable control target wireless access points in the selected control target wireless access point. Further, $\rho'$ is a total medium occupation time rate for each channel of the detectable neighboring uncontrolled wireless access point in the selected control target wireless access point.

Then, a channel in which an occupiable rate $U_{AP-x}^{(CH-y)}$ value is maximized in the selected wireless access point is selected (step S125). If there are a plurality of channels in which the occupiable rate $U_{AP-x}^{(CH-y)}$ value is maximized, a channel least used by neighboring control target wireless access points of which channels have already been determined is selected.

In a wireless communication system including a plurality of wireless access points 1001 in accordance with the fifth or sixth embodiment described above, it is possible to suppress a throughput variation between control target wireless access points (between cells) by dynamically determining a channel that each wireless access point 1001 uses in wireless communication depending on a surrounding radio situation. As a result, the wireless communication system can always suppress degradation of the throughput in the entire wireless communication system even when an area in which wireless access points 1001 aggregate densely is generated and even in an environment in which the wireless environment varies over time.

With this configuration, channels can be selected and assigned on the network side so that no great difference is generated between throughputs that can be acquired by the cells and a throughput of the entire system is not degraded. Further, it is possible to prevent local throughput degradation even in an environment in which wireless access points aggregate densely by regularly executing the above-described channel assignment, as necessary, to assign the channels so that the channels are not unevenly used in wireless communication even when the wireless environment and/or a traffic environment changes.

It is to be noted that while the aforementioned description describes the example in which the wireless access point of which the U value is smaller than or equal to the predetermined threshold value is selected, it is not always necessary to select the wireless access point of which the U value is smaller than or equal to the predetermined threshold value, and a wireless access point having a small U value that is different from that of the present example may be selected. The wireless access point having a small U value is, for example, any one of wireless access points of a predetermined ratio having lower U values. If the predetermined threshold value or the predetermined ratio is small, the number of wireless access points that are reassignment targets of temporary channels decreases, and thus the channel assignment is more rapidly converged. In contrast, if the predetermined threshold value or the predetermined ratio is large, the number of wireless access points that are reassignment targets of temporary channels increases, and thus convergence of the channel assignment becomes late, but a total throughput of the system can be maximized (optimized).

It is to be noted that "a wireless LAN access point having a U value satisfying a predetermined condition" described in the claims is a wireless access point of which the U value is smaller than or equal to a predetermined threshold, a wireless access point having a small U value, one wireless access point randomly selected from among all control target wireless access points, or the like.

Next, advantageous effects of the fifth embodiment and the sixth embodiment of the present invention will be described through a computer simulation. Hereinafter, a verification environment of the computer simulation and a verification result thereof will be described. FIG. 21 is a diagram showing an environment of the computer simulation. As shown in FIG. 21, 100 wireless access points are arranged at equal intervals in a square form, and wireless station apparatuses are arranged in the same positions as the wireless access points. A system throughput, a throughput value of a cell having a minimum throughput, and an FI value indicating fairness (Non-Patent Document 3) are calculated with respect to a case in which a channel is assigned to each wireless access point using the fifth embodiment or the sixth embodiment of the present invention, a case in which an RSSI method in which each wireless access point selects a channel to be used in an autonomous distributed manner based on a conventional minimum RSSI method is used, and a case in which a random channel selection method in which a channel is randomly selected from among available channels is used. It is to be noted that 36 wireless access points located at a center among the 100 wireless access points were evaluation targets. Further, the number of available channels was 3.

In the computer simulation, a wireless access point transmits a data frame based on CSMA/CA defined in the IEEE802.11 standard. Parameter values of CSMA/CA are as follows. SlotTime=9 μs, Short Inter-Frame Space (SIFS)=16 μs, CWmin=15, CWmax=1023, ShortRetryLimit=7, LongRetryLimit=4, DataRate=54 Mbps, and BasicRate=6 Mbps.

Figure 22:
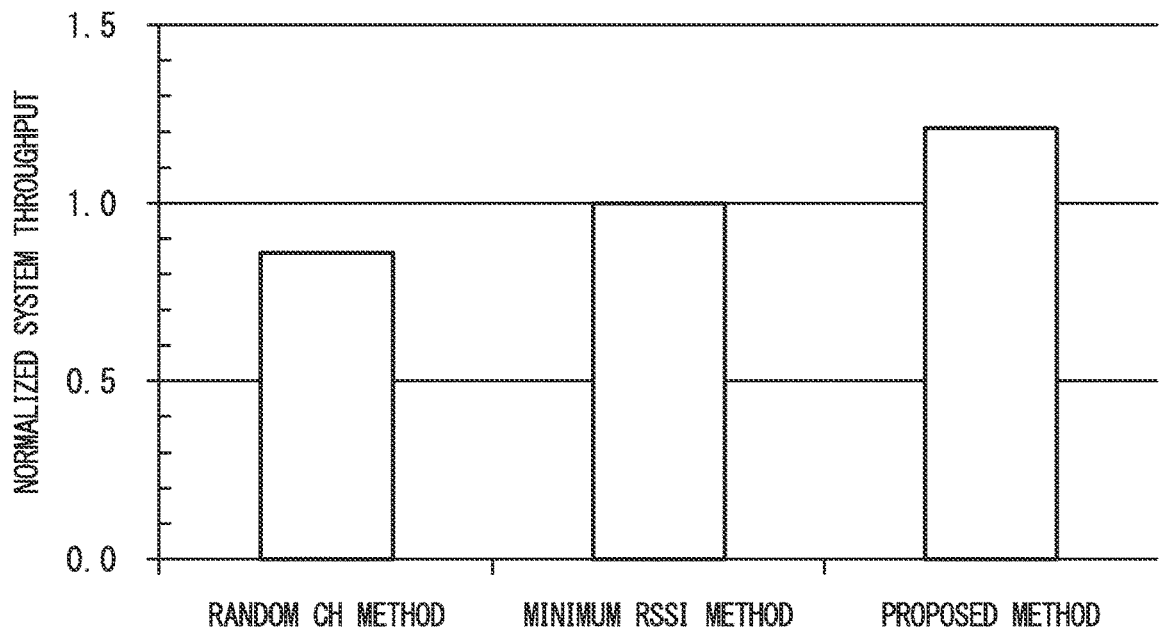
FIG. 22 is a diagram showing a system throughput of 36 central cells in the computer simulation (comparison of normalized system throughputs).
Figure 23:
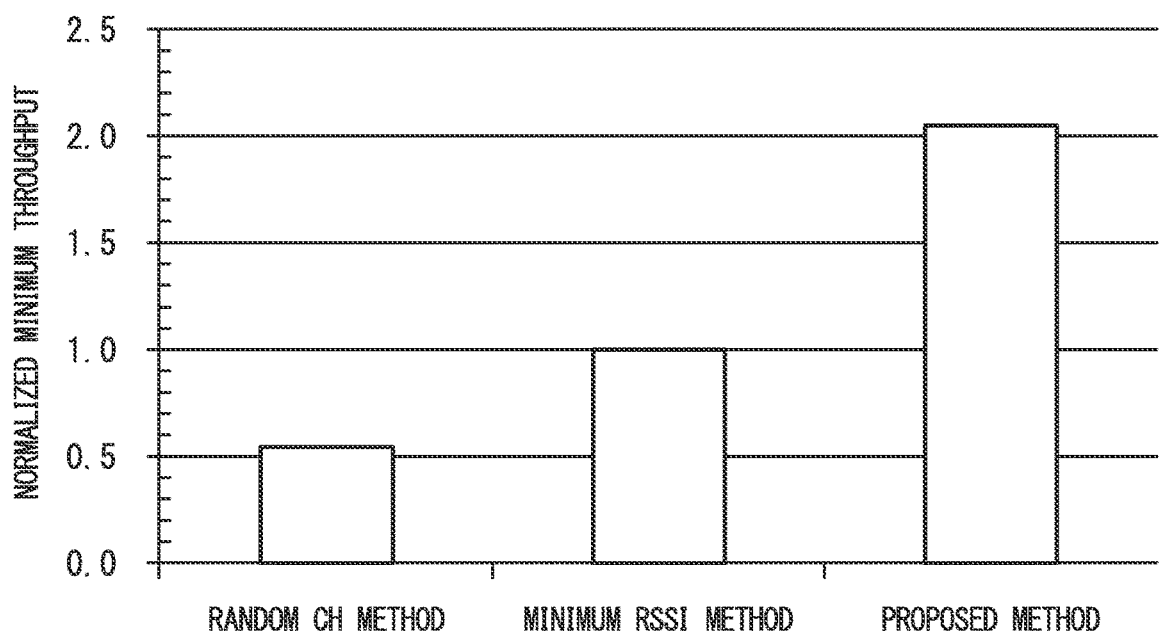
FIG. 23 is a diagram showing a minimum throughput of 36 central cells in the computer simulation (comparison of normalized minimum throughputs).
Figure 24:
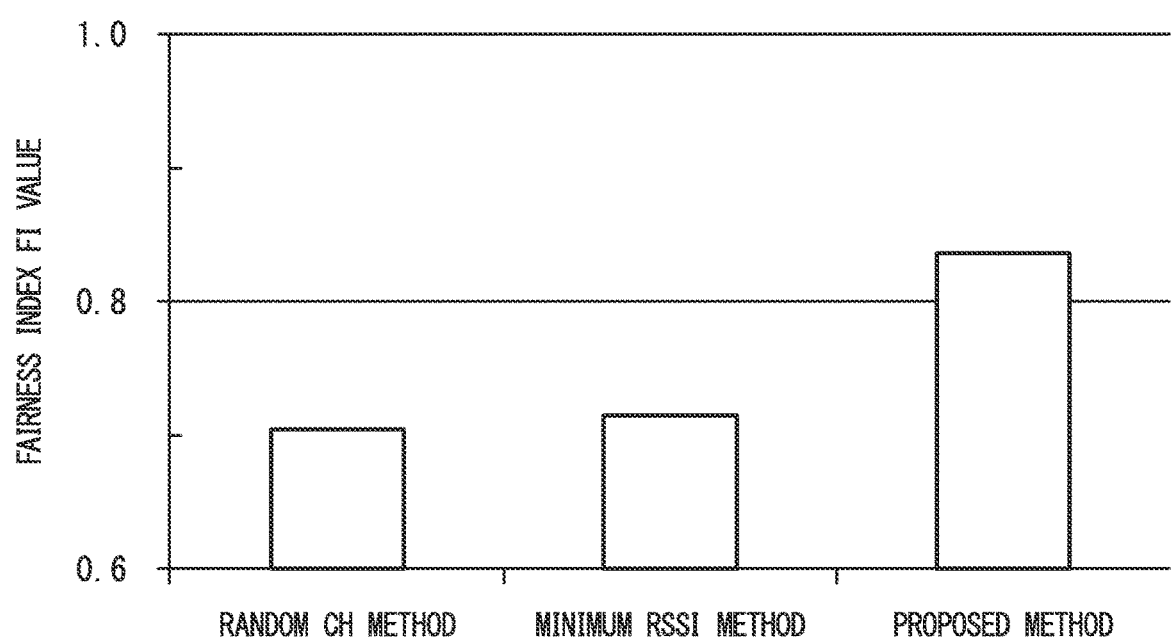
FIG. 24 is a diagram showing a result of calculating an FI (Fairness Index) using a throughput value of 36 central cells in the computer simulation (comparison of fairness index FI values).

In the computer simulation, user datagram protocol (UDP) downlink traffic in a saturated state in which a packet length was 1500 Bytes was transmitted from the wireless access point toward a wireless station apparatus, and the throughput of each cell was calculated using the number of packets that were able to be correctly received in 10 seconds in the wireless station apparatus. A total throughput, a minimum throughput, and an FI value of the system in the computer simulation are shown in FIGS. 22, 23, and 24. It is seen from results shown in FIGS. 22 to 24 that, in the fifth embodiment and the sixth embodiment of the present invention, the system throughput is improved in comparison with the conventional RSSI method. Further, it can be confirmed that the minimum throughput and the FI value are also improved.

As described above, a channel with a minimum medium use rate among a plurality of available channels is assigned in order to improve a system throughput or to improve a throughput of a cell with a minimum throughput in the system in a network-cooperative wireless LAN using an open services gateway initiative (OSGi) service aggregation platform (OSAP) or the like. Particularly, a channel use rate or a degree of satisfaction of the wireless access point (or the cell) is predicted using an evaluation index and optimization of the channel is sequentially executed, such that an acquirable throughput or the degree of satisfaction is improved. Accordingly, it becomes easy to update information due to addition and/or deletion of a wireless access point and/or a wireless station apparatus, and to deal with a change of environment.

Seventh Embodiment

Next, a wireless communication system and a channel selection method in a seventh embodiment of the present invention will be described. Since configurations of apparatuses in the present embodiment are the same as those shown in FIG. 14, a detailed description will be omitted here.

Next, an operation of the wireless communication system in the seventh embodiment will be described. First, when the operation of the wireless access point 1001 starts, the wireless communication unit 1011 scans all channels available in wireless communication during a predetermined period at predetermined time intervals and outputs surrounding wireless environment information of the wireless access point itself to the wireless environment information holding unit 1015. This wireless environment information includes, for example, the number of other wireless access points in each available channel, identification information of each wireless access point, received signal strength (RSSI value: received signal strength indicator) of a signal such as a beacon received from each wireless access point. Further, the wireless environment information also includes the number of wireless station apparatuses in its own cell, an RSSI value of a signal received from each wireless station apparatus, and the like. In addition, the wireless environment information further includes information regarding a medium use rate of all the available channels.

Then, the channel calculation unit 1032 calculates a wireless channel to be used by each wireless access point based on the wireless environment information of each wireless access point collected from the information collection unit 1033 as follows. First, a U value shown in Expression (3) is calculated on all channels available in the wireless access point to which the channel is to be assigned.

$U$=duration for which the wireless access point is capable of occupying the channel per unit time/ total duration necessary for the wireless access point to transmit and receive frames per unit time (3)

Here, the duration that is capable of being occupied per unit time in the numerator of Expression (3) is a duration that can be occupied when a remaining time obtained by subtracting, from a unit time, a total duration (for example, τ) that cannot be used due to another wireless apparatus or another device performing wireless communication using a channel that cannot be controlled by the channel assignment server 1003 of the present system, disturbance, or the like is shared by wireless access points that can be controlled by the channel assignment server 1003 of the present system and wireless station apparatuses belonging thereto.

As an example, when the unit time is 1 and wireless access points that can be controlled by the channel assignment server 1003 are all in a saturated state (a state in which a frame to be transmitted is always held), the numerator of Expression (3) can be calculated as follows.

Numerator of Expression $(3)=(1-\tau)/(K+1)$

Here, K is the number of neighboring other wireless access points that can be detected in the wireless access point and can be controlled by the channel assignment server 1003.

Further, the "total duration necessary for the wireless access point to transmit and receive frames per unit time" in the denominator of Expression (3) is a total time necessary for the wireless access point to perform transmission and reception of control frames and data communication with wireless station apparatuses belonging thereto.

It is to be noted that the numerator and the denominator of Expression (3) may be statistics using past data or may be instantaneous values. Further, "time necessary for . . . data communication with the wireless station apparatuses belonging thereto" is a sum of the time necessary for data transmission from the wireless access point toward the wireless station apparatuses and the time necessary for data transmission from the wireless station apparatuses toward the wireless access point. Of these, the time necessary for data transmission (downlink traffic) from the wireless access point toward the wireless station apparatuses can be calculated as a scheduled occupation time of the channel of the wireless access point based on the number of data packets for each destination wireless station apparatus accommodated in the wireless access point, the packet length, and statistical information of a data transfer rate used for data transmission for each destination wireless station apparatus, as follows.

When, in the unit time,

N=average number of data packets destined for the wireless station apparatuses input from a wired link to the wireless access point, B (bit)=average length of the data packet destined for the wireless station apparatuses input from the wired link to the wireless access point, M (bit)=aggregation MAC protocol data unit (A-MPDU) average data amount destined for the wireless station apparatuses (M (bit) can be transmitted per acquisition of one channel access right), and D (bit/s)=average data rate used for data transmission from a wireless link toward the wireless station apparatuses, it is necessary for the wireless access point to acquire an access right (N×B)/M times in the unit time.

Scheduled occupation time: $T_{occupy}=(N \times B)/M \times \{(DIFS+BO_{ave})+(M/D)+\varphi\}$ Scheduled occupation time rate: $T_{occupy}/T_{unit}$ Here, φ(sec) is the average overhead time per data frame in consideration of SIFS, an ACK transfer time, a required time when RTS/CTS (Clear To Send) is used, a MAC header, a preamble, and the like, and $T_{unit}$ is the length (sec) of the unit time. DIPS is a carrier sensing time before a packet is transmitted, and $BO_{ave}$ is the average random back-off value. $BO_{ave}$ can be calculated using $BO_{ave}=CW_{min} \times SlotTime/2$.

Figure 25A:
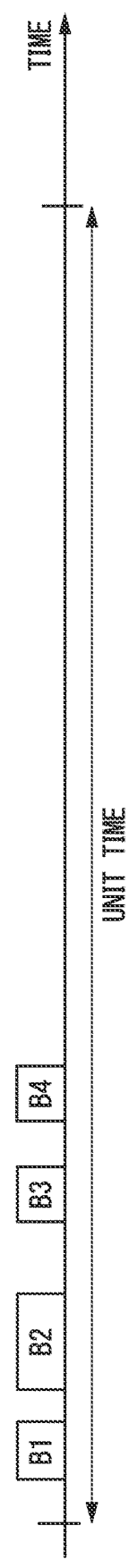
FIG. 25A is an illustrative diagram showing a scheduled occupation time rate.
Figure 25B:
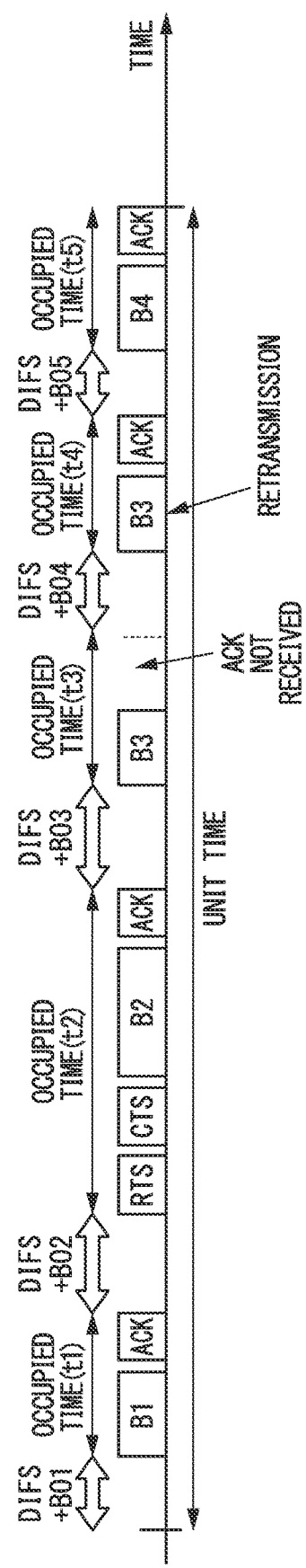
FIG. 25B is an illustrative diagram showing a scheduled occupation time rate.
Figure 26:
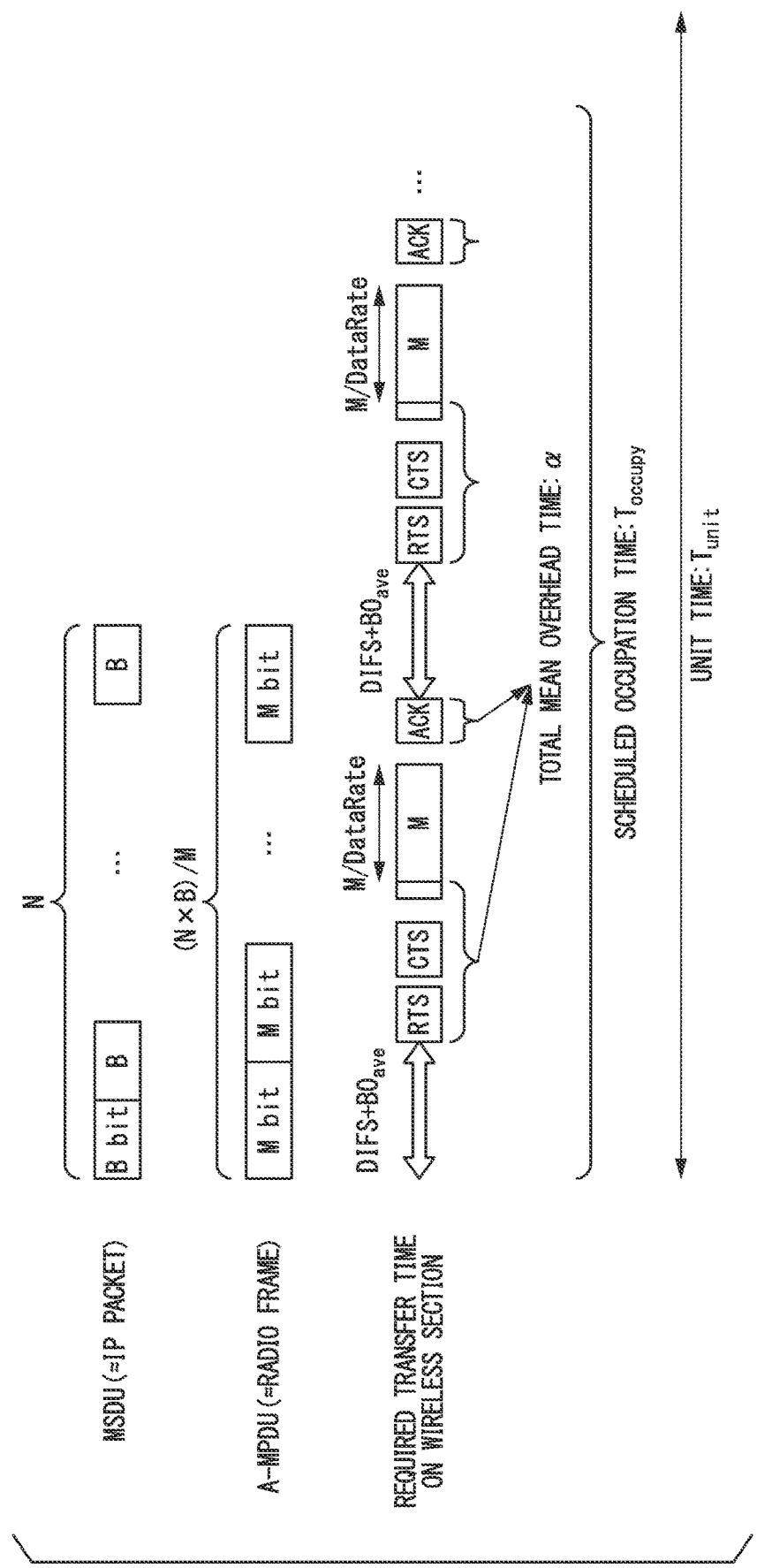
FIG. 26 is an illustrative diagram showing a scheduled occupation time rate.

Here, the scheduled occupation time rate will be described with reference to FIGS. 25A, 25B, and 26. FIGS. 25A, 25B, and 26 are diagrams describing the scheduled occupation time rate. For example, it is assumed that data packets destined for wireless station apparatuses are input from the wired link to the wireless access point, as shown in FIG. 25A. Moreover, it is assumed that the wireless access point transmits data shown in FIG. 25A toward each wireless station apparatus on the wireless link, as shown in FIG. 25B. Time for which the wireless access point occupies the channel in communication with the wireless station apparatuses is as follows.

Time for which channel is occupied in data transmission destined for wireless station apparatuses: $T_{data}=t1+t2+t3+t4+t5$ The wireless access point waits for a fixed waiting time and a random back-off time in order to acquire a data transmission right. A Sum $T_{BO}$ thereof is $T_{BO}=(DIFS+BO1)+(DIFS+BO2)+(DIFS+BO3)+(DIFS+BO4)+(DIFS+BO5)$ Time occupation rate necessary in data transmission destined for wireless station apparatuses=$T_{data}+T_{BO}$ The scheduled occupation time rate is simply obtained based on an expected value, instead of observation in the entire unit time, as follows (see FIG. 26).

When, in the unit time, the average number of data packets destined for the wireless station apparatuses input from the wired link to the wireless access point=N, an average length of the data packets destined for the wireless station apparatuses input from the wired link to the wireless access point=B (bit), and an A-MPDU average data amount destined for the wireless station apparatuses=M (bit) (M (bit) can be transmitted per acquisition of one channel access right), it is necessary for the wireless access point to acquire an access right (N×B)/M times in the unit time. It is to be noted that in FIG. 26, MSDU is a MAC service data unit.

It is assumed that an average data rate used for data transmission from the wireless link toward the wireless station apparatuses=DataRate (bit/s), and α is an average overhead time per data frame in consideration of SIFS, an ACK transfer time, a required time when RTS/CTS is used, a MAC header, a preamble, and the like.

Therefore,

Scheduled occupation time: $T_{occupy}=(N \times B)/M \times \{(DIFS+BO_{ave})+(M/DataRate)+\alpha\}$ Scheduled occupation time rate: $T_{occupy}/T_{unit}$ It is to be noted that in the case of uplink traffic, the wireless access point cannot acquire the number of input data packets per unit time in a wireless LAN module of a wireless station apparatus belonging thereto, and thus a scheduled occupation time rate cannot be calculated using the same method as above. However, a current occupation time rate of the wireless station apparatus can be calculated in consideration of data frames that the wireless access point receives from the wireless station apparatus on the wireless link, and various overheads (e.g., DIFS+$BO_{ave}$+ACK transmission time) at that time.

The U value indicates an expected throughput value for the amount of generated traffic in the wireless access point to which the channel is to be assigned, and is greater than or equal to 0 and smaller than or equal to 1. As the U value increases, the expected throughput of the wireless access point increases.

The channel assignment server 1003 can predict that an acquired throughput is maximized if each wireless access point selects a channel in which the U value is greatest, and thus the channel calculation unit 1032 calculates a channel in which the U value is maximized as a temporary channel of the wireless access point.

After determining temporary channels of all the wireless access points that are control targets of the system, the channel calculation unit 1032 calculates a total value $U_{total}$ of the U values of all the wireless access points. Then, improvement of the throughputs of wireless access points having a small U value is aimed at. After the temporary channels of all the wireless access points are determined, one of the wireless access points of which the U value is smaller than or equal to a predetermined $U_{TH}$ is selected, and it is checked whether there is no other channel in which the U value of the wireless access point is greater than a current value.

It is to be noted that a $U_{TH}$ value is a value greater than or equal to 0 and smaller than or equal to 1.

Specifically, the U values are calculated again on all channels available in the wireless access point, one channel in which the U value becomes greater than the current value is calculated, a total U value of all the control target wireless access points in the system is calculated, and it is checked whether the total U value is not smaller than a current total U value. If the total U value of the system does not fall below the current total U value even when the wireless access point uses the newly selected channel, the newly selected channel is determined as a new temporary channel of the wireless access point. Then, the channel is selected once again so that the U values of the wireless access points having a small U value are improved.

Thus, it is possible to improve the total throughput of the system and improve fairness of the throughputs between the cells by executing the operation of selecting the channel so that the U values of the wireless access points having a small U value are improved a predetermined number of times (the number of recursions Max_r). The above operation is repeated the predetermined number of times Max_r, and a new temporary channel is finally reflected in each wireless access point.

Eighth Embodiment

Next, a wireless communication system and a channel selection method in an eighth embodiment of the present invention will be described. Since the configurations of apparatuses in the present embodiment are the same as those shown in FIG. 14, a detailed description will be omitted here.

Next, an operation of the wireless communication system in the eighth embodiment will be described. First, when the operation of the wireless access point 1001 starts, the wireless communication unit 1011 scans all channels available in wireless communication during a predetermined period at predetermined time intervals and outputs surrounding wireless environment information of the wireless access point itself to the wireless environment information holding unit 1015. This wireless environment information includes, for example, the number of other wireless access points in each available channel, identification information of each wireless access point, received signal strength (RSSI value: received signal strength indicator) of a signal such as a beacon received from each wireless access point. Further, the wireless environment information also includes, for example, the number of wireless station apparatuses in its own cell, an RSSI value of a signal received from each wireless station apparatus, or the like. In addition, the wireless environment information also includes information regarding a medium use rate of all the available channels.

It is to be noted that since calculation of the U value, calculation of an initial temporary channel in each access point, and calculation of the total sum $U_{total}$ of the U values are the same as those in the seventh embodiment, a detailed description thereof will be omitted.

After determining temporary channels of all control target wireless access points of the system, the channel calculation unit 1032 calculates a total value $U_{total}$ of the U values of all the wireless access points. Then, improvement of the throughputs of wireless access points having a small U value is aimed at. After the temporary channels of all the wireless access points are determined, one of the wireless access points of which the U value is smaller than or equal to a predetermined $U_{TH}$ is selected, and it is checked whether there is no other channel in which the U value of the wireless access point is greater than a current value.

It is to be noted that a $U_{TH}$ value is a value greater than or equal to 0 and smaller than or equal to 1.

Then, a channel satisfying the condition of Expression (5) is calculated under condition 1 shown in Expression (4). It is to be noted that if there is no channel satisfying condition 2, a channel in which the U value is maximized in the wireless access point is selected, and the selected channel is determined as a temporary channel. This operation is repeatedly executed Max_r times.

$U_{total}^{(r)}$ of Expression (4) is a total sum of the U values in the $r^{th}$ iterative calculation. Further, α and β are parameters greater than or equal to 0 and smaller than or equal to 1, and it is possible to improve the system throughput and improve a locally decreasing throughput of the wireless access point by appropriately setting the value of α and the value of β.

Particularly, α is mainly a parameter regarding the system throughput, and β is mainly a parameter regarding fairness of a throughput and a lower throughput (0≤α and β≤1). When α increases, the channel is determined so that the system throughput is improved. Further, when β increases, the fairness of the throughput and the lower throughput is improved.

Condition 1: $U_{total}^{(r)} \geq \alpha \cdot U_{total}^{(r-1)}$ (4)

Condition 2: $U \leq \beta$ (5)

It is to be noted that α and β may be fixed values or may dynamically vary depending on a situation.

Ninth Embodiment

Next, a wireless communication system and a channel selection method in a ninth embodiment of the present invention will be described. Since configurations of apparatuses in the present embodiment is the same as those shown in FIG. 14, a detailed description will be omitted here. In the ninth embodiment, in an environment in which all or part of the control target wireless access points can perform communication using a plurality of wireless systems such as 2.4 GHz, 5 GHz, WiMax, and cellular, the channel assignment server 1003 calculates and sets both a wireless communication system and a channel to be used for each wireless access point Next, an operation of the wireless communication system in the ninth embodiment will be described. The wireless access point 1001 and the wireless access point 1002 shown in FIG. 14 are assumed to be able to perform communication using a first wireless communication system and a second wireless communication system between which a wireless communication scheme or the like is different. When the operation of the wireless access point 1001 starts, the wireless communication unit 1011 scans all channels of all the wireless communication systems available in wireless communication during a predetermined period at predetermined time intervals and outputs surrounding wireless environment information of the wireless access point itself to the wireless environment information holding unit 1015. This wireless environment information includes, for example, the number of other wireless access points in each available channel, identification information of each wireless access point, received signal strength (RSSI value: received signal strength indicator) of a signal such as a beacon received from each wireless access point. Further, the wireless environment information also includes, for example, the number of wireless station apparatuses in its own cell, and an RSSI value of a signal received from each wireless station apparatus. Further, the wireless environment information also includes information regarding a medium use rate of all the available channels.

Then, the channel calculation unit 1032 calculates a wireless communication system and a wireless channel to be used by each wireless access point based on the wireless environment information of each wireless access point collected from the information collection unit 1033 as follows. First, a $U_X$ value shown in Expression (6) is calculated for all wireless communication systems available in the wireless access point to which a channel is to be assigned and all channels available in each wireless communication system.

$U_X$=Expected throughput in other wireless communication system/average acquired throughput in wireless communication system that is current performing communication (6)

Here, the numerator of Expression (6) is an expected throughput obtained when the wireless access point uses the first wireless communication system or the second wireless communication system. Further, the denominator of Expression (6) is an average acquired throughput in a communication system and a channel that are currently used in communication in the wireless access point. It is to be noted that the numerator and the denominator of Expression (6) may be statistics using past data or may be instantaneous values.

The above $U_X$ value indicates an expected throughput value relative to the current throughput in a wireless access point to which a channel of a wireless communication scheme is to be assigned if the channel to be assigned to the wireless access point is changed to a channel of another wireless communication scheme. If the $U_X$ value is smaller than 1, this means that it is desirable that the wireless access point should not change a wireless communication scheme currently being used to another wireless communication scheme. In contrast, if the $U_X$ value is greater than or equal to 1, this means that it is desirable to change a wireless communication scheme current being used in communication of the wireless access point to another wireless communication scheme.

The channel assignment server 1003 can predict that an acquired throughput is maximized when a channel in which the $U_X$ value is greatest is selected in each wireless access point and thus the channel calculation unit 1032 calculates a channel of a wireless communication scheme in which the $U_X$ value is maximized as a temporary channel of the wireless access point.

After determining channels of temporary wireless communication schemes of all the control target wireless access points of the system, the channel calculation unit 1032 calculates a total value $U_{total}$ of the U values of all the wireless access points. Then, improvement of the throughputs of wireless access points having a small U value is aimed at. After the channels of the temporary wireless communication schemes of all the wireless access points are determined, one of the wireless access points having an $U_X$ value smaller than previously set $U_{TH}'$ is selected, and it is checked whether there is no channel of another wireless scheme in which the $U_X$ value of the wireless access point becomes greater than a current value.

Then, a channel satisfying the condition of Expression (8) is calculated under condition 1 shown in Expression (7). It is to be noted that if there is no channel satisfying condition 2, a channel of a wireless communication scheme in which the U value is maximized in the wireless access point is selected as a channel of a temporary wireless communication scheme. This operation is repeatedly executed Max_r times.

$U_{total}^{(r)}$ of Expression (7) is a total sum of the U values in the $r^{th}$ iterative calculation. Further, $\alpha$ and $\beta$ are parameters greater than or equal to 0 and smaller than or equal to 1, and it is possible to improve the system throughput and improve a locally decreasing throughput of the wireless access point by appropriately setting the value of $\alpha$ and the value $\beta$. Particularly, the value $\alpha$ is mainly a parameter regarding the system throughput, and the value $\beta$ is mainly a parameter regarding fairness of the throughput and a lower throughput ($0 \leq \alpha$ and $\beta \leq 1$). When the value $\alpha$ increases, the channel is determined so that the system throughput is improved. Further, when the value $\beta$ increases, the fairness of the throughput and the lower throughput are improved.

Condition 1: $U_{total}^{(r)} \geq \alpha \cdot U_{total}^{(r-1)}$     (7)

Condition 2: $U_X \geq \beta$     (8)

To simplify the description, above Expression (7) defines a total sum of the expected throughputs in all the wireless communication systems (here, the first wireless communication system and the second wireless communication system) as $U_{total}$. However, it is not always necessary to consider the total sum of the expected throughputs in all the wireless communication systems, and the above constraints may be applied to only part of the wireless communication systems.

Figure 27:
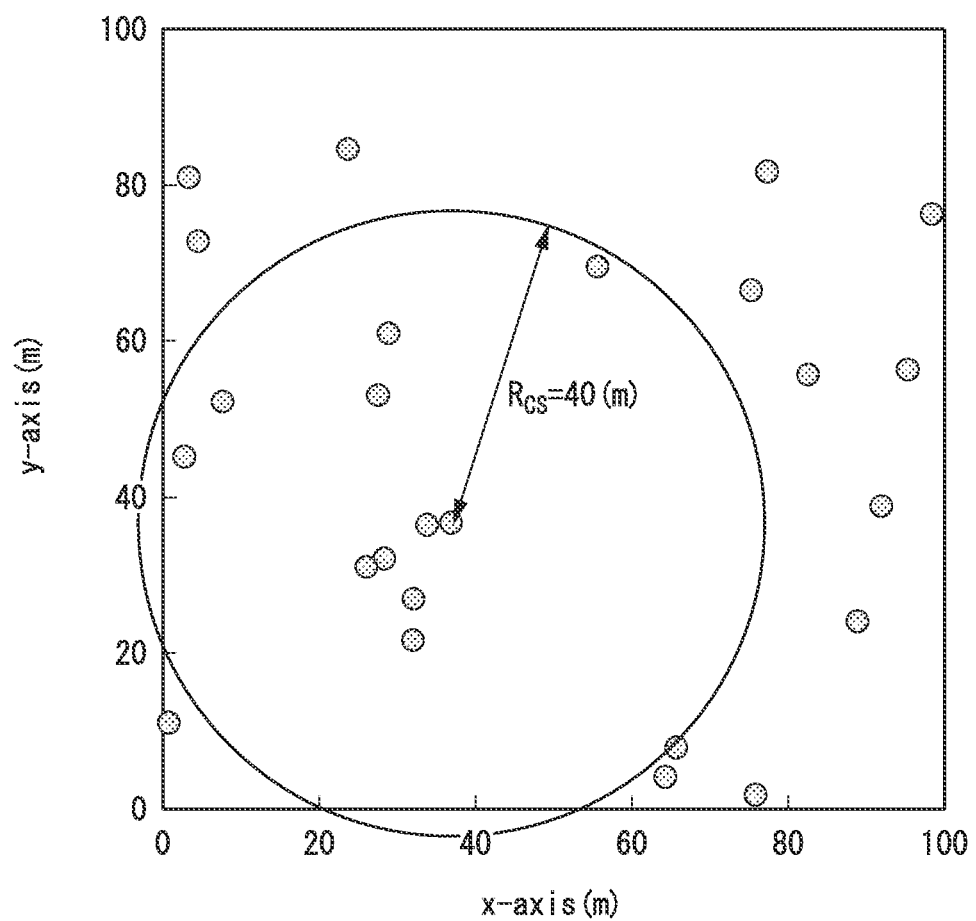
FIG. 27 is a diagram showing an environment of a computer simulation.

Next, advantageous effects of the present embodiment will be described through a computer simulation. FIG. 27 is a diagram showing an environment of the computer simulation. As shown in FIG. 27, 25 wireless access points (⊙ shown in FIG. 27) are randomly arranged in a square area of 100 m×100 m, and one wireless station apparatus is arranged in the same position as each wireless access point. The value $\alpha$ and the value $\beta$ were changed, and the system throughput and the FI value indicating fairness (Non-Patent Document 3) were calculated for each of the values in a case in which a channel was assigned to each wireless access point using the present embodiment, and a case in which an RSSI method in which each wireless access point selected a channel to be used in an autonomous distributed manner based on a conventional minimum RSSI method was used. It is to be noted that a carrier sensing range of a wireless access point and a wireless station apparatus belonging thereto was 40 m and the number of available channels was 3.

In the computer simulation, the wireless access point transmits a data frame based on CSMA/CA defined in the IEEE802.11 standard. The parameter values of CSMA/CA are as follows. SlotTime=9 μs, SIFS=16 μs, CWmin=15, CWmax=1023, ShortRetryLimit=7, LongRetryLimit=4, DataRate=54 Mbps, and BasicRate=6 Mbps. In the computer simulation, UDP downlink traffic in a saturated state in which a packet length was 1500 bytes was transmitted from the wireless access point toward the wireless station apparatus and the throughput of each cell was calculated using the number of packets that were able to be correctly received during 30 seconds in the wireless station apparatus.

Figure 28:
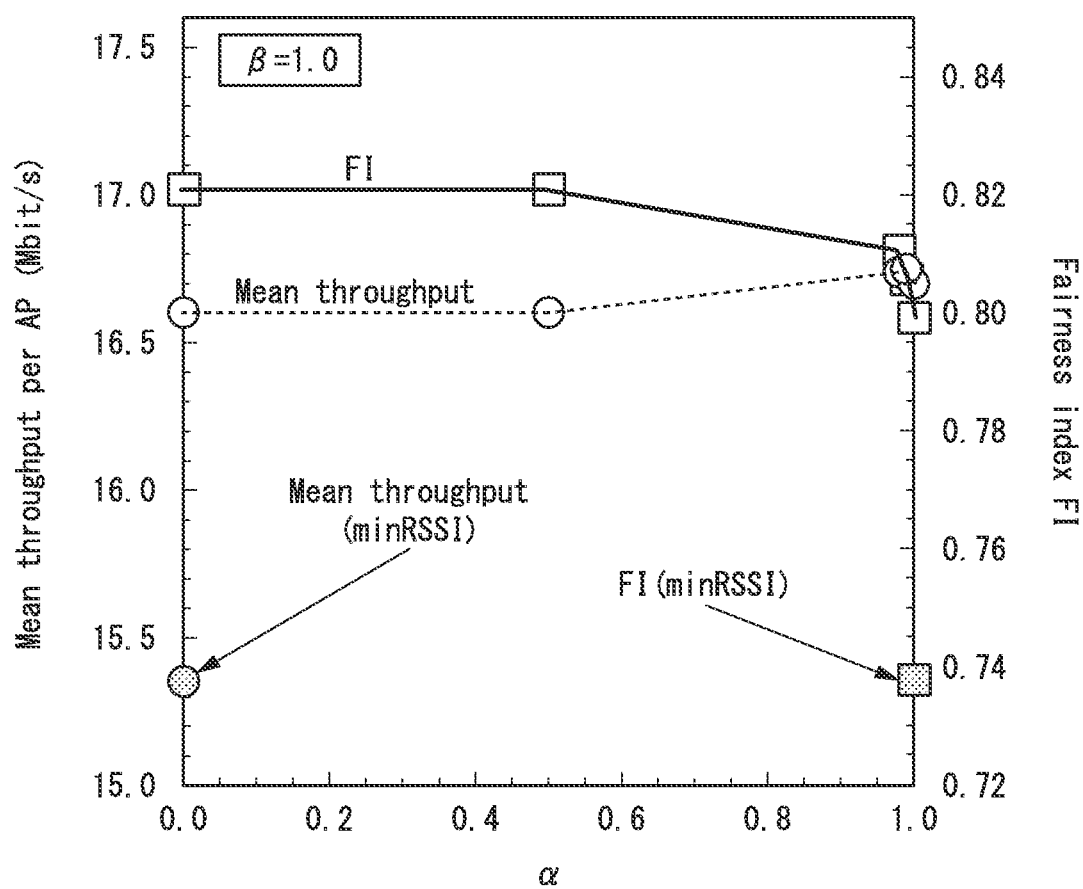
FIG. 28 is a diagram showing a total throughput and an FI value of a system for a value $\alpha$ in the computer simulation.

FIG. 28 shows a total throughput and an FI value of the system for the value $\alpha$ in the calculation simulation. Further, FIG. 29 shows a total throughput and an FI value of the system for the $\beta$ value in the calculation simulation.

Figure 29:
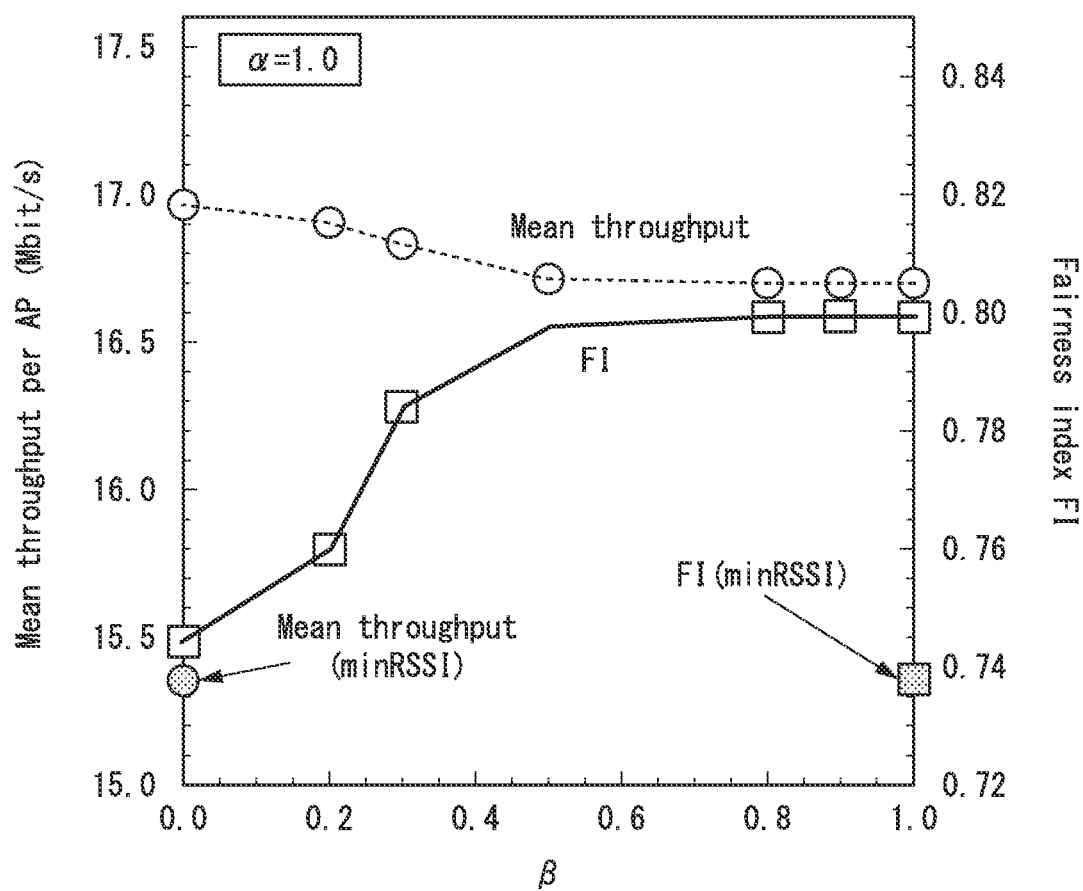
FIG. 29 is a diagram showing a total throughput and an FI value of a system for a value $\beta$ in the computer simulation.

It can be seen from the results shown in FIGS. 28 and 29 that the present embodiment can design an appropriate channel assignment system by appropriately setting the value $\alpha$ and the value $\beta$ depending on requirements, such as improvement of a system throughput and/or a lower throughput (fairness of the throughput).

In this way, the throughput and the fairness FI in the entire system can be improved in comparison with the RSSI method, and a detailed request regarding required indices (system throughput and lower throughput) can be handled by introducing a parameter into each index and appropriately changing the parameter.

Tenth Embodiment

Next, a wireless communication system and a channel selection method in a tenth embodiment of the present invention will be described. Since configurations of the apparatuses in the present embodiment are the same as the configurations shown in FIG. 14, a detailed description will be omitted here.

Next, an operation of the wireless communication system in the tenth embodiment will be described. First, when the operation of the wireless access point 1001 starts, the wireless communication unit 1011 scans all channels available in wireless communication during a predetermined period at predetermined time intervals and outputs surrounding wireless environment information of the wireless access point itself to the wireless environment information holding unit 1015. This wireless environment information includes, for example, the number of other wireless access points present in each available channel, identification information of each wireless access point, and information regarding capability of each wireless access point such as available maximum bandwidth, received signal strength (RSSI value:

received signal strength indicator) of a signal such as a beacon received from each wireless access point. Further, the wireless environment information also includes, for example, the number of wireless station apparatuses in the own cell, an RSSI value of a signal received from each wireless station apparatus, and information regarding capability such as an available maximum bandwidth of each wireless station apparatus.

Then, the channel calculation unit 1032 calculates a wireless channel and a bandwidth to be used by each wireless access point based on the wireless environment information of each wireless access point collected from the information collection unit 1033 as follows. First, a U value shown in Expression (9) is calculated on all channels available in the wireless access point to which the channel is to be assigned.

$$U=\text{Exptd\_Thput}/\min(\text{Max\_Thput},\text{Offered\_Load}) \quad (9)$$

Here, Exptd_Thput of Expression (9) is a throughput (expected throughput) that can be acquired when the wireless access point shares the channel with a neighboring wireless access point. Further, Max_Thput is a maximum throughput that can be acquired when only the wireless access point uses the channel (that is, when there is no other interfering wireless access point and no wireless station apparatus belonging thereto). Further, Offered_Load is the amount of traffic generated in the wireless access point. Further, a function min(a, b) is a function that outputs the smaller of a and b.

The U value indicates an expected throughput value for the amount of traffic generated in the wireless access point to which the channel is to be assigned. The U value is greater than or equal to 0 and smaller than or equal to 1. As the U value increases, the expected throughput of the wireless access point increases.

Hereinafter, a method for calculating Exptd_Thput, Max_Thput, and Offered_Load will be described.

The number of wireless station apparatuses that use a maximum bandwidth b (unit: MHz) among the wireless station apparatuses belonging to an access point (wireless access point) a is denoted as $$n_{(b)}^{(a)} \quad \text{[Expression 5]}$$

For example, when there is one IEEE 802.11a (hereinafter referred to as non-high throughput (non-HT)) station that supports a maximum of 20 MHz that supports 80 MHz (i.e., that supports IEEE 802.11ac), two IEEE 802.11n (hereinafter referred to as high throughput (HT)) stations that support a maximum of 40 MHz, and three IEEE 802.11ac (hereinafter referred to as very high throughput (VHT)) stations that support a maximum of 80 MHz, which are associated with the access point a, $$n_{(20)}^{(a)}=1, n_{(40)}^{(a)}=2, n_{(80)}^{(a)}=3 \quad \text{[Expression 6]}$$

are satisfied.

If information regarding the number of wireless station apparatuses and available maximum bandwidths thereof (i.e., capability of the wireless station apparatuses) is not included in the collected wireless environment information, it is assumed that there is one wireless station apparatus having the same capability as maximum capability of the access point a.

Here, $n^{(a)}$ is a total number of wireless station apparatuses belonging to the access point a. That is, $$n^{(a)}=n_{(20)}^{(a)}+n_{(40)}^{(a)}+n_{(80)}^{(a)} (n^{(a)} \geq 1) \quad \text{[Expression 7]}$$

is satisfied.

Further, $\gamma^{(a)}$ is assumed to be a ratio of a transmission opportunity to transmit a frame per belonging wireless station apparatus in the access point a. When the same number of A (Aggregation)-MSDUs/MSDUs are accommodated for all the belonging wireless station apparatuses, $$\gamma^{(a)}=1/n^{(a)} \text{ is satisfied.}$$

Further, when $L^{(s,a)}$ is assumed to be the amount of data (bit) (i.e., A-MPDU length) that the access point a transmits to a belonging wireless station apparatus s in one frame transfer, it is denoted as $$L^{(s,a)}=L_{(A\text{-}MSDU)}^{(s,a)} \times 8 \times \text{numMPDU}^{(s,a)} \quad \text{[Expression 8]}$$

Here, $$L_{(A\text{-}MSDU)}^{(s,a)} \quad \text{[Expression 9]}$$

is an A-MSDU length (byte) that the access point a transmits to the belonging wireless station apparatus s (an MSDU length if A-MSDU is unused). Further, numMPDU$^{(s,a)}$ is the number of MPDUs included in A-MPDU that the access point a transmits to the belonging wireless station apparatus s.

When the total time (μsec) in which the channel is occupied when the access point a transfers a frame to the belonging wireless station apparatus s using the bandwidth b is denoted as $$t_{(b)}^{(s,a)} \quad \text{[Expression 10]},$$

it can be represented as $$t_{(b)}^{(s,a)} = T_{OH}^{(s,a)} + T_{DATA} \times \text{numMPDU}^{(s,a)} \times \frac{1300}{R_{(b)}^{(s,a)} \times R^{(coef)}}. \quad \text{[Expression 11]}$$

Here, $$T_{OH}^{(s,a)} \quad \text{[Expression 12]}$$

is an overhead value (μsec) such as carrier sensing, random back-off, pre-amble, ACK/BA (Block ACK) time, RTS time, and CTS time.

$T_{DATA}$ is the time (μsec) necessary to transmit data of numMPDU$^{(s,a)}$ at a transfer rate (data rate) of 1300 Mbit/s.

$$R_{(b)}^{(s,a)} \quad \text{[Expression 13]}$$

is a data rate (Mbit/s) at which the access point a transmits a frame to the belonging wireless station apparatus s using the bandwidth b. Further, $R^{(coef)}$ is a data rate conversion coefficient.

Here, $$R^{(coef)} = \begin{cases} 108/52; & (b = 20 \to 40) \\ 234/52; & (b = 20 \to 80) \\ 234/108; & (b = 40 \to 80) \\ 52/108; & (b = 40 \to 20) \\ 52/234; & (b = 80 \to 20) \\ 108/234; & (b = 80 \to 40) \\ 1.0; & \text{otherwise} \end{cases} \quad \text{[Expression 14]}$$

For example, if a data rate when a data frame is transmitted in a band of 40 MHz (i.e., b=40 MHz) toward an HT-support wireless station apparatus having a maximum capability of 40 MHz is 450 Mbit/s, a data rate conversion coefficient when the data frame is transmitted in a bandwidth of 20 MHz (i.e., b=20 MHz) toward the wireless station apparatus becomes $R^{(coef)}$=52/108 (i.e., b=40→20), and the use data rate is $$R_b^{(s,a)} \times R^{(coef)} = 450 \times \frac{52}{108} = 216.7 \; Mbit/s.$$ [Expression 15]

Then, when Max_Thput$^{(a)}$ is assumed to be a maximum throughput (Mbit/s) that can be acquired in an environment in which only the access point a is present, it can be expressed as $$Max\_Thput^{(a)} = \frac{\sum_{s=1}^{n^{(a)}} L^{(s,a)}}{\sum_{s=1}^{n^{(a)}} t_{(b)}^{(sa,)}}.$$ [Expression 16]

Max_Thput$^{(a)}$ is a maximum throughput that can be acquired at the time of full buffering in which the access point a always transmits data to a belonging wireless station apparatus in the environment in which only the access point a is present.

Here, $\theta^{(a)}$ is assumed to be an accommodated traffic amount (Mbit/s) per belonging wireless station apparatus in the access point a.

Further, $\alpha^{(a)}$ is assumed to be a maximum value of a channel access probability of the access point a. This is a time rate at which the channel is to be occupied, and when $\alpha^{(a)}$=1, the channel is saturated by only the access point a. $\alpha^{(a)}$ can be defined by the following expression.

$$\alpha^{(a)} = \min\left(\frac{\theta^{(a)} \times n^{(a)}}{Max\_Thput^{(a)}}, 1\right)$$ [Expression 17]

It is to be noted that $\theta^{(a)} \times n^{(a)}$ is the total amount of traffic generated in the access point a.

Next, a method for calculating an acquirable throughput when the channel is shared will be described.

$A_{(P)}^{(a)}$ [Expression 18]

is assumed to be a set of wireless access points that can be detected in the controllable access point a and that use a primary channel of the controllable access point a as the primary channels.

The set:

$A_{(P)}^{(a)}$ [Expression 19]

also includes the controllable access point a, a temporarily assigned controllable wireless access point, and an uncontrollable wireless access point outside the system.

It is to be noted that $|A_{(P)}^{(a)}|$ [Expression 20]

is assumed to be the number (≥1) of access points in the set $A_{(P)}^{(a)}$ [Expression 21]

In the same way, $A_{(S20)}^{(a)}$ [Expression 22]

is assumed to be a set of wireless access points that can be detected in the controllable access point a and that use a secondary 20 channel of the controllable access point a as their primary channels.

Further, $A_{(S40)}^{(a)}$ [Expression 23]

is assumed to be a set of wireless access points that can be detected in the controllable access point a and that use a secondary 40 channel of the controllable access point a as their primary channels.

Here, $|A_{(S20)}^{(a)}| \geq 0, |A_{(S40)}^{(a)}| \geq 0$ [Expression 24]

When $\beta_{(c,20)}^{(a)}$ [Expression 25]

is assumed to be a probability that the controllable access point a is able to access the primary channel when a channel c is assigned as the primary channel to the controllable access point a, it can be represented as $\beta_{(c,20)}^{(a)} = 1/|A_{(P)}^{(a)}|$ [Expression 26]

Further, $B^{(a)}$ is assumed to be a subset of access points that satisfies Equation 28 in the set of Equation 27.

$A_{(P)}^{(a)}$ [Expression 27]

$\alpha^{(a)} < \beta_{(c,20)}^{(a)}$ [Expression 28]

It is to be noted that $B^{(a)}$ also includes the controllable access point a, the temporarily assigned controllable wireless access point, and the wireless access point outside the system.

Further, $B^{(a)} \subseteq A_{(P)}^{(a)}$ [Expression 29]

is satisfied.

Furthermore, $|B^{(a)}| \leq 0$ [Expression 30]

is satisfied.

Here, when $\lambda_{(P)}^{(a)}$ [Expression 31]

is assumed to be a probability of the controllable access point a accessing the primary channel, $\lambda_{(P)}^{(a)}$ [Expression 32]

can be defined as follows:

$$\lambda_{(P)}^{(a)} = \begin{cases} \alpha^{(a)}; & \text{the following condition} \\ \max(\frac{1-\sum\alpha^{(i)}}{|A_{(P)}^{(a)}-B^{(a)}|}, \beta_{(c,20)}^{(a)}); & \text{otherwise} \end{cases}$$ [Expression 33]

condition: $\Sigma_{i \in A_{(P)}^{(a)}} \alpha^{(i)} < 1$ or $\alpha^{(a)} < \beta_{(c,20)}^{(a)}$.

Further, $\lambda_{(S20)}^{(a)}$ [Expression 34]

is assumed to be a probability of the controllable access point a accessing the secondary 20 channel $(\lambda_{(S20)}^{(a)} \geq 0)$ [Expression 35]

(which is necessary only when the controllable access point a supports 40 MHz).

Further, $\lambda_{(S40)}^{(a)}$ [Expression 36]

is assumed to be a probability of the controllable access point a accessing the secondary 40 channel $(\lambda_{(S40)}^{(a)} \geq 0)$ [Expression 37]

(which is necessary only when the controllable access point a supports 80 MHz).

$$\lambda_{(S20)}^{(a)} \quad \text{[Expression 38]}$$

and $$\lambda_{(S40)}^{(a)} \quad \text{[Expression 39]}$$

are defined as follows.

$$\lambda_{(S20)}^{(a)} = \min\left((1 - \Sigma_{i \in A_{(S20)}^{(a)}} \alpha^{(i)}) / \overline{N}_{(S20)}^{(a)}, 0\right) \quad \text{[Expression 40]}$$

$$\lambda_{(S40)}^{(a)} = \min\left((1 - \Sigma_{i \in A_{(S40)}^{(a)}} \alpha^{(i)}) / \overline{N}_{(S40)}^{(a)}, 0\right)$$

Here, $$\overline{N}_{(S20)}^{(a)} (\geq 1) \quad \text{[Expression 41]}$$

is the number of wireless access points accessing the secondary 20 channel as the secondary channel (however, other wireless access points in the following set which shares the primary channel are not included).

$$A_{(P)}^{(a)} \quad \text{[Expression 42]}$$

Further, $$\overline{N}_{(S40)}^{(a)} (\geq 1) \quad \text{[Expression 43]}$$

is the number of other wireless access points accessing the secondary 40 channel as the secondary channel (however, other wireless access points in the following set which shares the primary channel are not included).

$$A_{(P)}^{(a)} \quad \text{[Expression 44]}$$

Finally, if $$\text{Exptd\_Thput}_{(c)}^{(a)} \quad \text{[Expression 45]}$$

is assumed to be an expected throughput (Mbit/s) when the channel c is assigned to the controllable access point a as a primary channel, $$\text{Exptd\_Thput}_{(c)}^{(a)} \quad \text{[Expression 46]}$$

can be defined as follows:

$$\text{Exptd\_Thput}_{(c)}^{(a)} = \min\left(\frac{\lambda_{(P)}^{(a)} \times \gamma^{(a)} \times \sum_{s=1}^{(a)} L^{(s,a)}}{\sum_{k=1}^{6} T_k}, \theta^{(a)} \times n^{(a)}\right) \quad \text{[Expression 47]}$$

Here, $T_k$ is calculated as follows.

Communication times $T_1$ to $T_3$ using bandwidth b=20 (MHz) are calculated as follows.

When the station s is non-HT (that supports the IEEE 802.11a standard), $$T_1 = \Sigma_{i \in A_{(P)}^{(a)}} (\lambda_{(P)}^{(i)} \gamma^{(i)} \Sigma_{s=1}^{n^{(i)}} t_{(20)}^{(s,i)}) \quad \text{[Expression 48]}$$

When the station s is HT (that supports the IEEE 802.11n standard), $$T_2 = \Sigma_{i \in A_{(P)}^{(a)}} (\lambda_{(P)}^{(i)} (1 - \lambda_{(S20)}^{(i)}) \gamma^{(i)} \Sigma_{s=1}^{n^{(i)}} t_{(20)}^{(s,i)}) \quad \text{[Expression 49]}$$

When the station s is VHT (that supports the IEEE 802.11ac standard), $$T_3 = \Sigma_{i \in A_{(P)}^{(a)}} (\lambda_{(P)}^{(i)} (1 - \lambda_{(S20)}^{(i)}) \gamma^{(i)} \Sigma_{s=1}^{n^{(i)}} t_{(20)}^{(s,i)}) \quad \text{[Expression 50]}$$

On the other hand, communication times $T_4$ to $T_5$ using bandwidth b=40 (MHz) are calculated as follows.

When the station s is HT (that supports IEEE 802.11n standard), $$T_4 = \Sigma_{i \in A_{(P)}^{(a)}} (\lambda_{(P)}^{(i)} \lambda_{(S20)}^{(i)} \gamma^{(i)} \Sigma_{s=1}^{n^{(i)}} t_{(40)}^{(s,i)}) \quad \text{[Expression 51]}$$

When the station s is VHT (that supports the IEEE 802.11ac standard), $$T_5 = \Sigma_{i \in A_{(P)}^{(a)}} (\lambda_{(P)}^{(i)} \lambda_{(S20)}^{(i)} (1 - \lambda_{(S40)}^{(i)}) \gamma^{(i)} \Sigma_{s=1}^{n^{(i)}} t_{(40)}^{(s,i)}) \quad \text{[Expression 52]}$$

On the other hand, a communication time $T_6$ using bandwidth b=80 (MHz) is calculated as follows.

When the station s is VHT (that supports the IEEE 802.11ac standard), $$T_6 = \Sigma_{i \in A_{(P)}^{(a)}} (\lambda_{(P)}^{(i)} \lambda_{(S20)}^{(i)} \lambda_{(S40)}^{(a)} \gamma^{(i)} \Sigma_{s=1}^{n^{(i)}} t_{(80)}^{(s,i)}) \quad \text{[Expression 53]}$$

Finally, when $$U_{(c)}^{(a)} \quad \text{[Expression 54]}$$

is assumed to be a utility function (a degree of satisfaction) of the access point a when the channel c is assigned to the controllable access point a as a primary channel, $$U_{(c)}^{(a)} \quad \text{[Expression 55]}$$

can be redefined as follows.

$$U_{(c)}^{(a)} = \frac{\text{Exptd\_Thput}_{(c)}^{(a)}}{\min(\text{Max\_Thput}^{(a)}, \theta^{(a)} \times n^{(a)})} \quad (0 < U_{(c)}^{(a)} \leq 1) \quad \text{[Expression 56]}$$

It is to be noted that the present embodiment assumes that opportunities for the access point to transmit data to belonging wireless station apparatuses are all the same, but the present embodiment is not limited thereto. If a ratio of a transmission opportunity of data for each belonging wireless station apparatus can be recognized, such a value may be used.

The channel assignment server 1003 can predict that the acquired throughput is maximized when a set of a channel and a bandwidth in which the U value is greatest is selected in each wireless access point.

The present embodiment aims at optimization using iterative calculation. Further, in the case of, for example, best-effort traffic, even when the U value is not necessarily 1, there is no problem if a user of the belonging wireless station apparatus feels satisfaction. Therefore, the channel calculation unit 1032 calculates a channel and a bandwidth in which the U value is greater than or equal to a predetermined value $\beta (0 \leq \beta \leq 1)$ as a temporary channel of the wireless access point.

That is, the access point a selects a channel c and a bandwidth b satisfying:

$$U_{(c)}^{(a)} \geq \beta \quad \text{[Expression 57]}$$

as a temporary channel and a temporary bandwidth. If there are a plurality of candidates for such a channel and such a bandwidth, one set of the channel and the bandwidth is selected randomly from among the candidates. Further, if there are no channel c and no bandwidth b satisfying:

$$U_{(c)}^{(a)} \geq \beta \quad \text{[Expression 58]},$$

a channel and a bandwidth in which $$U_{(c)}^{(a)} \quad \text{[Expression 59]}$$

is maximized are selected as a temporary channel and a temporary bandwidth.

After determining temporary channels and temporary bandwidths of all wireless access points that are control targets of the system, the channel calculation unit 1032 calculates a total value $U_{total}$ of U values of all wireless access points or a multiplied value $U_{product}$ of the U values of all wireless access points. Then, improvement of throughputs of the wireless access points having a small U value is aimed at. After the temporary channels and the temporary bandwidths of all the wireless access points are determined, one of the wireless access points having U values that are smaller than or equal to a predetermined $U_{TH}$ is selected, and a channel c and a bandwidth b in which the U value of the wireless access point satisfies $$U_{(c)}^{(a)} \geq \beta \quad \text{[Expression 60]}$$

are temporarily selected as a new temporary channel and a new temporary bandwidth.

If there are no channel c and no bandwidth b satisfying:

$$U_{(c)}^{(a)} \geq \beta \quad \text{[Expression 61]},$$

a channel and a bandwidth in which $$U_{(c)}^{(a)} \quad \text{[Expression 62]}$$

is maximized are temporarily selected as a new temporary channel and a new temporary bandwidth.

It is to be noted that the $U_{TH}$ value is a value greater than or equal to 0 and smaller than or equal to 1.

Specifically, the U values are calculated again for all channels and all bandwidths available in the wireless access point, a total U value of all the wireless access points that are control targets in the system or a multiplied value of the U values is calculated, and it is checked whether the total U value or the multiplied U value is α times or more the value after an immediately previous iterative calculation.

That is, when the total U value in the $(r+1)^{th}$ iterative calculation is $U_{total}(r+1)$ the newly selected temporary channel is determined as the temporary channel of the wireless access point if a condition of $U_{total}^{(r+1)} \geq \alpha \cdot U_{total}^{(r)}$ is satisfied. Further, the bandwidth at this time is determined as the new temporary bandwidth. If the condition is not satisfied, the new temporary channel and the new temporary bandwidth are not adopted, and the temporary channel and the temporary bandwidth calculated at the $r^{th}$ time are determined as the temporary channel and the temporary bandwidth of the wireless access point.

On the other hand, a conditional expression when the determination is performed based on the multiplied value is as follows:

$$U_{product}^{(r+1)} \geq \alpha \cdot U_{product}^{(r)}$$

Subsequently, a channel and a bandwidth in which the U values of the wireless access points having a small U value are improved or the U value ($U_{total}$ or $U_{product}$) of the entire system is improved are selected once again.

It is to be noted that α and β are parameters greater than or equal to 0 and smaller than or equal to 1. It is possible to improve the system throughput and to improve a locally decreasing throughput of the wireless access point by appropriately setting the value α and the value β.

Particularly, α is mainly a parameter regarding the system throughput, and β is mainly a parameter regarding fairness of a throughput and a lower throughput (0≤α and β≤1). When α increases, the channel is determined so that the system throughput is improved. Further, when β increases, the fairness of the throughput and the lower throughput are improved.

It is to be noted that α and β may be fixed values or may dynamically vary depending on a situation.

It is possible to improve the total throughput of the system and improve fairness of the throughputs between the cells by executing the operation of selecting the channel and the bandwidth so that the U values of wireless access points having the small U value are improved a predetermined number of times (the number of recursions Max_r) in this manner. The above operation is repeated the predetermined number of times Max_r, and a new temporary channel and a new bandwidth are finally reflected in each wireless access point.

Figure 30:
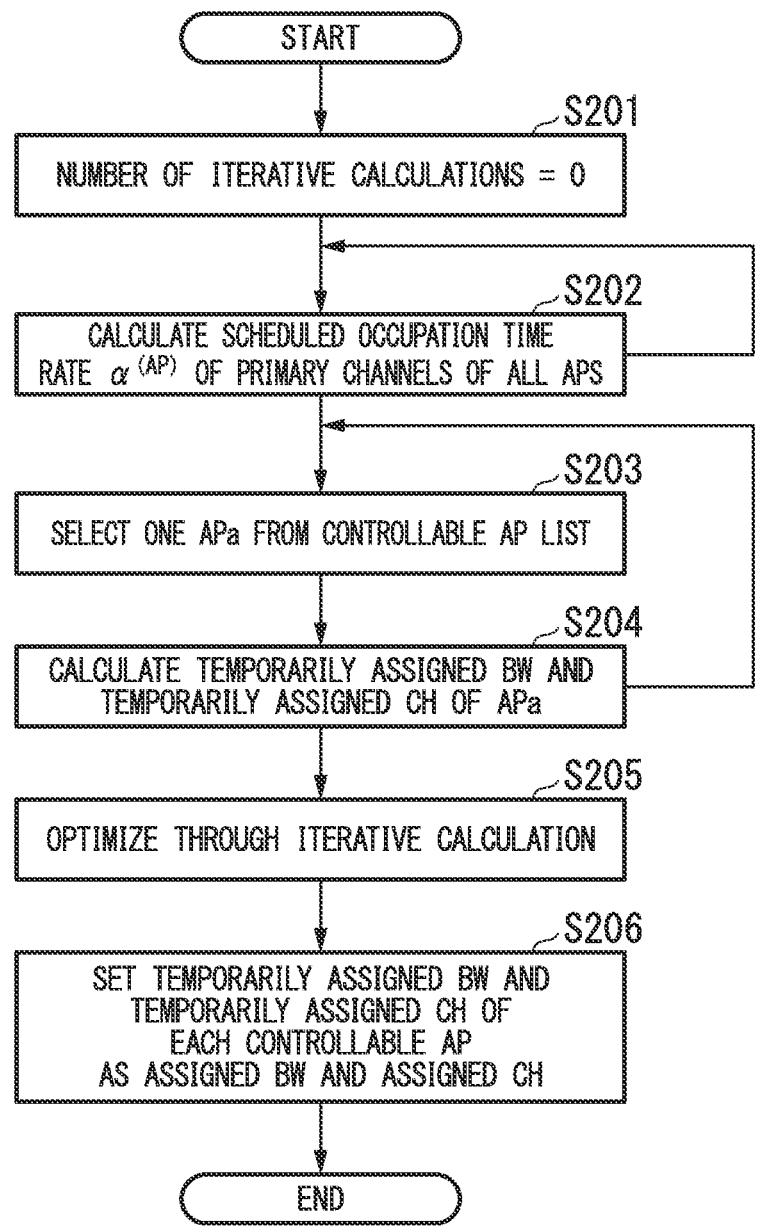
FIG. 30 is a flowchart showing an operation in which a channel calculation unit performs a channel selection process in a tenth embodiment.

Next, an operation in which the channel calculation unit 1032 in the tenth embodiment performs a channel selection process will be described with reference to FIGS. 30 to 35. FIG. 30 is a flowchart showing the operation in which the channel calculation unit 1032 in the tenth embodiment performs the channel selection process.

First, as an initial setting, 0 is substituted into the number of iterative calculations (step S201). Then, a scheduled occupation time rate in a control target (controllable) wireless access point and other neighboring wireless access points that are not control targets (uncontrollable) detected by the control target wireless access point is calculated (step S202). That is, the calculation of the scheduled occupation time rate is performed on all wireless access points that can be detected, regardless of whether they are inside or outside the system.

Then, a wireless access point for which a channel and a bandwidth are to be set is selected from a list of wireless access points of which a channel and a bandwidth (hereinafter indicated as BW in the drawings) have not been set (hereinafter referred to as a controllable wireless access point list) (step S203). In this case, as a method for selecting the wireless access point, a method for randomly selecting a wireless access point, a method for selecting a wireless access point in a manually set order (an order of priority set by a network operator or the like in advance), or a method for selecting a wireless access point in an order of wireless access points having a larger bottleneck (descending order of the number of neighboring wireless access points) can be applied. Then, a channel and a bandwidth to be set in the selected wireless access point are temporarily determined in accordance with a channel assignment algorithm (step S204). The process in steps S203 and S204 is executed on all the controllable wireless access points.

When temporarily assigned channels (temporary channels: temporarily assigned CHs) and temporarily assigned bandwidths (temporary bandwidths: temporarily assigned BWs) of all controllable wireless access points are determined, optimization of the temporarily assigned channels and the temporarily assigned bandwidths of the controllable wireless access points are performed through iterative calculation (step S205). After the iterative calculation, the temporarily assigned channel and the temporarily assigned bandwidth of each controllable wireless access point are finally set in each wireless access point as an assigned channel and an assigned bandwidth (step S206).

Figure 31:
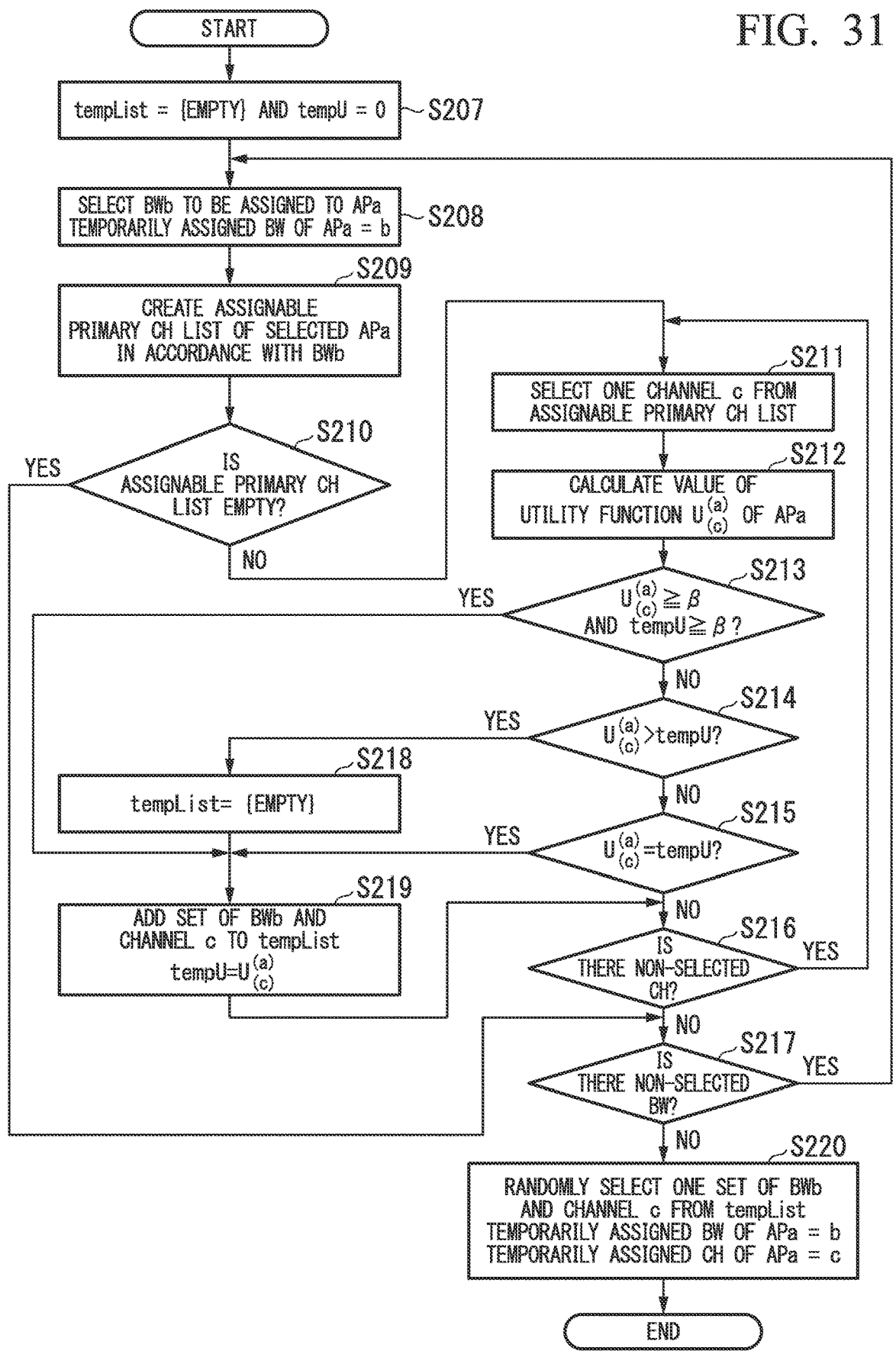
FIG. 31 is a diagram showing a process of determining a temporarily assigned channel and a temporarily assigned bandwidth of a selected controllable wireless access point.

Next, a method for determining a temporarily assigned channel and a temporarily assigned bandwidth in step S204 will be described using FIG. 31. FIG. 31 is a diagram showing a process of determining a temporarily assigned channel and a temporarily assigned bandwidth of a selected controllable wireless access point.

First, the following process is performed as an initial setting. That is, tempList is prepared to store a set of a temporarily assignable channel and bandwidth. Further, a variable called tempU is prepared to store a current maximum U value of the wireless access point that has been selected (hereinafter referred to as a selected wireless access point). Then, tempList is set to be empty and 0 is substituted into tempU (step S207).

Then, one of bandwidths that can be assigned to the selected wireless access point is selected (step S208). The bandwidth that can be assigned is a value determined by capability (e.g., an available maximum bandwidth) of a wireless access point and the belonging wireless station apparatuses. For example, if the selected wireless access point supports IEEE802.11ac, the assignable bandwidths are 20 MHz, 40 MHz, and 80 MHz. Further, if the selected wireless access point supports IEEE802.11n, the assignable bandwidths are 20 MHz and 40 MHz. Further, if the selected wireless access point supports only IEEE802.11a, the assignable bandwidth is 20 MHz.

The bandwidth to be assigned to the selected wireless access point may be determined only from the capability of the wireless access point as described above or may be determined by additionally considering information regarding the capabilities of the belonging wireless station apparatuses. For example, although the assignable bandwidths are 20 MHz, 40 MHz, 80 MHz when the selected wireless access point supports IEEE802.11ac, if there are only belonging wireless station apparatuses that support 20 MHz and 40 MHz, a bandwidth to be assigned to the wireless access point may be limited to 20 MHz and 40 MHz.

Then, a list of primary channels that can be assigned to the selected wireless access point (hereinafter referred to as an assignable primary channel list) is created (step S209). A unit channel that should be necessarily used regardless of a transmission bandwidth when communication is performed within a cell configured by an access point and stations is defined in Non-Patent Document 2, and this is called a primary channel. On the other hand, a channel that is used when communication is performed, but is not the primary channel is called a secondary channel (in Non-Patent Document 2, a secondary x MHz channel, where x is a number that is any one of 20, 40, and 80).

Then, it is checked whether the assignable primary channel list created in step S209 is empty (step S210). If the assignable primary channel list is empty (YES in step S210), a cell using the assigned bandwidth selected for the wireless access point cannot be started up, and thus step S217 to be described below is executed. In contrast, if the assignable primary channel list is not empty (NO in step S210), the process proceeds to step S211.

In step S211, one channel is selected from the assignable primary channel list. Then, a U value of the wireless access point in the selected channel is calculated (step S212). Then, it is checked whether the U value of the wireless access point in the selected bandwidth and the selected channel is greater than or equal to the predetermined β and the tempU value is greater than or equal to β (step S213). It is to be noted that $0 \leq \beta \leq 1$ is satisfied.

If the condition is satisfied (YES in step S213), a set of the selected bandwidth and the selected channel is added to tempList, and the tempU value is updated with the U value calculated in step S212 (step S219). In contrast, if the condition is not satisfied (NO in step S213), it is checked whether the U value is greater than a current tempU value (step S214).

If the condition is satisfied (YES in step S214), the current tempList is entirely emptied (step S218), and the set of the selected bandwidth and the selected channel is added to tempList, and the tempU value is updated with the U value calculated in step S212 (step S219). In contrast, if the condition of step S214 is not satisfied (NO in step S214), it is checked whether the U value is equal to the current tempU value (step S215).

If the condition is satisfied (YES in step S215), the set of the selected bandwidth and the selected channel is added to tempList, and the tempU value is updated with the U value calculated in step S212 (step S219). In contrast, if the condition of step S215 is not satisfied, the selected channel is ignored and the process proceeds to step S216.

It is checked in step S216 whether there is a non-selected channel in the assignable primary channel list (step S216), and if there is a non-selected channel (YES in step S216), step S211 is executed again. That is, the process of steps S211 to S215 and S218 to S219 is executed on all assignable primary channels. In contrast, if there is no non-selected channel in the assignable primary channel list (NO in step S216), it is checked whether there is a non-selected bandwidth among bandwidths assigned to the wireless access point (step S217). If there is a non-selected bandwidth (YES in step S217), step S208 is executed. That is, the process of steps S208 to S216 and S218 to S219 is executed on all the assignable bandwidths. In contrast, if there is no non-selected bandwidth (NO in step S217), one set of a bandwidth and a channel is randomly selected from tempList at last (step S220). The selected bandwidth and the selected channel are a temporarily assigned bandwidth and a temporarily assigned channel of the wireless access point.

Figure 32:
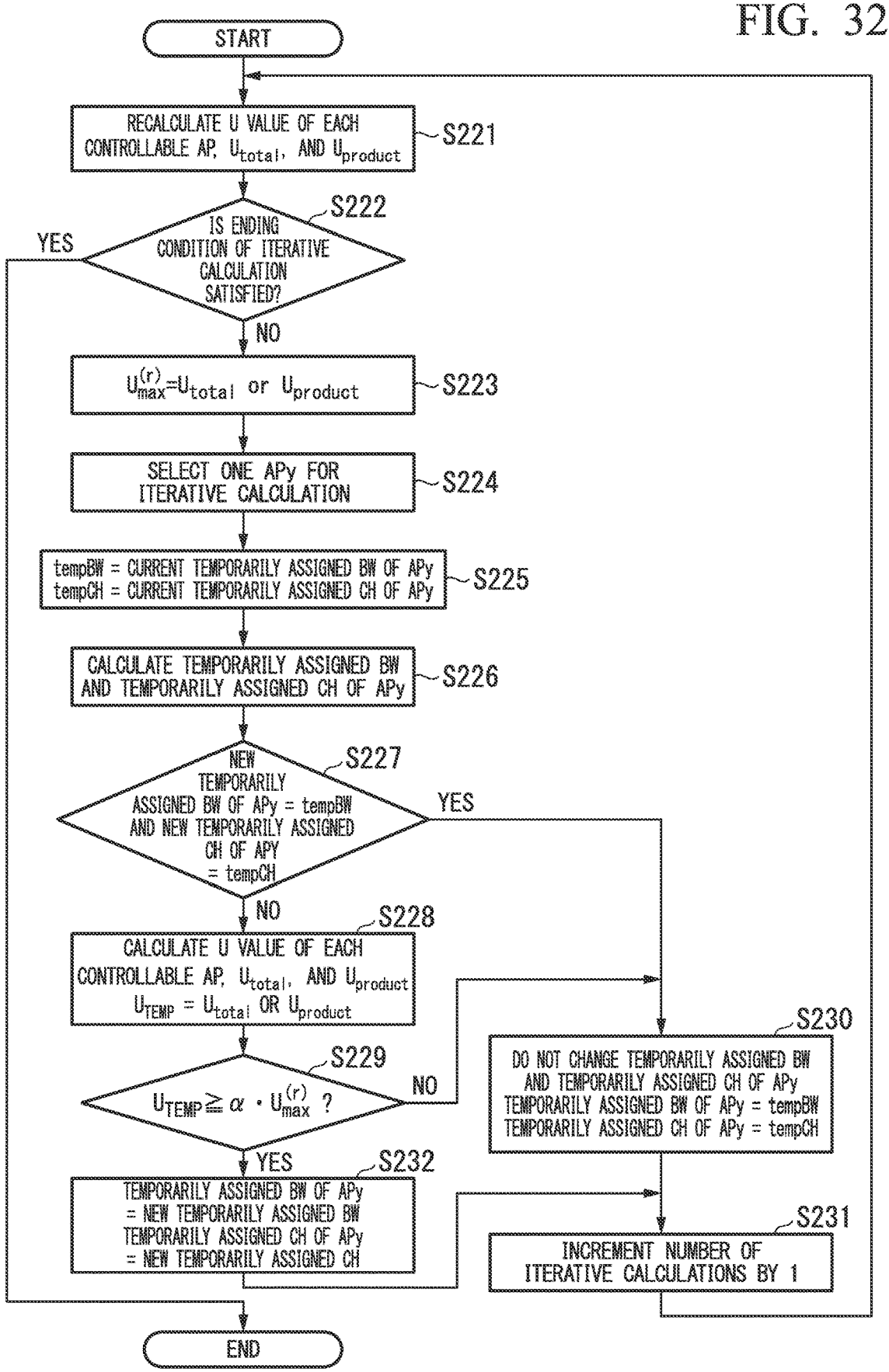
FIG. 32 is a diagram showing a process of improving a U value of a controllable wireless access point through iterative calculation.

Then, a method for optimizing the channel and the bandwidth using iterative calculation for a controllable wireless access point for which the temporarily assigned channel and the temporarily assigned bandwidth have been determined (step S205 of FIG. 30) will be described using FIG. 32. FIG. 32 shows a process of improving the U value of the controllable wireless access point using the iterative calculation.

First, current U values of all controllable wireless access points are calculated. Then, a sum ($U_{total}$ and a product ($U_{product}$) of the U values of all the controllable wireless access points are calculated (step S221). Then, it is checked whether an ending condition for the iterative calculation is satisfied (step S222).

If any one of the following conditions (1) to (3) is satisfied, the iterative calculation is regarded as being converged, the iterative calculation ends, and a finally assigned channel and a finally assigned bandwidth are determined.

1. When the U values of all controllable wireless access points reach 1 (that is, $$U_{(c)}^{(a)}=1$$ [Expression 63]

(all a)).

2. When the number of iterative calculations reaches an upper limit value.

3. When a value after the $R^{th}$ iterative calculation (R≥DeltaR):

$$U_{max}^{(R)}$$ [Expression 64]

satisfies the following condition:

$$\frac{(U_{max}^{(R)} - U_{max}^{(R-DeltaR)})}{DeltaR} < \text{Convergence Coefficient}$$ [Expression 65]

(Convergence Coefficient > 0.0)

Here, DeltaR is an integer greater than or equal to 1, and the above Condition 3 is a condition for evaluating convergence properties in accordance with an improving rate:

$$U_{max}^{(R)} = U_{total} \text{ (or, } U_{product}) \quad \text{[Expression 66]}.$$

If the ending condition for the iteration is satisfied (YES in step S222), the iteration ends. In contrast, if the ending condition is not satisfied (NO in step S222), $$U_{max}^{(r)} \quad \text{[Expression 67]}$$

is set depending on an evaluation condition used at the time of iteration (step S223). The set value is $U_{total}$ or $U_{product}$ in the $r^{th}$ iteration. For example, if evaluation using $U_{total}$ is performed, $$U_{max}^{(r)} = U_{total} \quad \text{[Expression 68]}.$$

In contrast, if evaluation using $U_{product}$ is performed, $$U_{max}^{(r)} = U_{product} \quad \text{[Expression 69]}.$$

Then, one wireless access point for the iterative calculation is selected (step S224). A current temporarily assigned channel and a current temporarily assigned bandwidth of the selected wireless access point are tempCH and tempBW, respectively (step S225). For the selected wireless access point, a process of calculating the temporarily assigned bandwidth and the temporarily assigned channel described above with reference to FIG. 31 is executed again (step S226). If the new temporarily assigned channel and the new temporarily assigned bandwidth that have been obtained are equal to tempCH and tempBW, respectively, (YES in step S227), the temporarily assigned channel and the temporality assigned bandwidth of the selected wireless access point are not changed. In this case, the process proceeds to step S230 to be described below. In contrast, if the new temporarily assigned channel is different from tempCH, the new temporarily assigned bandwidth is different from tempBW, or both of the new temporarily assigned channel and the new temporarily assigned bandwidth are different from tempCH and tempBW, respectively (NO in step S227), the process proceeds to step S228.

In step S228, the U values of all controllable wireless access points are evaluated again, and a sum ($U_{total}$) and a product ($U_{product}$) of the U values of all the controllable wireless access points are calculated. Then, $U_{total}$ or $U_{product}$ is substituted into $U_{TEMP}$. Then, it is checked whether the following condition is satisfied (step S229). It is to be noted that $\alpha$ is a number greater than or equal to 0 and smaller than or equal to 1.

$$U_{TEMP} \geq \alpha \cdot U_{max}^{(r)}? \quad \text{[Expression 70]}$$

If this condition is satisfied (YES in step S229), the temporarily assigned channel and the temporarily assigned bandwidth of the selected wireless access point are updated with the new temporarily assigned channel and the new temporarily assignment bandwidth, respectively (step S232). In contrast, if the condition of step S229 is not satisfied, the temporarily assigned channel and the temporarily assigned bandwidth of the selected wireless access point are not updated, and the values of the temporarily assigned channel and the temporarily assigned bandwidth are restored to TempCH and TempBW, respectively (step S230). Finally, the number of iterative calculations is incremented by 1 regardless of whether the condition of step S229 is satisfied or not (step S231), and step S221 is executed again.

Figure 33:
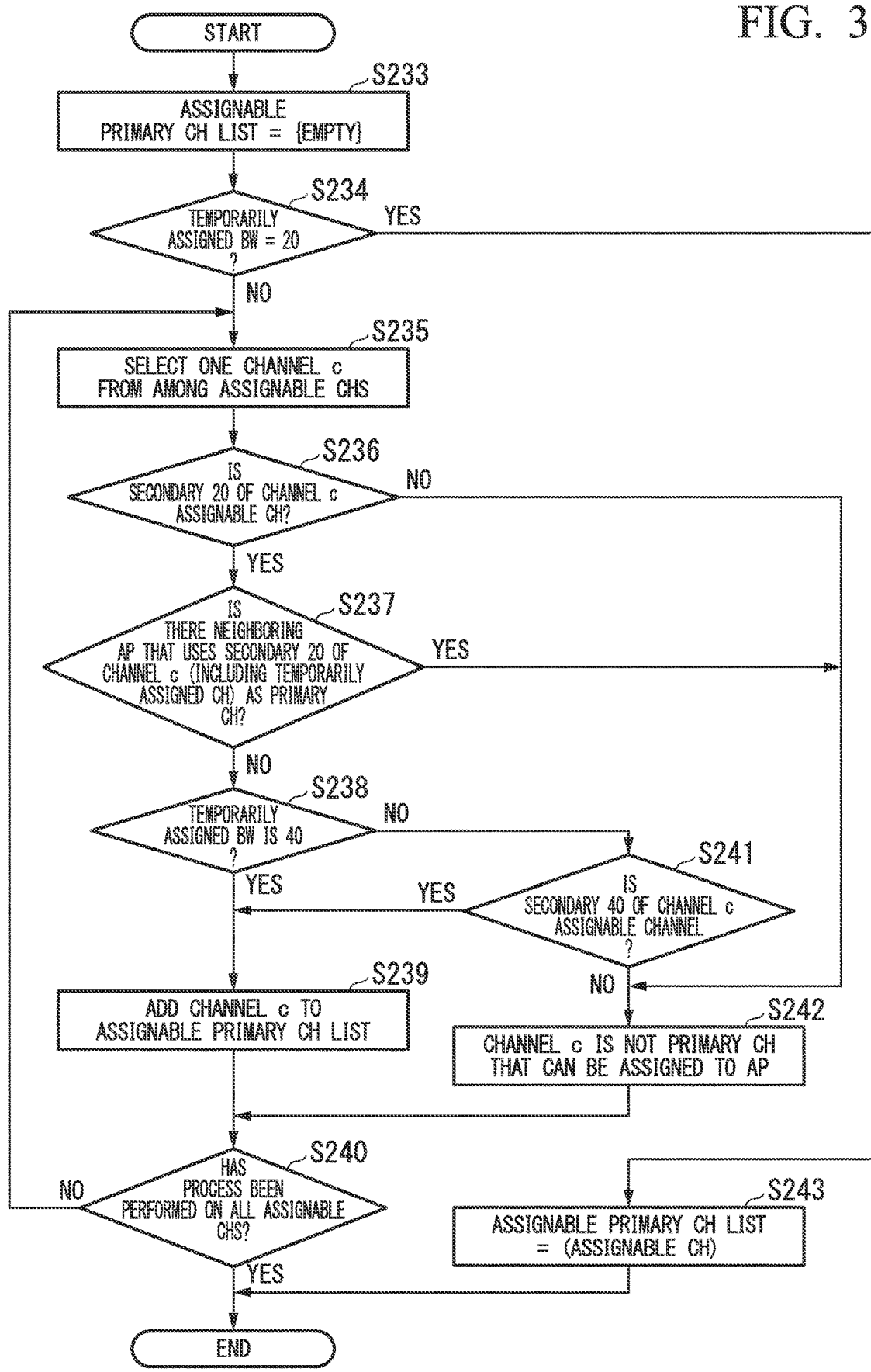
FIG. 33 is a diagram showing a process of creating an assignable primary channel list.

Next, a method for creating an assignable primary channel list (step S209 of FIG. 31) will be described using FIG. 33. FIG. 33 shows a process of creating the assignable primary channel list.

First, as an initial setting, the assignable primary channel list={empty} to create an empty list (step S233). Then, it is checked whether the temporarily assigned bandwidth of the selected wireless access point is 20 MHz (step S234). If the temporarily assigned bandwidth of the selected wireless access point is 20 MHz (YES in step S234; basic service set (BSS) of 20 MHz), all assignable channels are set as primary channels (step S243), and the present process ends. Here, an assignable channel is a channel or a channel list for which radar or the like is not detected among channels available in the wireless access point.

If the temporarily assigned bandwidth of the selected wireless access point is not 20 MHz (NO in step S234; BSS of 40 MHz or 80 MHz), the selected wireless access point starts up a cell with a broadband such as 40 MHz or 80 MHz, and thus it is necessary to select a channel so that primary channels do not overlap with the secondary 20 channel of another cell as defined in the standard. Therefore, first, one channel is selected from among the assignable channels (step S235). Then, it is checked whether the secondary 20 channel of the selected channel can be assigned (step S236).

Figure 34A:
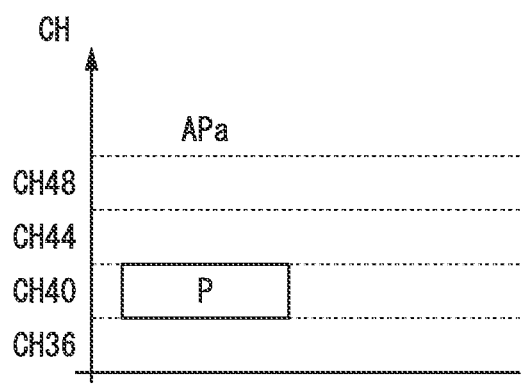
FIG. 34A is a diagram showing an example of an assignable primary channel.
Figure 34B:
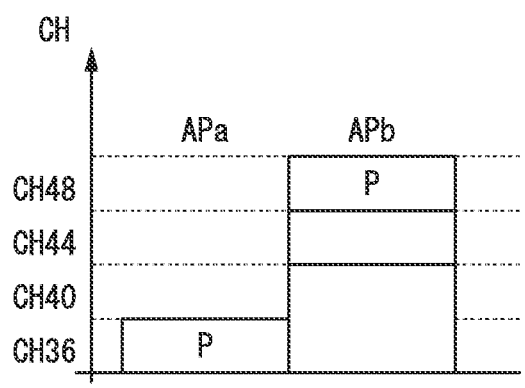
FIG. 34B is a diagram showing an example of assignable primary channels.

Here, examples of the assignable primary channels are shown in FIGS. 34A and 34B. These figures assume a case in which the wireless access point a and the wireless access point b are existing wireless access points, CH36 to CH48 are assignable channels, and the temporarily assigned bandwidth is 40. In FIG. 34A, CH40, CH44, and CH48 are assignable primary channels. In FIG. 34B, CH36 and CH48 are assignable primary channels.

For example, when the selected channel is CH44, it is checked in step S236 whether CH48 can be assigned to the wireless access point. Alternatively, when the selected channel is CH36, it is checked in step S236 whether CH40 can be assigned to the wireless access point. If CH40 can be assigned (YES in step S236), the process proceeds to step S237. In contrast, if CH40 cannot be assigned (NO in step S236), it is determined that the selected channel is a channel that cannot be assigned to the wireless access point (step S242) and the process proceeds to step S240.

It is checked in step S237 whether there is a neighboring wireless access point that uses the secondary 20 channel of the selected channel as a primary channel (step S237). If the neighboring wireless access point exists, the selected channel cannot be assigned to the wireless access point as defined in the standard, and thus the process proceeds to step S242. In contrast, if the neighboring wireless access point does not exist (NO in step S237), the process proceeds to step S238.

In step S238, it is checked whether the temporarily assigned bandwidth of the selected wireless access point is 40 MHz. If the temporarily assigned bandwidth of the selected wireless access point is 40 MHz (YES in step S238; BSS of 40 MHz), the selected channel is determined to be a primary channel that can be assigned to the wireless access point, the selected channel is added to the assignable primary channel list (step S239), and the process proceeds to step S240. In contrast, if the temporarily assigned bandwidth of the selected wireless access point is not 40 MHz (NO in step S238; BSS of 80 MHz), the wireless access point starts up a cell of 80 MHz or more, and thus it is checked whether the secondary 40 channel of the selected channel is a channel that can be assigned to the wireless access point (step S241). For example, when the selected channel is CH44, it is checked in step S241 whether CH36 and CH40 can be assigned to the wireless access point.

If the secondary 40 channel cannot be assigned (NO in step S241), step S242 is executed. In contrast, if the secondary 40 channel can be assigned (YES in step S241), the selected channel is determined to be a primary channel that can be assigned to the wireless access point, and the selected channel is added to the assignable primary channel list (step S239). Finally, it is determined in step S240 whether the process of steps S236 to S239 and S241 to S242 has been performed on all assignable channels, and if there is a remaining assignable channel that has not been processed, the process returns to step S235 to also execute the above-described process on another channel that can be assigned by the wireless access point. Then, when the creation of the assignable primary channel list for all assignable channels ends, the present process ends.

Figure 35:
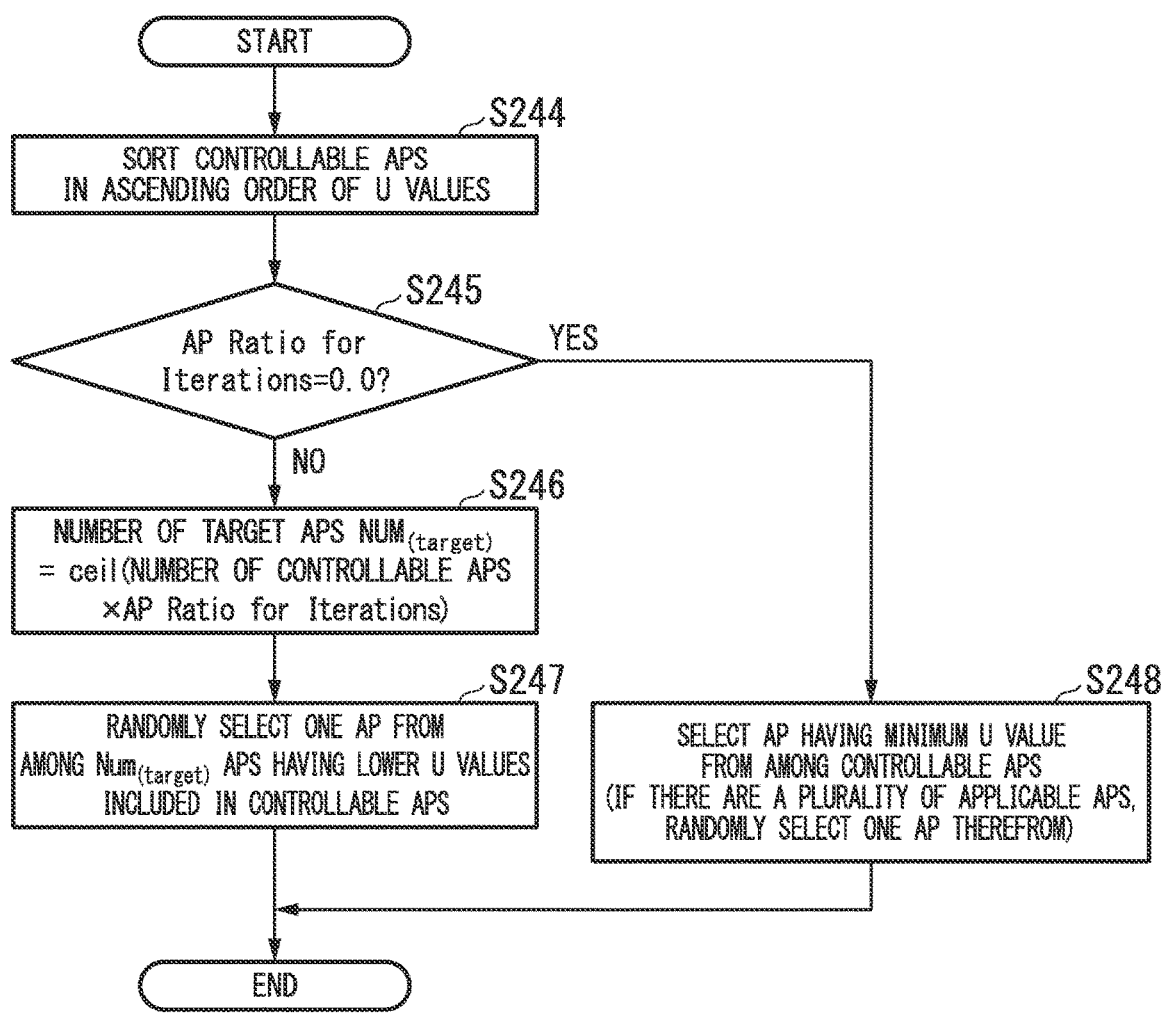
FIG. 35 is a diagram showing a method for selecting a wireless access point that performs iterative calculation.

Next, a method for selecting a wireless access point for which iterative calculation is performed (step S224 of FIG. 32) will be described using FIG. 35. FIG. 35 is a diagram showing the method for selecting the wireless access point for which the iterative calculation is performed.

First, the U values of all controllable wireless access points are sorted in ascending order (step S244). Then, it is checked whether a parameter, AP Ratio for Iterations, that has been set in advance is zero (step S245). If this parameter is zero (YES in step S245), the wireless access point having the minimum U value is selected from among the controllable wireless access points. If there are a plurality of applicable wireless access points, one wireless access point is randomly selected therefrom (step S248), and the present process ends. If the AP Ratio for Iterations value is greater than zero (NO in step S245), the number of wireless access points that are targets for the iterative calculation is calculated as follows (step S246).

Number of target wireless access points $Num_{(target)}$
= ceil (number of controllable wireless access points × AP Ratio for Iterations)

Here, ceil is a function that performs rounding-up. For example, ceil (0.1)=1.0, ceil (1.0)=1, and ceil (1.6)=2.

Then, one wireless access point is randomly selected from among the $Num_{(target)}$ wireless access points having lower U values in the controllable wireless access points (step S247), and the present process ends.

For example, it is assumed that the number of controllable wireless access points is 10 (hereinafter, the controllable wireless access points are referred to as AP #1 to AP #10) and the U value of each wireless access point after the $R^{th}$ iterative calculation is as follows.

AP #1: U=0.9, AP #2: U=0.6, AP #3: U=1.0, AP #4: U=0.1, AP #5: U=0.1, AP #6: U=0.3, AP #7: U=0.5, AP #8: U=1.0, AP #9: U=0.9, and AP #10: U=0.6

For the $(R+1)^{th}$ iterative calculation, the U values are sorted in ascending order as follows:

AP #4 (U=0.1), AP #5 (U=0.1), AP #6 (U=0.3), AP #7 (U=0.5), AP #2 (U=0.6), AP #10 (U=0.6), AP #1 (U=0.9), AP #9 (U=0.9), AP #3 (U=1.0), and AP #8 (U=1.0)

When the AP Ratio for Iterations=0.0, the number of target wireless access points $Num_{(target)}$=1, and AP #4 and AP #5 have a minimum U value. Therefore, one wireless access point is randomly selected from among AP #4 and AP #5, and the $(R+1)^{th}$ iterative calculation is executed.

When the AP Ratio for Iterations=0.5, the number of target wireless access points $Num_{(target)}$=5, and thus one wireless access point is randomly selected from among AP #4, AP #5, AP #6, AP #7, AP #2, and AP #10, and the $(R+1)^{th}$ iterative calculation is executed.

When the AP Ratio for Iterations=1.0, the number of target wireless access points $Num_{(target)}$=10, and thus one wireless access point is randomly selected from among AP #1 to AP #10, and the $(R+1)^{th}$ iterative calculation is executed.

The management engine 8 in the first to third embodiments described above, the management engine 80 in the fourth embodiment, and the wireless access points in the fifth to tenth embodiments may be realized by a computer. In that case, the realization of management engine 8 and the management engine 80 and the assignment of channels to be used by each wireless access point may be performed by recording a program for realizing the functions thereof in a computer-readable recording medium, loading the program recorded in the recording medium to a computer system, and executing the program. It is to be noted that "the computer system" referred to herein includes an operating system (OS) and hardware such as a peripheral device. Further, the "computer system" also includes a World Wide Web (WWW) system that is provided with a homepage providing environment (or display environment). Further, the "computer-readable recording medium" includes a portable medium such as a flexible disk, a magnetic optical disc, a read only memory (ROM), a compact disc (CD)-ROM, or a storage apparatus such as a hard disk built in the computer system. Further, the "computer-readable recording medium" may also include a recording medium that holds a program dynamically such as a communication line when a program is transmitted via a network such as the Internet or a communication circuit such as a telephone circuit, and a recording medium that holds a program for a certain time such as a volatile memory (random access memory (RAM) inside a computer system that functions as a server or a client in that case. Further, the above-described program may be transmitted from a computer system in which the program is stored in a storage apparatus or the like to another computer system via a transmission medium or by transmission waves in the transmission medium. Here, the "transmission medium" for transmitting the program refers to a medium having a function of transmitting information, such as a network (communication network) such as the Internet or a communication circuit (communication line) such as a telephone circuit. Also, the above-described program may be a program for realizing part of the above-described functions, may be a program capable of realizing the above-described functions in combination with a program previously stored in a computer system, i.e., a differential file (a differential program), or may be a program realized using hardware such as a programmable logic device (PLD) or a field programmable gate array (FPGA).

While the embodiments of the present invention have been described above with reference to the drawings, it is apparent that the embodiments are only examples of the present invention and the present invention is not limited to the embodiments. Additions, omissions, substitutions, and other modifications of the structural components may be performed without departing from the technical idea and scope of the present invention.

INDUSTRIAL APPLICABILITY

The present invention is applicable to applications in which it is essential to prevent local throughput degradation in an environment in which wireless LAN access points aggregate densely.

DESCRIPTION OF REFERENCE SIGNS 11, 12, 13, 14, 15, 16, 17, 18: access point (AP, wireless LAN access point)
21, 22, 23, 24, 25, 26: wireless station
41: another device 51, 52, 53, 54, 55, 56, 61: network
7: Internet
8: management engine (ME)
9: bundle distribution server
91, 92, 93, 94, 95, 96: service gateway (SGW)
1001, 1002: wireless access point
1011, 1021: wireless communication unit
1012, 1022: control unit
1013, 1023: access right acquisition unit
1014, 1024: channel setting unit
1015, 1025: wireless environment information holding unit
1003: channel assignment server
1031: communication unit
1032: channel calculation unit
1033: information collection unit
1034: control unit

The invention claimed is:

1. A wireless communication apparatus that performs setting necessary for a wireless LAN access point constituting a wireless communication network to operate, the wireless communication apparatus comprising:
an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of a channel in each of wireless stations associated with the wireless LAN access point, and surrounding wireless environment information;
a database which stores attribute information regarding an attribute of the wireless LAN access point;
a parameter calculation unit which obtains a parameter to be set for the wireless LAN access point from which the setting information and the wireless environment information have been collected based on the collected setting information, the collected wireless environment information, and the attribute information; and
a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter,
wherein the information collection unit and the parameter setting unit perform information collection, the transmission of the obtained parameter and the instruction to perform the setting of the obtained parameter through software and communicates with the wireless LAN access point using a protocol that is supported by the wireless LAN access point, where the software is retrieved according to the attribute of the wireless LAN access point.

2. The wireless communication apparatus according to claim 1, wherein the attribute information is information of any one of a manufacturer name, a model number, availability of 2.4 GHz, availability of 5 GHz, availability of a dynamic frequency selection (DFS) band, an available maximum bandwidth, the number of antennas, availability of antenna selection communication, transmission power control, the number of steps in the transmission power control, and availability of tilt angle control.

3. The wireless communication apparatus according to claim 2, wherein the information collection unit collects, as the wireless environment information, the number of other wireless LAN access points in each available channel, identification information of each wireless LAN access point, received signal strength, which is received signal strength indicator RSSI value, of a signal including a beacon received from each wireless LAN access point, the number of wireless station apparatuses in a cell of the wireless LAN access point, an RSSI value of a signal received from each wireless station apparatus, and a medium use rate of all available channels.

4. The wireless communication apparatus according to claim 1 or 2, wherein the information collection unit collects, as the wireless environment information, the number of neighboring access points operated on a frequency channel, a level of a received reception signal, and a time occupancy rate of the channel in each wireless LAN access point, and
the parameter calculation unit obtains the parameter so that a wireless environment is improved in each wireless LAN access point based on the wireless environment information.

5. The wireless communication apparatus according to claim 1 or 2, wherein the information collection unit collects, as the wireless environment information, the number of neighboring access points operated on a frequency channel, an available maximum bandwidth, and a level of a reception signal received from another neighboring access point in each wireless LAN access point, and
the parameter calculation unit obtains the parameter so that a wireless environment is improved in each wireless LAN access point based on the wireless environment information.

6. The wireless communication apparatus according to claim 1 or 2, wherein the information collection unit collects, as the wireless environment information, the number of other neighboring access points operated on a frequency channel, a level of a received reception signal, and the time occupation rate of the channel in each of the wireless stations associated with the wireless LAN access point.

7. The wireless communication apparatus according to claim 1 or 2, wherein the information collection unit collects, as the wireless environment information, the number of other neighboring access points operated on a frequency channel, an available bandwidth, and a level of a received reception signal in each of the wireless stations associated with the wireless LAN access point.

8. The wireless communication apparatus according to claim 1 or 2, wherein the information collection unit collects, as the wireless environment information, an instantaneous value of information collected over a constant period by the wireless LAN access point or a statistical value, the instantaneous value, an average value, a minimum value, or a maximum value of the information collected over the constant period by the wireless LAN access point.

9. The wireless communication apparatus according to claim 1 or 2, wherein the parameter setting unit executes the setting of the parameter through any one of periodical execution, manual execution by an operator of a network, manual execution in accordance with a request of a user receiving a service, and execution when a predetermined event occurs.

10. The wireless communication apparatus according to claim 1 or 2, wherein the database is updated in accordance with release of a wireless LAN access point of a new model or a change in a function of an existing wireless LAN access point.

11. The wireless communication apparatus according to claim 1 or 2, wherein the information collection unit collects, as the wireless environment information, the number of neighboring access points operated on a frequency channel, a level of a received reception signal, and a time occupancy rate of the channel in each wireless LAN access point,
the parameter calculation unit obtains the parameter so that a wireless environment is improved in each wireless LAN access point based on the wireless environment information, and
the information collection unit collects, as the wireless environment information, an instantaneous value of information collected over a constant period by the wireless LAN access point or a statistical value, the instantaneous value, an average value, a minimum value, or a maximum value of the information collected over the constant period by the wireless LAN access point.

12. The wireless communication apparatus according to claim 1 or 2, wherein the information collection unit collects, as the wireless environment information, the number of neighboring access points operated on a frequency channel, a level of a received reception signal, and a time occupancy rate of the channel in each wireless LAN access point, and
the parameter calculation unit obtains the parameter so that a wireless environment is improved in each wireless LAN access point based on the wireless environment information.

13. The wireless communication apparatus according to claim 1 or 2, wherein the information collection unit collects, as the wireless environment information, the number of neighboring access points operated on a frequency channel, a level of a received reception signal, and a time occupancy rate of the channel in each wireless LAN access point,
the parameter calculation unit obtains the parameter so that a wireless environment is improved in each wireless LAN access point based on the wireless environment information, and
the parameter setting unit executes the setting of the parameter through any one of periodical execution, manual execution by an operator of a network, manual execution in accordance with a request of a user receiving a service, and execution when a predetermined event occurs.

14. The wireless communication apparatus according to claim 1 or 2, wherein the information collection unit collects, as the wireless environment information, the number of neighboring access points operated on a frequency channel, an available maximum bandwidth, and a level of a reception signal received from another neighboring access point in each wireless LAN access point,
the parameter calculation unit obtains the parameter so that a wireless environment is improved in each wireless LAN access point based on the wireless environment information, and
information collection unit collects, as the wireless environment information, an instantaneous value of information collected over a constant period by the wireless LAN access point or a statistical value, the instantaneous value, an average value, a minimum value, or a maximum value of the information collected over the constant period by the wireless LAN access point.

15. The wireless communication apparatus according to claim 1 or 2, wherein the information collection unit collects, as the wireless environment information, the number of neighboring access points operated on a frequency channel, an available maximum bandwidth, and a level of a reception signal received from another neighboring access point in each wireless LAN access point, and
the parameter calculation unit obtains the parameter so that a wireless environment is improved in each wireless LAN access point based on the wireless environment information.

16. The wireless communication apparatus according to claim 1 or 2, wherein the information collection unit collects, as the wireless environment information, the number of neighboring access points operated on a frequency channel, an available maximum bandwidth, and a level of a reception signal received from another neighboring access point in each wireless LAN access point,
the parameter calculation unit obtains the parameter so that a wireless environment is improved in each wireless LAN access point based on the wireless environment information, and
the parameter setting unit executes the setting of the parameter through any one of periodical execution, manual execution by an operator of a network, manual execution in accordance with a request of a user receiving a service, and execution when a predetermined event occurs.

17. The wireless communication apparatus according to claim 1, wherein the information collection unit collects, as the wireless environment information, the number of other wireless LAN access points in each available channel, identification information of each wireless LAN access point, received signal strength, which is received signal strength indicator RSSI value, of a signal including a beacon received from each wireless LAN access point, the number of wireless station apparatuses in a cell of the wireless LAN access point, an RSSI value of a signal received from each wireless station apparatus, and a medium use rate of all available channels.

18. A wireless communication apparatus that performs setting necessary for a wireless LAN access point constituting a wireless communication network to operate, the wireless communication apparatus comprising:
an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of a channel in each of wireless stations associated with the wireless LAN access point, and surrounding wireless environment information;
a parameter calculation unit which obtains a parameter to be set for the wireless LAN access point from which the setting information and the wireless environment information have been collected based on the collected setting information and the collected wireless environment information; and
a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter, wherein the wireless LAN access point performs wireless communication using at least one of a plurality of channels, the information collection unit collects, as the wireless environment information, information indicating a surrounding wireless environment detected by the wireless LAN access point, the parameter calculation unit calculates an index value for determining a channel to be used by the wireless LAN access point based on the wireless environment information, and obtains, as the parameter, a channel to be used by the wireless LAN access point based on the index value, and the information collection unit and the parameter setting unit perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

19. The wireless communication apparatus according to claim 18, wherein the parameter calculation unit calculates, as the index value, a U value expressed by U=1−medium use rate of each available channel by another wireless apparatus, for all available channels, and determines one of a channel in which the U value is maximized and a channel in which the U value is greater than or equal to a predetermined threshold as a temporary channel to be assigned to the wireless LAN access point.

20. The wireless communication apparatus according to claim 18, wherein the parameter calculation unit calculates, as the index value, a U value expressed by U=degree of satisfaction, for all available channels, and determines one of a channel in which the U value is maximized and a channel in which the U value is greater than or equal to a predetermined threshold as a temporary channel to be assigned to the wireless LAN access point.

21. The wireless communication apparatus according to claim 18, wherein the parameter calculation unit calculates, as the index value, a U value expressed by U=duration for which the wireless LAN access point is capable of occupying each available channel per unit time/total duration necessary for the wireless LAN access point to perform transmission and reception of a frame per unit time, for each available channel, and determines one of a channel in which the U value is maximized and a channel in which the U value is greater than or equal to a predetermined threshold as a temporary channel to be assigned to the wireless LAN access point.

22. The wireless communication apparatus according to claim 18, wherein the parameter calculation unit calculates, as the index value, a U value expressed by U=throughput (expected throughput) acquirable when the wireless LAN access point shares each available channel with a neighboring access point/throughput acquirable when only the wireless LAN access point uses each available channel (when there is no other interfering access point), for each available channel and each available bandwidth, and determines a channel and a bandwidth in which the U value is greater than or equal to a predetermined threshold $\beta$ as a temporary channel and a temporary bandwidth to be assigned to the wireless LAN access point.

23. The wireless communication apparatus according to claim 22, wherein, if there is no channel and no bandwidth in which the U value is greater than or equal to the threshold $\beta$, a channel and a bandwidth in which the U value is maximized are determined as the temporary channel and the temporary bandwidth to be assigned to the wireless LAN access point.

24. The wireless communication apparatus according to claim 18, wherein the parameter calculation unit calculates, as the index value, a U value expressed by U=throughput capable of being acquired by wireless LAN access point/required traffic amount, for all available channels, and determines one of a channel in which the U value is maximized and a channel in which the U value is greater than or equal to a predetermined threshold as a temporary channel to be assigned to the wireless LAN access point.

25. The wireless communication apparatus according to any one of claims 19 to 24, wherein the parameter calculation unit calculates the temporary channel in each wireless LAN access point, calculates the U value in each wireless LAN access point and a total sum $U_{total}$ of U values in all wireless LAN access points, selects one wireless LAN access point from among wireless LAN access points having U values smaller than or equal to a predetermined threshold $U_{TH}$, calculates a channel satisfying a predetermined condition, and iteratively executes an operation of setting the channel as a new temporary channel of the selected wireless LAN access point predetermined Max_r times.

26. The wireless communication apparatus according to claim 25, wherein when $U_{total}$ in an $r^{th}$ iterative calculation is denoted as $U_{total}^{(r)}$, the channel satisfying the predetermined conditions is a channel in which the U value of the selected wireless LAN access point is U≥$\beta$ (0≤$\alpha$ and $\beta$≤1) under a condition of $U_{total}^{(r)} \geq \alpha \cdot U_{total}^{(r-1)}$.

27. The wireless communication apparatus according to any one of claims 19 to 24, wherein the parameter calculation unit calculates the temporary channel in each wireless LAN access point, calculates the U value in each wireless LAN access point and a total product $U_{product}$ of U values in all wireless LAN access points, selects one wireless LAN access point from among wireless LAN access points having U values smaller than or equal to a predetermined threshold $U_{TH}$, calculates a channel satisfying a predetermined condition, and iteratively executes an operation of setting the channel as a new temporary channel of the selected wireless LAN access point predetermined Max_r times.

28. The wireless communication apparatus according to claim 27, wherein when $U_{product}$ in an $r^{th}$ iterative calculation is denoted as $U_{product}^{(r)}$, the channel satisfying the predetermined condition is a channel in which the U value of the selected wireless LAN access point is U≥$\beta$ (0≤$\alpha$ and $\beta$≤1) under a condition of $U_{product}^{(r)} \geq \alpha \cdot U_{product}^{(r-1)}$.

29. The wireless communication apparatus according to claim 28, wherein when U values of all wireless LAN access points become 1, when the number of times of predetermined iterative calculations becomes predetermined Max_r, or when a predetermined convergence condition is satisfied, the parameter calculation unit determines the temporary channel of each wireless LAN access point at that time as a channel to be set in each wireless LAN access point.

30. The wireless communication apparatus according to any one of claims 19 to 24, wherein the parameter calculation unit calculates a total U value that is a sum of U values of all wireless LAN access points to which channels are to be assigned, and optimizes a channel assigned to a wireless LAN access point having a U value satisfying a predetermined condition so that the total U value does not deteriorate.

31. The wireless communication apparatus according to any one of claims 19 to 24, wherein the parameter calculation unit calculates a multiplied value of U values of all wireless LAN access points to which channels are to be assigned, and optimizes a channel assigned to a wireless LAN access point having a U value satisfying a predetermined condition so that the multiplied value of the U value does not deteriorate.

32. The wireless communication apparatus according to any one of claims 19 to 24, wherein the parameter calculation unit calculates the U value using a time occupation rate of the wireless LAN access point or a wireless station, or a parameter value equivalent to the time occupation rate.

33. A wireless communication apparatus that performs setting necessary for a wireless LAN access point constituting a wireless communication network to operate, the wireless communication apparatus comprising:
  an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of a channel in each of wireless stations associated with the wireless LAN access point, and surrounding wireless environment information;
  a parameter calculation unit which obtains a parameter to be set for the wireless LAN access point from which the setting information and the wireless environment information have been collected based on the collected setting information and the collected wireless environment information; and
  a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter,
  wherein the wireless LAN access point performs wireless communication using at least one wireless communication scheme among a plurality of wireless communication schemes,
  the information collection unit collects information indicating surrounding wireless environment detected by the wireless LAN access point as the wireless environment information,
  the parameter calculation unit calculates an index value for determining a wireless communication scheme to be used by the wireless LAN access point based on the wireless environment information, and obtains, as the obtained parameter, the wireless communication scheme to be used by the wireless LAN access point based on the index value, and
  the information collection unit and the parameter setting unit perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

34. The wireless communication apparatus according to claim 33, wherein the parameter calculation unit calculates, as the index value, a Ux value expressed by Ux=expected throughput upon transition to another wireless communication scheme/mean throughput in a system currently being used, in each wireless LAN access point, determines a channel of a wireless communication scheme in which the Ux value is maximized as a channel of a temporary wireless communication scheme to be assigned to the wireless LAN access point, and determines a channel of a wireless communication scheme to be finally used through iterative calculation.

35. A wireless communication system comprising a management engine which performs setting necessary for a wireless LAN access point constituting a wireless communication network to operate,
  the management engine comprising:
  an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of a channel in each of wireless stations associated with the wireless LAN access point, and surrounding wireless environment information;
  a parameter calculation unit which obtains a parameter to be set for the wireless LAN access point from which the setting information and the wireless environment information have been collected based on the collected setting information and the collected wireless environment information; and
  a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter, and
  the wireless LAN access point comprising:
  an information transmission unit which transmits the setting information and the wireless environment information to the management engine when receiving a request for information collection from the information collection unit; and
  a setting unit which performs setting of the wireless LAN access point itself based on the obtained parameter when receiving the parameter from the parameter setting unit,
  wherein the management engine comprises a database which stores attribute information regarding an attribute of the wireless LAN access point,
  the parameter calculation unit obtains the obtained parameter based on the setting information, the wireless environment information, and the attribute information, and
  the information collection unit and the parameter setting unit perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

36. The wireless communication system according to claim 35, wherein the attribute information is information of any one of a manufacturer name, a model number, availability of 2.4 GHz, availability of 5 GHz, availability of a dynamic frequency selection (DFS) band, an available maximum bandwidth, the number of antennas, availability of antenna selection communication, transmission power control, the number of steps in the transmission power control, and availability of tilt angle control.

37. The wireless communication system according to claim 35 or 36, wherein the information collection unit collects, as the wireless environment information, the number of other neighboring access points operated on a frequency channel, a level of a received reception signal, and the time occupation rate of the channel in each of the wireless stations associated with the wireless LAN access point.

38. A wireless communication system comprising a management engine which performs setting necessary for a wireless LAN access point constituting a wireless communication network to operate,
the management engine comprising:
an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of a channel in each of wireless stations associated with the wireless LAN access point, and surrounding wireless environment information;
a parameter calculation unit which obtains a parameter to be set for the wireless LAN access point from which the setting information and the wireless environment information have been collected based on the collected setting information and the collected wireless environment information; and
a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter, and
the wireless LAN access point comprising:
an information transmission unit which transmits the setting information and the wireless environment information to the management engine when receiving a request for information collection from the information collection unit; and
a setting unit which performs setting of the wireless LAN access point itself based on the obtained parameter when receiving obtained parameter from the parameter setting unit,
wherein the wireless communication system comprises a plurality of wireless LAN access points which perform wireless communication using at least one of a plurality of channels,
each wireless LAN access point comprises a surrounding wireless environment notification unit which detects a surrounding wireless environment, generates information indicating the surrounding wireless environment as the wireless environment information, and notifies the management engine of the generated wireless environment information,
the parameter calculation unit calculates an index value for determining a channel to be used by each wireless LAN access point based on the wireless environment information, and obtains, as the obtained parameter, the channel to be used by each wireless LAN access point based on the index value, and
the information collection unit and the parameter setting unit perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

39. The wireless communication system according to claim 38, wherein the parameter calculation unit calculates, as the index value, a U value expressed by U=1−medium use rate of each available channel by another wireless apparatus, for all available channels, and determines a channel in which the U value is maximized as a temporary channel to be assigned to the wireless LAN access point.

40. The wireless communication system according to claim 38, wherein the parameter calculation unit calculates, as the index value, a U value expressed by U=degree of satisfaction, for all available channels, and determines a channel in which the U value is maximized as a temporary channel to be assigned to the wireless LAN access point.

41. The wireless communication system according to claim 38, wherein the parameter calculation unit calculates, as the index value, a U value expressed by U=duration for which each wireless LAN access point is capable of occupying each available channel per unit time/total duration necessary for each wireless LAN access point to perform transmission and reception of a frame per unit time, for each available channel, and determines a channel in which the U value is maximized as a temporary channel to be assigned to each wireless LAN access point.

42. A wireless communication system comprising a management engine which performs setting necessary for a wireless LAN access point constituting a wireless communication network to operate,
the management engine comprising:
an information collection unit which collects setting information set in the wireless LAN access point and wireless environment information in the wireless LAN access point, where the wireless environment information includes current setting information of the wireless LAN access point, information regarding functions of the wireless LAN access point, a time occupation rate of the channel in each of wireless stations associated with the wireless LAN access point, and surrounding wireless environment information;
a parameter calculation unit which obtains a parameter to be set for the wireless LAN access point from which the setting information and the wireless environment information have been collected based on the collected setting information and the collected wireless environment information; and
a parameter setting unit which performs transmission of the obtained parameter to the wireless LAN access point from which the setting information and the wireless environment information have been collected over a network and gives the wireless LAN access point from which the setting information and the wireless environment information have been collected an instruction to perform setting of the obtained parameter, and the wireless LAN access point comprising:
an information transmission unit which transmits the setting information and the wireless environment information to the management engine when receiving a request for information collection from the information collection unit; and
a setting unit which performs setting of the wireless LAN access point itself based on the obtained parameter when receiving the obtained parameter from the parameter setting unit,
wherein the wireless communication system comprises a plurality of wireless LAN access points which perform wireless communication using a channel of at least one wireless communication scheme among a plurality of wireless communication schemes,
each wireless LAN access point comprises a surrounding wireless environment notification unit which detects a surrounding wireless environment, generates information indicating the surrounding wireless environment as the wireless environment information, and notifies the management engine of the generated wireless environment information,
the parameter calculation unit calculates an index value for determining a wireless communication scheme to be used by each wireless LAN access point based on the wireless environment information, and obtains, as the obtained parameter, the wireless communication scheme to be used by each wireless LAN access point based on the index value, and
the information collection unit and the parameter setting unit perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

43. A wireless communication method performed by a wireless communication system which performs parameter setting necessary for a wireless LAN access point constituting a wireless communication network to operate, the wireless communication method comprising:
an information collection step of collecting setting information set in the wireless LAN access point and wireless environment information in the wireless LAN access point, where the wireless environment information includes current setting information of the wireless LAN access point, information regarding functions of the wireless LAN access point, a time occupation rate of the channel in each of wireless stations associated with the wireless LAN access point, and surrounding wireless environment information;
a parameter calculation step of obtaining a parameter to be set for the wireless LAN access point from which the setting information and the wireless environment information have been collected based on the collected setting information and the collected wireless environment information; and
a parameter setting step of performing transmission of the obtained parameter to the wireless LAN access point from which the setting information and the wireless environment information have been collected over a network and giving the wireless LAN access point from which the setting information and the wireless environment information have been collected an instruction to perform setting of the obtained parameter,
wherein the parameter calculation step obtains the parameter based on the setting information, the wireless environment information, and attribute information regarding an attribute of the wireless LAN access point stored in a database, and
the information collection step and the parameter setting step perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

44. The wireless communication method according to claim 43, wherein the attribute information is information of any one of a manufacturer name, a model number, availability of 2.4 GHz, availability of 5 GHz, availability of a dynamic frequency selection (DFS) band, an available maximum bandwidth, the number of antennas, availability of antenna selection communication, transmission power control, the number of steps in the transmission power control, and availability of tilt angle control.

45. The wireless communication method according to claim 43 or 44, wherein the information collection step collects, as the wireless environment information, the number of other neighboring access points operated on a frequency channel, a level of a received reception signal, and the time occupancy rate of the channel in each of the wireless stations associated with the wireless LAN access point.

46. A wireless communication method performed by a wireless communication system which performs parameter setting necessary for a wireless LAN access point constituting a wireless communication network to operate, the wireless communication method comprising:
an information collection step of collecting setting information set in the wireless LAN access point and wireless environment information in the wireless LAN access point, where the wireless environment information includes current setting information of the wireless LAN access point, information regarding functions of the wireless LAN access point, a time occupation rate of the channel in each of wireless stations associated with the wireless LAN access point, and surrounding wireless environment information;
a parameter calculation step of obtaining a parameter to be set for the wireless LAN access point from which the setting information and the wireless environment information have been collected based on the collected setting information and the collected wireless environment information; and
a parameter setting step of performing transmission of the obtained parameter to the wireless LAN access point from which the setting information and the wireless environment information have been collected over a network and giving the wireless LAN access point from which the setting information and the wireless environment information have been collected an instruction to perform setting of the obtained parameter,
wherein the wireless LAN access point performs wireless communication using at least one of a plurality of channels, the information collection step collects information indicating surrounding wireless environment detected by the wireless LAN access point as the wireless environment information, the parameter calculation step calculates an index value for determining a channel to be used by the wireless LAN access point based on the wireless environment information, and obtains, as the obtained parameter, the channel to be used by the wireless LAN access point based on the index value, and the information collection step and the parameter setting step perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

47. The wireless communication method according to claim 46, wherein the parameter calculation step calculates, as the index value, a U value expressed by U=1−medium use rate of each available channel by another wireless apparatus, for all available channels and determines a channel in which the U value is maximized as a temporary channel to be assigned to the wireless LAN access point.

48. The wireless communication method according to claim 46, wherein the parameter calculation step calculates, as the index value, a U value expressed by U=degree of satisfaction, for all available channels and determines a channel in which the U value is maximized as a temporary channel to be assigned to the wireless LAN access point.

49. The wireless communication method according to claim 46, wherein the parameter calculation step calculates, as the index value, a U value expressed by U=duration of each available channel capable of being occupied by the wireless LAN access point per unit time/total duration necessary for the wireless LAN access point to perform transmission and reception of a frame per unit time, for each available channel, and determines a channel in which the U value is maximized as a temporary channel to be assigned to the wireless LAN access point.

50. A wireless communication method performed by a wireless communication system which performs parameter setting necessary for a wireless LAN access point constituting a wireless communication network to operate, the wireless communication method comprising:

an information collection step of collecting setting information set in the wireless LAN access point and wireless environment information in the wireless LAN access point, where the wireless environment information includes current setting information of the wireless LAN access point, information regarding functions of the wireless LAN access point, a time occupation rate of the channel in each of wireless stations associated with the wireless LAN access point, and surrounding wireless environment information;

a parameter calculation step of obtaining a parameter to be set for the wireless LAN access point from which the setting information and the wireless environment information have been collected based on the collected setting information and the collected wireless environment information; and a parameter setting step of performing transmission of the obtained parameter to the wireless LAN access point from which the setting information and the wireless environment information have been collected over a network and giving the wireless LAN access point from which the setting information and the wireless environment information have been collected an instruction to perform setting of the obtained parameter, wherein the wireless LAN access point performs wireless communication using a channel of at least one wireless communication scheme among a plurality of wireless communication schemes, the information collection step collects information indicating surrounding wireless environment detected by the wireless LAN access point as the wireless environment information, the parameter calculation step calculates an index value for determining a wireless communication scheme to be used by the wireless LAN access point based on the wireless environment information and obtains, as the obtained parameter, the wireless communication scheme to be used by the wireless LAN access point based on the index value, and the information collection step and the parameter setting step perform information collection, the transmission of the obtained parameter, and the instruction to perform the setting of the obtained parameter through software and communicates with the wireless LAN access point using a protocol that is supported by the wireless LAN access point, where the software is retrieved according to the attribute of the wireless LAN access point.

* * * * *